(12) United States Patent
Boortz

(10) Patent No.: US 9,060,100 B2
(45) Date of Patent: Jun. 16, 2015

(54) SCHEDULING TRIGGER APPARATUS AND METHOD

(75) Inventor: Jeffery Allen Boortz, Narbeth, PA (US)

(73) Assignee: Time Warner Cable Enterprises, LLC, New York, NY (US)

(*) Notice: Subject to any disclaimer, the term of this patent is extended or adjusted under 35 U.S.C. 154(b) by 0 days.

(21) Appl. No.: 11/460,095

(22) Filed: Jul. 26, 2006

(65) Prior Publication Data
US 2006/0259924 A1    Nov. 16, 2006

Related U.S. Application Data

(63) Continuation-in-part of application No. 11/386,110, filed on Mar. 22, 2006, and a continuation of application No. 10/948,271, filed on Sep. 22, 2004.

(60) Provisional application No. 60/505,274, filed on Sep. 23, 2003.

(51) Int. Cl.
| | |
|---|---|
| *H04N 7/173* | (2011.01) |
| *H04N 5/445* | (2011.01) |
| *H04N 21/2347* | (2011.01) |
| *H04N 21/2389* | (2011.01) |
| *H04N 21/262* | (2011.01) |
| *H04N 21/435* | (2011.01) |
| *H04N 21/44* | (2011.01) |
| *H04N 21/472* | (2011.01) |
| *H04N 21/4722* | (2011.01) |

(Continued)

(52) U.S. Cl.
CPC ........ *H04N 7/17327* (2013.01); *H04N 5/44543* (2013.01); *H04N 21/2347* (2013.01); *H04N 21/23892* (2013.01); *H04N 21/262* (2013.01); *H04N 21/26258* (2013.01); *H04N 21/4353* (2013.01); *H04N 21/44016* (2013.01); *H04N 21/47202* (2013.01); *H04N 21/47214* (2013.01); *H04N 21/4722* (2013.01); *H04N 21/4825* (2013.01); *H04N 21/63345* (2013.01); *H04N 21/8106* (2013.01); *H04N 21/812* (2013.01)

(58) Field of Classification Search
CPC .......... H04N 7/17327; H04N 5/44543; H04N 21/2347; H04N 21/23892
USPC ........... 725/1–8, 32–36, 58, 60; 386/291–299
See application file for complete search history.

(56) References Cited

U.S. PATENT DOCUMENTS

| | | |
|---|---|---|
| 4,905,080 A | 2/1990 | Watanabe et al. |
| 5,373,315 A | 12/1994 | Dufresne et al. |

(Continued)

OTHER PUBLICATIONS

Tandberg Television specification entitled "*AdPoint® Advanced Advertising Platform*" dated Mar. 2008, 2 pages.

(Continued)

*Primary Examiner* — Nathan Flynn
*Assistant Examiner* — Alfonso Castro
(74) *Attorney, Agent, or Firm* — Gazdzinski & Associates PC

(57) ABSTRACT

A method of alerting a user of a scheduled event on a network includes transmitting a promotion to a first consumer premises equipment ("CPE"), the promotion being associated with event scheduling metadata, and causing the event scheduling metadata to be transmitted from the first CPE to a second CPE based on a selection of the promotion at the first CPE. The method further includes causing a reminder message to be transmitted from the second CPE to the first CPE based on the event scheduling metadata.

27 Claims, 35 Drawing Sheets

(51) Int. Cl.
*H04N 21/482* (2011.01)
*H04N 21/6334* (2011.01)
*H04N 21/81* (2011.01)

(56) References Cited

U.S. PATENT DOCUMENTS

| | | | |
|---|---|---|---|
| 5,481,294 A | 1/1996 | Thomas et al. | |
| 5,497,185 A | 3/1996 | Dufresne et al. | |
| 5,675,647 A * | 10/1997 | Garneau et al. | 380/239 |
| 5,793,409 A | 8/1998 | Tetsumura | |
| 5,812,642 A | 9/1998 | Leroy | |
| 5,974,299 A | 10/1999 | Massetti | |
| 6,029,045 A | 2/2000 | Picco et al. | |
| 6,088,722 A | 7/2000 | Herz et al. | |
| 6,177,931 B1 | 1/2001 | Alexander et al. | |
| 6,202,210 B1 | 3/2001 | Ludtke | |
| 6,396,055 B1 | 5/2002 | Biedendorf | |
| 6,463,585 B1 | 10/2002 | Hendricks et al. | |
| 6,467,089 B1 | 10/2002 | Aust et al. | |
| 6,549,718 B1 | 4/2003 | Grooters et al. | |
| 6,647,548 B1 | 11/2003 | Lu et al. | |
| 6,681,393 B1 | 1/2004 | Bauminger et al. | |
| 6,687,735 B1 | 2/2004 | Logston et al. | |
| 6,704,930 B1 | 3/2004 | Eldering et al. | |
| 6,813,776 B2 * | 11/2004 | Chernock et al. | 725/58 |
| 6,859,845 B2 * | 2/2005 | Mate | 710/5 |
| 6,898,762 B2 | 5/2005 | Ellis et al. | |
| 6,915,528 B1 * | 7/2005 | McKenna, Jr. | 725/37 |
| 6,990,680 B1 | 1/2006 | Wugofski | |
| 7,017,179 B1 * | 3/2006 | Asamoto et al. | 725/152 |
| 7,039,928 B2 | 5/2006 | Kamada et al. | |
| 7,109,848 B2 | 9/2006 | Schybergson | |
| 7,174,126 B2 | 2/2007 | McElhatten | |
| 7,197,472 B2 | 3/2007 | Conkwright et al. | |
| 7,222,078 B2 | 5/2007 | Abelow | |
| 7,266,836 B2 | 9/2007 | Anttila et al. | |
| 7,281,261 B2 | 10/2007 | Jaff et al. | |
| 7,356,751 B1 | 4/2008 | Levitan | |
| 7,363,643 B2 | 4/2008 | Drake et al. | |
| 7,367,043 B2 * | 4/2008 | Dudkiewicz et al. | 725/138 |
| 7,369,750 B2 * | 5/2008 | Cheng et al. | 386/83 |
| 7,457,520 B2 | 11/2008 | Rossetti | |
| 7,602,820 B2 | 10/2009 | Helms et al. | |
| 7,603,529 B1 | 10/2009 | MacHardy | |
| 7,712,125 B2 | 5/2010 | Herigstad et al. | |
| 7,720,432 B1 | 5/2010 | Colby et al. | |
| 7,730,509 B2 | 6/2010 | Boulet | |
| 7,900,229 B2 | 3/2011 | Dureau | |
| 8,028,322 B2 | 9/2011 | Riedl et al. | |
| 8,042,131 B2 | 10/2011 | Flickinger | |
| 8,065,703 B2 | 11/2011 | Wilson | |
| 8,205,226 B2 | 6/2012 | Ko et al. | |
| 8,214,256 B2 | 7/2012 | Riedl et al. | |
| 8,347,341 B2 | 1/2013 | Markley et al. | |
| 8,561,113 B2 | 10/2013 | Cansler et al. | |
| 2001/0001160 A1 | 5/2001 | Shoff et al. | |
| 2002/0026496 A1 | 2/2002 | Boyer et al. | |
| 2002/0032754 A1 | 3/2002 | Logston et al. | |
| 2002/0069404 A1 | 6/2002 | Copeman et al. | |
| 2002/0073419 A1 | 6/2002 | Yen et al. | |
| 2002/0078441 A1 | 6/2002 | Drake et al. | |
| 2002/0078444 A1 | 6/2002 | Krewin et al. | |
| 2002/0087975 A1 | 7/2002 | Schlack | |
| 2002/0087976 A1 | 7/2002 | Kaplan et al. | |
| 2002/0100063 A1 * | 7/2002 | Herigstad et al. | 725/141 |
| 2002/0123928 A1 | 9/2002 | Eldering et al. | |
| 2002/0147984 A1 | 10/2002 | Tomsen et al. | |
| 2002/0174430 A1 * | 11/2002 | Ellis et al. | 725/46 |
| 2002/0178445 A1 | 11/2002 | Eldering et al. | |
| 2002/0184629 A1 * | 12/2002 | Sie et al. | 725/41 |
| 2002/0184634 A1 | 12/2002 | Cooper | |
| 2002/0184635 A1 | 12/2002 | Istvan | |
| 2003/0005446 A1 * | 1/2003 | Jaff et al. | 725/51 |
| 2003/0018977 A1 | 1/2003 | McKenna | |
| 2003/0020744 A1 | 1/2003 | Ellis et al. | |
| 2003/0030751 A1 * | 2/2003 | Lupulescu et al. | 348/552 |
| 2003/0056217 A1 | 3/2003 | Brooks | |
| 2003/0093790 A1 * | 5/2003 | Logan et al. | 725/38 |
| 2003/0101454 A1 | 5/2003 | Ozer et al. | |
| 2003/0110503 A1 * | 6/2003 | Perkes | 725/86 |
| 2003/0115601 A1 | 6/2003 | Palazzo et al. | |
| 2003/0135513 A1 * | 7/2003 | Quinn et al. | 707/102 |
| 2003/0149990 A1 * | 8/2003 | Anttila et al. | 725/105 |
| 2003/0149993 A1 | 8/2003 | Son et al. | |
| 2003/0237090 A1 | 12/2003 | Boston et al. | |
| 2004/0034873 A1 | 2/2004 | Zenoni | |
| 2004/0047599 A1 * | 3/2004 | Grzeczkowski | 386/83 |
| 2004/0060076 A1 | 3/2004 | Song | |
| 2004/0073915 A1 * | 4/2004 | Dureau | 725/9 |
| 2004/0117817 A1 | 6/2004 | Kwon et al. | |
| 2004/0133467 A1 | 7/2004 | Siller | |
| 2004/0148625 A1 | 7/2004 | Eldering et al. | |
| 2004/0163111 A1 | 8/2004 | Palazzo et al. | |
| 2004/0177383 A1 | 9/2004 | Martinolich et al. | |
| 2004/0181811 A1 | 9/2004 | Rakib | |
| 2005/0022237 A1 * | 1/2005 | Nomura | 725/39 |
| 2005/0027696 A1 | 2/2005 | Swaminathan et al. | |
| 2005/0028208 A1 | 2/2005 | Ellis et al. | |
| 2005/0034171 A1 | 2/2005 | Benya | |
| 2005/0034173 A1 | 2/2005 | Benya | |
| 2005/0039205 A1 | 2/2005 | Riedl et al. | |
| 2005/0060745 A1 | 3/2005 | Riedl | |
| 2005/0105396 A1 * | 5/2005 | Schybergson | 368/12 |
| 2005/0144635 A1 | 6/2005 | Boortz | |
| 2005/0210502 A1 | 9/2005 | Flickinger et al. | |
| 2005/0229209 A1 | 10/2005 | Hidebolt et al. | |
| 2005/0235318 A1 | 10/2005 | Grauch et al. | |
| 2005/0262542 A1 | 11/2005 | DeWeese et al. | |
| 2005/0273819 A1 * | 12/2005 | Knudson et al. | 725/58 |
| 2005/0289588 A1 | 12/2005 | Kinnear | |
| 2006/0019702 A1 * | 1/2006 | Anttila et al. | 455/556.1 |
| 2006/0031883 A1 | 2/2006 | Ellis et al. | |
| 2006/0080408 A1 * | 4/2006 | Istvan et al. | 709/219 |
| 2006/0117341 A1 * | 6/2006 | Park | 725/34 |
| 2006/0190336 A1 | 8/2006 | Pisaris-Henderson et al. | |
| 2006/0253584 A1 | 11/2006 | Dixon et al. | |
| 2006/0259924 A1 | 11/2006 | Boortz | |
| 2006/0294259 A1 | 12/2006 | Matefi et al. | |
| 2007/0022459 A1 | 1/2007 | Gaebel et al. | |
| 2007/0115389 A1 * | 5/2007 | McCarthy et al. | 348/461 |
| 2007/0217436 A1 | 9/2007 | Markley | |
| 2007/0244760 A1 | 10/2007 | Bodnar et al. | |
| 2008/0115169 A1 | 5/2008 | Ellis et al. | |
| 2008/0147497 A1 | 6/2008 | Tischer | |
| 2008/0163305 A1 * | 7/2008 | Johnson et al. | 725/58 |
| 2008/0263578 A1 | 10/2008 | Bayer et al. | |
| 2008/0313671 A1 | 12/2008 | Batrouny et al. | |
| 2008/0313691 A1 | 12/2008 | Cholas et al. | |
| 2009/0030802 A1 | 1/2009 | Plotnick et al. | |
| 2009/0132346 A1 | 5/2009 | Duggal et al. | |
| 2009/0187939 A1 | 7/2009 | LaJoie | |
| 2009/0210899 A1 | 8/2009 | Lawrence-Apfelbaum et al. | |
| 2009/0319379 A1 | 12/2009 | Joao | |
| 2009/0320059 A1 | 12/2009 | Bolyukh | |
| 2010/0175084 A1 * | 7/2010 | Ellis et al. | 725/32 |
| 2010/0251304 A1 | 9/2010 | Donoghue | |
| 2010/0251305 A1 | 9/2010 | Kimble et al. | |
| 2011/0015989 A1 | 1/2011 | Tidwell et al. | |
| 2011/0016479 A1 | 1/2011 | Tidwell | |
| 2011/0016482 A1 | 1/2011 | Tidwell et al. | |
| 2011/0103374 A1 | 5/2011 | Lajoie et al. | |

OTHER PUBLICATIONS

Open Cable™ Specification entitled "*Enhanced TV Binary Interchange Format* 1.0" OC-SP-ETV-BIF1.0-I06-110128 dated Jan. 28, 2011, 408 pages.

* cited by examiner

Select personal viewing schedules

| | COMBINED | MOM | DAD | JEN | GABRIEL | Tty |

Friday July 29 12:23p

Today
| 12p-1 | CNN | LOU DOBBS MONEYLINE | INFO | CANCEL | AIRING |
| 3p-5:30 | GOLF | THE CHAMPIONS TOUR | INFO | CANCEL | SCHED |
| 6p-6:30 | CNBC | MARKETWATCH | INFO | CANCEL | REMIND |
| 8p-10:30 | HBO | TERMINATOR II | INFO | CANCEL | CONFLICT | ← 429

Tomorrow- July 30
| 12p-1 | CNN | NEWSDAY | INFO | CANCEL | SUBSCR |
| 2p-4:30 | FOX | NFL- TAMPA VS. CHICAGO | INFO | CANCEL | SUBSCR |
| 6p-6:30 | ESPN | PRO BOWLING | INFO | CANCEL | SCHED |

SCHEDULING TRIGGER APPARATUS AND METHOD

CROSS-REFERENCE TO RELATED APPLICATIONS

This application is a continuation-in-part application of prior U.S. patent application Ser. No. 11/386,110, filed on Mar. 22, 2006, which is a continuation application of prior U.S. patent application Ser. No. 10/948,271, filed on Sep. 22, 2004, which claims the benefit of U.S. Provisional Patent Application No. 60/505,274, filed on Sep. 23, 2003, all of which are incorporated herein by reference in their entirety.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present invention relates to content delivery and telecommunications.

2. Description of Related Art

Various methods of delivering media content such as video to end users or consumers are known in the prior art. For example, when the consumer requests television services (such as from a cable, satellite, or terrestrial network service provider), the service provider generally installs a host or terminal device, such as a set-top box (STB), that has access to the media content at the consumer's premises. The service provider (e.g., MSO) delivers the content over the various channels subscribed by a particular user, as determined by a network or other content source, such as for example delivering movies for Home Box Office (HBO) to paying subscribers via the cable network and STB. These services are provided for a fee, such as a monthly cable subscription fee.

So-called "pay-per-view" (PPV) systems allow the user to pay for movies or other content on an as-needed basis. While there may be a fee associated with maintaining the PPV capability, the bulk of the fees are charged for user-selected viewings of particular content items.

Similarly, "on-demand" (OD) systems allow the user to view a movie or other content without adhering to a specific schedule; i.e., when the viewer wants to watch the movie, and not only when it is broadcast or made available for download at the discretion of the MSO or network operator. On-demand functionality may also be coupled with PPV, such that the user is charged for each on-demand session as opposed to on a running subscription basis.

In order to increase subscriber awareness (and viewership) of the delivered content, networks will broadcast so-called "promotions" for these events. A promotion might include, for example, a short clip or compilation of scenes from the event, constructed so as to increase viewer interest. These promotions are often frequently interspersed with the channel's other programming (such as during breaks between programs), and may be disposed within the programming schedule so as to occur at predetermined times where their efficacy is considered greatest. For example, a promotion might include a brief video trailer with associated audio content of a movie which has the same actors, or similar theme/genre, to that just viewed by the subscriber.

Alternatively, these promotions may include small animated or static graphics (and sometimes associated audio) disposed in a visible but largely non-intrusive region of the viewer's display, which briefly promote a given event or series of events. As a simple example, a small iconic basketball may briefly dribble across the lower portion of the viewer's display region, followed by the words "NBA Finals on XYZ TV July 25 at 8:00 pm EST" or the like.

As implied above, another particular function of these promotions is to alert the user as to the date and time that the event would be aired or otherwise be made accessible. A viewer of such promotional broadcasts then may proceed through a series of complex steps to schedule a viewing of the promoted event. For example, the owner of a VCR or digital video recorder (DVR) may program the recording device to record the promoted event at the specified date and time, and to then play the recording back later.

Similarly, a satellite or cable viewer may access a menu or electronic program guide (EPG), locate the promoted event on the menu, and set the system to play, record or remind the viewer of the event when it occurs.

SUMMARY

In one general aspect, alerting a user of a scheduled event on a network includes transmitting a promotion to a first consumer premises equipment ("CPE"), the promotion being associated with event scheduling metadata, and causing the event scheduling metadata to be transmitted from the first CPE to a second CPE based on a selection of the promotion at the first CPE. A reminder message is transmitted from the second CPE to the first CPE based on the event scheduling metadata.

The reminder message is transmitted from the second CPE to the first CPE via the network with the transmission including wirelessly transmitting the reminder message from the second CPE to the network, and/or from the network to the first CPE. Alternatively, the reminder message is transmitted directly from the second CPE to the first CPE. Delivery of an alert may be activated based on the reminder message, where the alert is an audio or visual alert, further including time, date, and channel data. The network is a cable or satellite television network. The reminder message is transmitted prior to the scheduled event.

In another general aspect, a content delivery system includes a content delivery network, a first CPE, and a second CPE. The content delivery network further includes a network transmitter that transmits a scheduled event and a promotion associated with event scheduling metadata. The first CPE further includes a first receiver that receives the promotion from the network and further also receives a reminder message. The first CPE also includes a first user interface that delivers the promotion to a user, receives a selection of the promotion from the user, and delivers an alert to the user based on the reminder message. The first CPE also includes a first transmitter that transmits the event scheduling metadata based on the selection. The second CPE includes a second receiver that receives the event scheduling metadata, an application that activates delivery of the scheduled event from the network based on the event scheduling metadata, and a second transmitter that transmits the reminder message based on the event scheduling metadata.

The first CPE and/or the second CPE may be wireless CPEs, such as mobile wireless CPEs. Alternatively, the first CPE may be a mobile wireless CPE, and the second CPE may be a digital set-top box. Prior to the scheduled event, the second transmitter transmits the reminder message, the first receiver receives the reminder message, and the first user interface delivers the alert.

In another general aspect, a CPE includes a receiver configured to receive a promotion associated with event scheduling metadata from a network, and to receive a reminder message. The CPE also includes a user interface configured to permit input of a selection of the promotion from the user, and further configured to deliver a reminder to the user based on the reminder message. The CPE also includes a transmitter configured to transmit the event scheduling metadata based on the selection.

In another general aspect, a CPE includes a receiver configured to receive event scheduling metadata from a network, and an application configured to activate delivery of a scheduled event from the network based on the event scheduling metadata. The CPE also includes a transmitter that transmits a reminder message based on the event scheduling metadata.

In another general aspect, alerting a user of a scheduled event on a network includes transmitting to a CPE a promotion associated with event scheduling metadata, and storing the event scheduling metadata at the CPE based on a selection of the promotion. Delivery of an alert based is activated based on the event scheduling metadata.

In another general aspect, a content delivery system includes a content delivery network and a CPE. The content delivery network further includes a network transmitter that transmits a scheduled event and a promotion associated with event scheduling metadata. The CPE further includes a receiver that receives the promotion from the network, and a user interface that delivers the promotion to a user and receives a selection of the promotion from the user. The CPE also includes a storage device that stores the event scheduling metadata based on the selection, and an application that activates delivery of an alert and the scheduled event from the network based on the event scheduling metadata.

In another general aspect, a CPE includes a receiver that receives a promotion associated with event scheduling metadata from a network, and a user interface that delivers the promotion to a user and receives a selection of the promotion from the user. The CPE also includes a storage device that stores the event scheduling metadata based on the selection, and an application that activates delivery of an alert and the scheduled event from the network based on the event scheduling metadata.

In another general aspect, a method of accomplishing delivery of a scheduled event on a network includes associating a promotion code with event scheduling metadata, and causing the event scheduling metadata to be transmitted to a second CPE based on the promotion code being input at a first CPE. Delivery of the scheduled event from the network to the second CPE is activated based on the event scheduling metadata.

The promotion code and/or the event scheduling metadata may be transmitted to the first CPE. The event scheduling metadata may be transmitted from the first CPE to the second CPE, either directly from the first CPE to the second CPE or via the network. The promotion code may be received from the first CPE and the event scheduling metadata may be transmitted based on the received promotion code.

In another general aspect, a content delivery system includes a content delivery network, a first CPE, and a second CPE. The content delivery network further includes a network transmitter that transmits a scheduled event and associates a promotion code with event scheduling metadata. The first CPE further includes a first user interface that inputs a promotion code from a user, and a transmitter that transmits the promotion code or the event scheduling metadata associated with the promotion code. The second CPE further includes a second CPE receiver that receives the promotion code or the event scheduling metadata, and an application that activates delivery of the scheduled event from the network based on the event scheduling metadata associated with the promotion code.

The first CPE may include a first CPE receiver, and the network may transmit the promotion code and the event scheduling metadata associated with the promotion code to the first CPE receiver. The first CPE may transmit the promotion code or the event scheduling metadata associated with the promotion code directly to the second CPE, or via the network. The network may receive the promotion code from the first CPE and transmit the event scheduling metadata to the second CPE based on the promotion code. The first CPE may be a mobile wireless CPE, and the second CPE may be a digital set-top box. The network may be a cable or satellite television system network.

In another general aspect, accomplishing delivery of a scheduled event on a network includes associating a promotion code with event scheduling metadata, and activating delivery of the scheduled event at a wireless CPE based on the promotion code being input at the CPE.

The promotion code and event scheduling metadata may be transmitted to the CPE and the promotion code may be sent from the CPE.

In another general aspect, a content delivery system includes a content delivery network and a CPE. The content delivery network further includes a network transmitter that transmits a scheduled event and associates a promotion code with event scheduling metadata. The CPE further includes a user interface that receives a promotion code from a user, and a receiver that receives the event scheduling data associated with the promotion code. The CPE also includes an application that activates delivery of the scheduled event from the network based on the event scheduling metadata associated with the promotion code.

In another general aspect, a CPE, includes a user interface that receives a promotion code from a user, and a receiver that receives event scheduling data associated with the promotion code. The CPE also includes an application that activates delivery of a scheduled event from a network based on the event scheduling metadata associated with the promotion code.

In another general aspect, accomplishing delivery of coinciding scheduled events on a network includes transmitting first and second promotions to a first CPE, the first and second promotions being associated with first and second event scheduling metadata for the first and second coinciding scheduled events, respectively. The first and second event scheduling metadata are transmitted from the first CPE to a second CPE based on a selection of the first and second promotions at the first CPE, delivery of the first scheduled event from the network is activated at the second CPE based on the first event scheduling metadata, and a user-initiated interrupt request to interrupt delivery of the first scheduled event is received. Delivery of a list of the first and second coinciding scheduled events is activated based on the first and second event scheduling metadata and the interrupt request, a user selection of the second scheduled event is received, and delivery of the second scheduled event from the network is activated based on the user selection and the second event scheduling metadata.

Activating delivery of the first scheduled event may includes tuning the second CPE to an appropriate channel, and/or activating delivery of the second scheduled event may include tuning the second CPE to an appropriate channel.

In another general aspect, a content delivery system includes a content delivery network, a first CPE, and a second CPE. The content delivery network further includes a network transmitter that transmits first and second coinciding scheduled events and first and second promotions associated with first and second event scheduling metadata for the first and second coinciding scheduled events, respectively. The first CPE further includes a first receiver that receives the first and second promotions from the network, a first user interface that delivers the first and second promotions to a user and receiving a selection of the first and second promotions from the user, and a first transmitter that transmits the first and second event scheduling metadata based on the selection of the first and second promotions, respectively. The second CPE further includes a second receiver that receives the first and second event scheduling metadata, and an application that activates delivery of the first scheduled event from the network based on the first event scheduling metadata, and that activates delivery of a list of the first and second coinciding scheduled event based on the first and second event scheduling metadata and a user-initiated interrupt request to interrupt delivery of the first scheduled event. The application also activates delivery of the second scheduled event based on a user selection of the second scheduled event and the second event scheduling metadata. The second CPE also includes a second user interface that receives the interrupt request and the user selection.

The network may be a cable or satellite television system network, where the scheduled event may be a movie, a play, a sporting event, a show, a news broadcast, a pay-per-view ("PPV") event, or an instructional video, and where the event scheduling metadata may include time, date, and channel data.

In another general aspect, a CPE includes a receiver that receives first and second event scheduling metadata for first and second coinciding scheduled events, respectively, and an application that activates delivery of the first scheduled event from a network based on the first event scheduling metadata, and that activates delivery of a list of the first and second coinciding scheduled event based on the first and second event scheduling metadata and a user-initiated interrupt request to interrupt delivery of the first scheduled event. The application also activates delivery of the second scheduled event based on a user selection of the second scheduled event and the second event scheduling metadata. The CPE also includes a second user interface that receives the interrupt request and the user selection.

In another general aspect, accomplishing delivery of coinciding scheduled events on a network includes transmitting first and second promotions to a CPE, the first and second promotions being associated with first and second event scheduling metadata for first and second coinciding scheduled events, respectively. The first and second event scheduling metadata is stored at the CPE based on a selection of the first and second promotion at the CPE, delivery of the first scheduled event from the network is activated at the CPE based on the first event scheduling metadata, and a user-initiated interrupt request to interrupt delivery of the first scheduled event is received. Delivery of a list of the first and second coinciding scheduled events is activated based on the first and second event scheduling metadata and the interrupt request, a user selection of the second scheduled event is received, and delivery of the second scheduled event from the network is activated based on the user selection and the second event scheduling metadata.

In another general aspect, a content delivery system includes a content delivery network and a CPE. The content delivery network further includes a network transmitter that transmits first and second coinciding scheduled events and first and second promotions associated with first and second event scheduling metadata for the first and second coinciding scheduled events, respectively. The CPE further includes a receiver that receives the first and second promotions from the network, and a user interface that delivers the first and second promotions to a user and receives a selection of the first and second promotions from the user, and that further receives a user-initiated interrupt request to interrupt delivery of the first scheduled event and a user selection of the second scheduled event. The CPE also includes a storage device that stores the first and second event scheduling metadata based on the selection of the first and second promotions, respectively, and an application that activates delivery of the first scheduled event from the network based on the first event scheduling metadata, and that activates delivery of a list of the first and second coinciding scheduled event based on the first and second event scheduling metadata and the interrupt request. The receiver further activates delivery of the second scheduled event from the network based on a user selection of the second scheduled event and the second event scheduling metadata.

In another general aspect, a CPE further includes a receiver that receives the first and second promotions from a network, the first and second promotions associated with first and second event scheduling metadata for first and second coinciding scheduled events, respectively, and a user interface that delivers the first and second promotions to a user, and that receives a selection of the first and second promotions from the user. The user interface further receives a user-initiated interrupt request to interrupt delivery of the first scheduled event and a user selection of the second scheduled event. The CPE also includes a storage device that stores the first and second event scheduling metadata based on the selection of the first and second promotions, respectively, and an application that activates delivery of the first scheduled event from the network based on the first event scheduling metadata, and that activates delivery of a list of the first and second coinciding scheduled event based on the first and second event scheduling metadata and the interrupt request. The application further activates delivery of the second scheduled event from the network based on a user selection of the second scheduled event and the second event scheduling metadata.

In another general aspect, accomplishing delivery of scheduled events on a network includes transmitting first and second promotions to a first CPE, the first and second promotions being associated with first and second event scheduling metadata for the first and second scheduled events, respectively, and causing the first and second event scheduling metadata to be transmitted from the first CPE to a second CPE based on a selection of the first and second promotion at the first CPE. A viewing list is built based on the selection of the first and second promotion, and delivery of the first scheduled event or the second scheduled event is activated based on the viewing list.

The viewing list may be built by the first CPE, the second CPE, and/or the network. The viewing list may be viewed at the first CPE or the second CPE, where viewing the viewing list may further include viewing the first event scheduling metadata or the second event scheduling metadata. The viewing list may be altered at the first CPE or the second CPE, where altering the viewing list may further include prioritizing the first scheduled event or the second scheduled event, deleting the first scheduled event or the second scheduled event, and/or altering the first event scheduling metadata or the second event scheduling metadata.

In another general aspect, a content delivery system includes a content delivery network, a first CPE, and a second CPE. The content delivery network further includes a network transmitter that transmits first and second scheduled events and first and second promotions associated with first and second event scheduling metadata for the first and second scheduled events. The first CPE further includes a first receiver that receives the first and second promotions from the network, a first user interface that delivers the first and second promotions to a user and receives a selection of the first and second promotions from the user, and a first transmitter that transmits the first and second metadata based on the selection of the first and second promotions, respectively, or a viewing list based on the selection of the first and second promotions. The second CPE further includes a second receiver that receives the first and second event scheduling metadata or the viewing list, and an application that activates delivery of the first scheduled event or the second scheduled event based on the viewing list.

The first CPE user interface may further build the viewing list based on the selection of the first and second promotions. The application may further build the viewing list based on the selection of the first and second promotions. The content delivery network may further include a network host, the network host building the viewing list based on the selection of the first and second promotions.

In another general aspect, a CPE includes a first receiver that receives first and second promotions from a network, the first and second promotions associated with first and second event scheduling metadata for first and second scheduled events. The CPE also includes a first user interface that delivers the first and second promotions to a user, and that receives a selection of the first and second promotions from the user. The first user interface further builds a viewing list based on the selection of the first and second promotions. The CPE also includes a first transmitter that transmits the viewing list.

In another general aspect, accomplishing delivery of scheduled events on a network includes transmitting first and second promotions to a CPE, the first and second promotions being associated with first and second event scheduling metadata for first and second coinciding scheduled events, respectively, and storing the first and second event scheduling metadata at the CPE based on a selection of the first and second promotion at the CPE. A viewing list is built based on the selection of the first and second promotion, and delivery of the first scheduled event or the second scheduled event is activated based on the viewing list.

In another general aspect, a content delivery system includes a content delivery network and a CPE. The content delivery network further includes a network transmitter that transmits first and second scheduled events and first and second promotions associated with first and second event scheduling metadata for the first and second scheduled events. The CPE further includes a receiver that receives the first and second promotions from the network, and a user interface that delivers the first and second promotions to a user and receives a selection of the first and second promotions from the user. The user interface further builds a viewing list based on the selection of the first and second promotions. The CPE also includes a storage device that stores the viewing list, and an application that activates delivery of the first scheduled event or the second scheduled event based on the viewing list.

In another general aspect, a CPE includes a receiver that receives the first and second promotions from a network, the first and second promotions associated with first and second event scheduling metadata for first and second scheduled events, and a user interface that delivers the first and second promotions to a user and receives a selection of the first and second promotions from the user. The user interface further builds a viewing list based on the selection of the first and second promotions. The CPE also includes a storage device that stores the viewing list, and an application that activates delivery of the first scheduled event or the second scheduled event based on the viewing list.

In another aspect, a method of accomplishing delivery of media content on a network is disclosed. In one embodiment, method comprises: transmitting a promotion to a first device based at least in part on selection metrics associated with a first user of the first device; causing the metadata file to be transmitted from the first device to a second device based on a selection of the promotion at the first device; responsively updating the selection metrics based on the selection of the promotion; causing a reminder message to be transmitted from the second device to the first device before the prescribed time but after the act of transmitting of the promotion, based on the event scheduling metadata; and causing the linear media content associated with the promotion to be transmitted to the second device at the prescribed time based on the selection of the promotion at the first device and without intervention of the second device.

In another embodiment, method comprises: receiving a promotion at a first consumer premises equipment ("CPE"); receiving a scheduling metadata file associated with said scheduled event at said first CPE; transmitting only said event scheduling metadata file from said first CPE to a second CPE in communication therewith; receiving at said first CPE prior to a scheduled event a reminder message directly from said second CPE; and transmitting a request from said first CPE to said network.

Other features and advantages will be apparent from the following description, including the drawings and the claims.

BRIEF DESCRIPTION OF THE DRAWINGS

FIGS. 4a-4j are graphical representations of exemplary screen displays.

FIGS. 4k-4p are graphical representations of an alternate user interface without reminder functionality.

DETAILED DESCRIPTION

Figure 1:
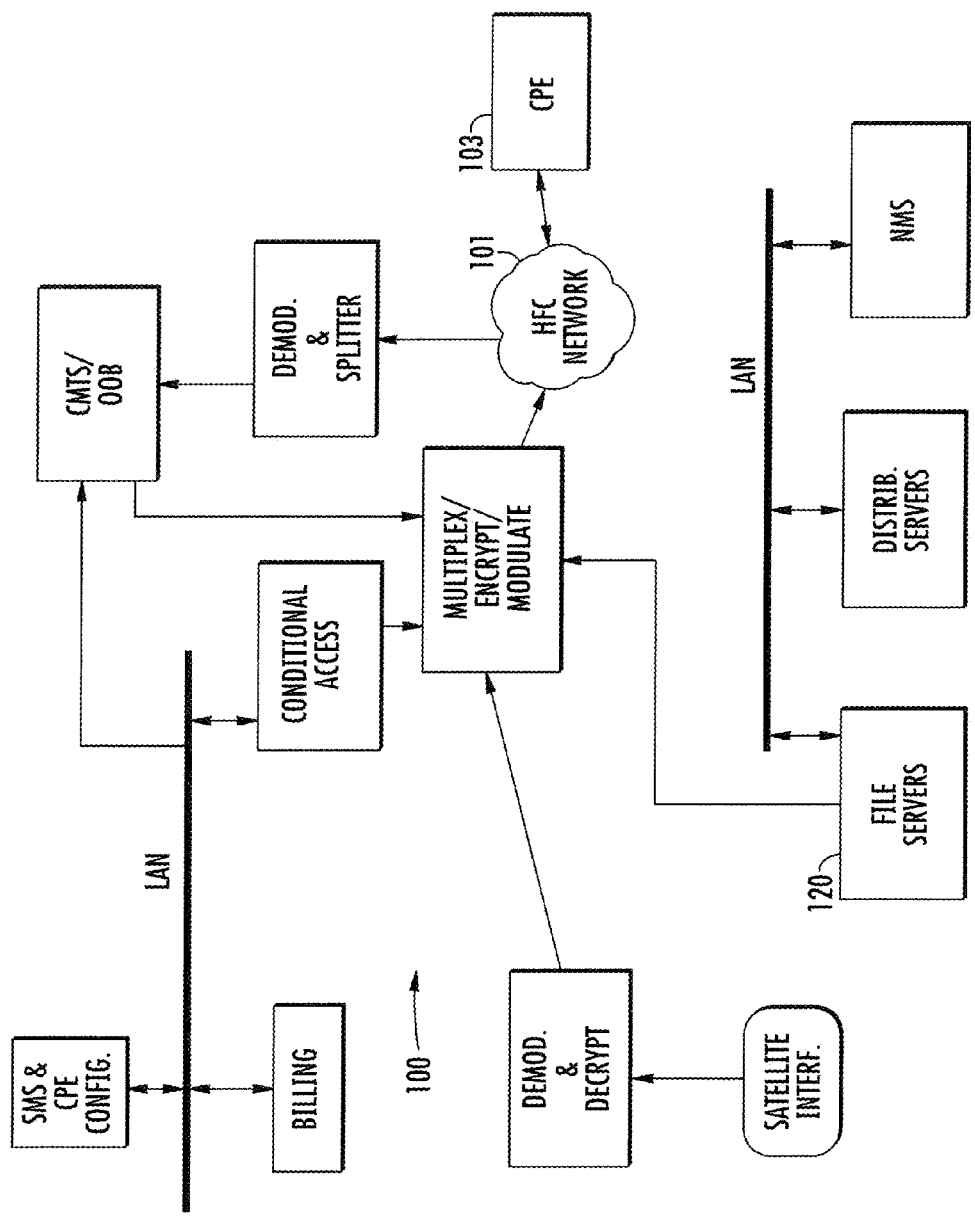
FIG. 1 is a graphical representation of an exemplary embedded scheduling trigger services network architecture.

Reference is now made to the drawings where like numerals refer to like parts throughout.

As used herein, the terms "client device", "end user device" and "Consumer Premises Equipment (CPE)" include, but are not limited to, personal computers (PCs) and minicomputers, whether desktop, laptop, or otherwise, digital set-top boxes such as the Motorola DCT2XXX/5XXX and Scientific Atlanta Explorer 2XXX/3XXX/4XXX/8XXX series digital devices, personal digital assistants (PDAs) such as the Apple Newton®, "Palm®" family of devices, handheld computers, personal communicators such as the Motorola Accompli devices, J2ME equipped devices, cellular telephones, or any other device capable of interchanging data with a network.

Similarly, the term "host device" refers to any type of electronic equipment located within a consumer's or a user's premises and connected to or communicating with, either directly or indirectly, a network.

As used herein, the term "application" refers generally to a unit of executable software that implements theme-based functionality. The themes of applications vary broadly across any number of disciplines and functions (such as promotions, e-commerce transactions, brokerage transactions, home entertainment, interactive TV, gaming, e-commerce, e-mail, chat, instant messaging and home shopping), and one application may have more than one theme. The unit of executable software generally runs in a predetermined environment; for example, the unit could include a downloadable Java Xlet™ that runs within the JavaTV™ environment.

As used herein, the term "computer program" is meant to include any sequence or human or machine cognizable steps which perform a function. Such a program may be rendered in virtually any programming language or environment including, for example, C/C++, Fortran, COBOL, PASCAL, assembly language, markup languages (e.g., HTML, SGML, XML), and the like, as well as object-oriented environments such as the Common Object Request Broker Architecture (CORBA), Java™ (including J2ME and Java Beans) and the like.

As used herein, the term "head-end" refers generally to a networked system controlled by, for example, a multiple systems operator (MSO) that distributes programming to MSO clientele using client devices. Such programming may include any information source/receiver including, for example, free-to-air TV channels, pay TV channels, interactive TV, and the Internet. DSTBs may take on any configuration, and can be retail devices meaning that consumers may or may not obtain their digital Set-top box (DSTB) from the MSO exclusively. Accordingly, it is anticipated that MSO networks may have client devices from multiple vendors, and these client devices will have widely varying hardware capabilities.

As used herein, the term "DOCSIS" refers to any of the existing or planned variants of the Data Over Cable Services Interface Specification, including, for example, DOCSIS versions 1.0, 1.1 and 2.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), Reconfigurable Compute Fabrics (RCFs), ASICs, and digital signal processors (DSPs). The hardware of such devices may be integrated onto a single substrate (e.g., a silicon "die"), or distributed among two or more substrates. Furthermore, various functional aspects of the processor may be implemented solely as software or firmware associated with the processor.

As used herein, the term "event" refers to any one or more occurrences that correspond to one or more other coordinates. These coordinates may be absolute or relative in nature as well. For example, a coordinate might include a given time of day (e.g., 0500:00:00 GMT), or alternatively may be the occurrence of a precursor event (e.g., the completion of a certain program or generation of a signal). The coordinates need not be predetermined, such as, for example, where the "event" includes achieving a certain criterion or condition (e.g., viewership of a given program reaches a certain threshold level). In the context of broadcast or delivered media, for example, an event may include a movie, a play, a sporting event, a show, a news broadcast, a PPV event, an instructional video, or any other type of programming material.

As used herein, the term "promotion" refers generally to any type of activity that sponsors, advertises, or otherwise promotes one or more events. Promotions may be, without limitation, broadcast for contemporaneous viewing by one or more users, stored for situational or anecdotal call-up, or even created in real time or near-real time. Promotions may be, for example, visual and/or audible in nature, or may even appeal to one or more other senses of the viewers.

As used herein, the term "user interface" refers to any type of mechanism or means by which one or more users may interface with a component or software application including, without limitation, GUIs (e.g., visible menus or icons), auditory UIs (e.g., speech recognition or TTS), and manual UIs (e.g., tactile equipment such as FFKs, touch screens, buttons and Braille interfaces). Other interfaces, such as those sensing a biophysical parameter of the user (e.g., retinal position or electropotential) are also contemplated to fall within this term.

Overview—

A scheduling "trigger" or other artifact may be associated with a promotion of an event to be broadcast or made available in the future. This trigger or artifact invokes a desired response, such as tuning to a prescribed channel or causing recording to start, within the viewer's CATV receiver (e.g., DSTB) coincident with or related to the promoted event. This allows the user to readily schedule an event for viewing or recording without having to program recorders or navigate difficult-to-use menu structures or program guides. The embedded or associated triggers (E/ATs) within the promotion allow the viewer to control their viewing or recording of the promoted event without having to take further actions. This approach also allows the viewer to schedule viewing of the event when their interest is highest; i.e., at the time of the promotion. Stated differently, the more work that the viewer must perform to view the promoted event, the less likely they are to view or record the event. Similarly, the greater the elapsed time between the promotion for the event and the event itself, the less likely the viewer is to remember the date and time of the event. These two pitfalls may be avoided by providing a solution which is both extremely simple to use, and which allows effectively instantaneous scheduling or commitment of the user to watch the promoted event.

The use of triggers can be readily implemented within existing or legacy hardware environments, such as within existing cable system set-top boxes. Download of the embedded/associated trigger application to (or other installation of software modifications of) these devices can be readily accomplished using existing infrastructure and no hardware changes.

One or more scheduling triggers may be embedded within the promotional broadcast or content distribution, or associated therewith. The trigger, when delivered and made cognizable to the end user, may be in any form, including, for example, a visual form, an audible form, a tactile form, or a combination thereof. For example, the trigger user interface (UI) may include an icon or menu that is visually displayed during or coincident with the promotional broadcast or use of the distributed content. In one variant, the menu including a user-navigable visual menu disposed along, e.g., one edge of the viewers screen when the viewer is tuned to the promotional broadcast. The embedded/associated trigger functionality can also be made user-configurable, such as where the user can customize the operation of the trigger for their own personal preferences.

In another variant, an audible prompt or promotion is played. The audible prompt may be, for example, a short audio clip describing the event and time, as well as instructions for selecting the event or scheduling a reminder.

The promotion also may include an electronic mail message or another message, such as one containing a "Flash" multimedia module that is sent to the CPE or another client device (such as a PC or handheld computer) that utilizes the local application environment to present the promotional material to the user.

A client portion of the embedded/associated trigger and scheduling application (e.g., Cable Select, described below) can also be used to provide cross-platform functionality, such as between a mobile wireless device and the user's CPE.

Description of Exemplary Implementations

Exemplary implementations are now described in detail. It should be noted that, while the exemplary implementations are described primarily in terms of a consumer digital television (DTV) environment used with a hybrid fiber coax (HFC) cable bearer network such as that of FIG. 1, the described systems and techniques may be readily adapted to other types of network environments and media devices, including high definition television (HDTV) or NTSC (analog) based systems.

Hence, the described techniques are considered "content agnostic" in that the interactive functionality provided is generally not limited to one type of format of content or media delivery architecture. Internet or even peer-to-peer (P2P) architectures (as opposed to purely server-client architectures), including both those with a more centralized directory server, and those with a completely peer-to-peer functionality, may also be employed with proper adaptation. For example, one peer may maintain a library of different videos or movies which may be made available according to a pre-determined schedule; these "events" may be subject to embedded trigger associations within related promotions (whether on the same network or a different one) as described below.

As used herein, the term "network" is meant to also include internets (such as the Internet), intranets, LANs, WANS, MANs, and the like, each of which may include one or more portions of the network either individually or collectively. Furthermore, the bearer network architecture or topology is in no way limited, and may include, for example, traditional network systems, FTTC/FTTH, satellite networks, millimeter wave systems, optical networks, and ATM, IEEE-802.3, X.25, 802.11, Token Ring, SONET, Frame Relay, and 3G/GPRS topologies, as well as various associated protocols such as TCP/IP, HTTP, FTP, WAP, RTP/RTCP, SIP, H.323, LDAP, IGMP, and the like.

While described generally in the context of a consumer (i.e., home) end user domain, the described techniques may be readily adapted to other types of environments (e.g., commercial/enterprise and government/military). For example, the described techniques could be used to efficiently distribute (and associate) promotions and content across multiple users at a hotel, residential apartment/condominium complex, governmental installation or national laboratory. As one particular example, "promotions" for an upcoming intra-company CATV broadcast by a Company CEO (whether delivered over the CATV network or another medium such as the Company's e-mail server) can include triggers by which the user can schedule to be reminded in advance and view the event when it is broadcast.

Furthermore, while aspects of the described implementations use an application referred to as "Cable Select", this term is purely for illustration. The techniques are in no way limited to cable systems, or to the particular implementations described.

Network and Head-End Architecture—

Referring now to FIG. 1, one exemplary network and head-end architecture 100 includes typical head-end components and services including a billing module 102, a subscriber management system (SMS) and CPE configuration management module 104, a cable-modem termination system (CMTS) and an OOB system 106, as well as LAN(s) 108 and 110. The LANs allow the various components of the system to be in data communication with one another. While a bus LAN topology is illustrated, any number of other arrangements, such as ring or star, also may be used. The head-end configuration depicted in FIG. 1 is a high-level, conceptual architecture; each MSO may have multiple head-ends deployed using one or more custom architectures.

In the typical HFC network, information is carried across multiple channels. Thus, the head-end is adapted to acquire the information for the carried channels from various sources. Typically, the channels being delivered from the head-end 100 to the CPE 103 ("downstream") are multiplexed together in the head-end and sent to neighborhood hubs (not shown). Hence, the architecture 100 of FIG. 1 further includes a multiplexer, encrypter, and modulator (MEM) 112 coupled to the HFC network 101 adapted to "condition" content for transmission over the network.

The distribution servers 102 are coupled to the LAN 110, which provides access to the MEM 112 and network 101 via one or more file servers 120.

Audio and video are provided in each downstream (in-band) channel. To communicate with the head-end, the CPE 103 uses the out-of-band (OOB) or DOCSIS channels and associated protocols. The OCAP 1.0 specification provides for networking protocols both downstream and upstream. To distribute files and applications to the CPE 103, the system may include elements configured as data and object carousels that may be sent in both the in-band and OOB channels. Such carousels are well known, and include file directories containing files that are repetitively sent downstream using a protocol such as that provided by OCAP. These carousels may be disposed in any number of different configurations within the head-end or its associated entities, including for example the local/remote file servers 120 of FIG. 1. Other head-end mechanisms for file/application distribution also may be used.

The promotion delivery system provides the ability to deliver promotions from the network architecture 100, via the HFC network 101, to the CPE 103. Such delivery of the promotions to the CPE 103 can take the form of, e.g., "push" or "pull" transmissions. The push form is initiated by, e.g., the cable head (such as where the promotion is included with the content within the multiplexed transport stream), while the pull form is indirectly initiated by the CPE 103, such as when an OD or PPV session is pulled by the CPE using an upstream communication. These CPE pulls can also be selectively used, such as where only a pull of a certain genre of content (e.g., reality movies) will initiate a certain type of promotion, the latter being targeted or coupled in some logical fashion to the pulled content.

A third party push or pull can be initiated by another network entity which is neither the server (head-end) or CPE, such as, for example, an Internet website or an authorization entity. For example, a consumer may sign up for a service to receive, for example, promotions or even content automatically upon the occurrence of an event such as a new video release (push), at periodic or variable intervals (e.g., "new releases this month"), or even in response to a structured or unstructured user query (pull). The delivery service may be free, pay subscription based (including PPV), or otherwise.

The described techniques are in no way limited to the more traditional "broadcast" of promotions at predetermined dates and times.

Exemplary CPE—

Figure 2:
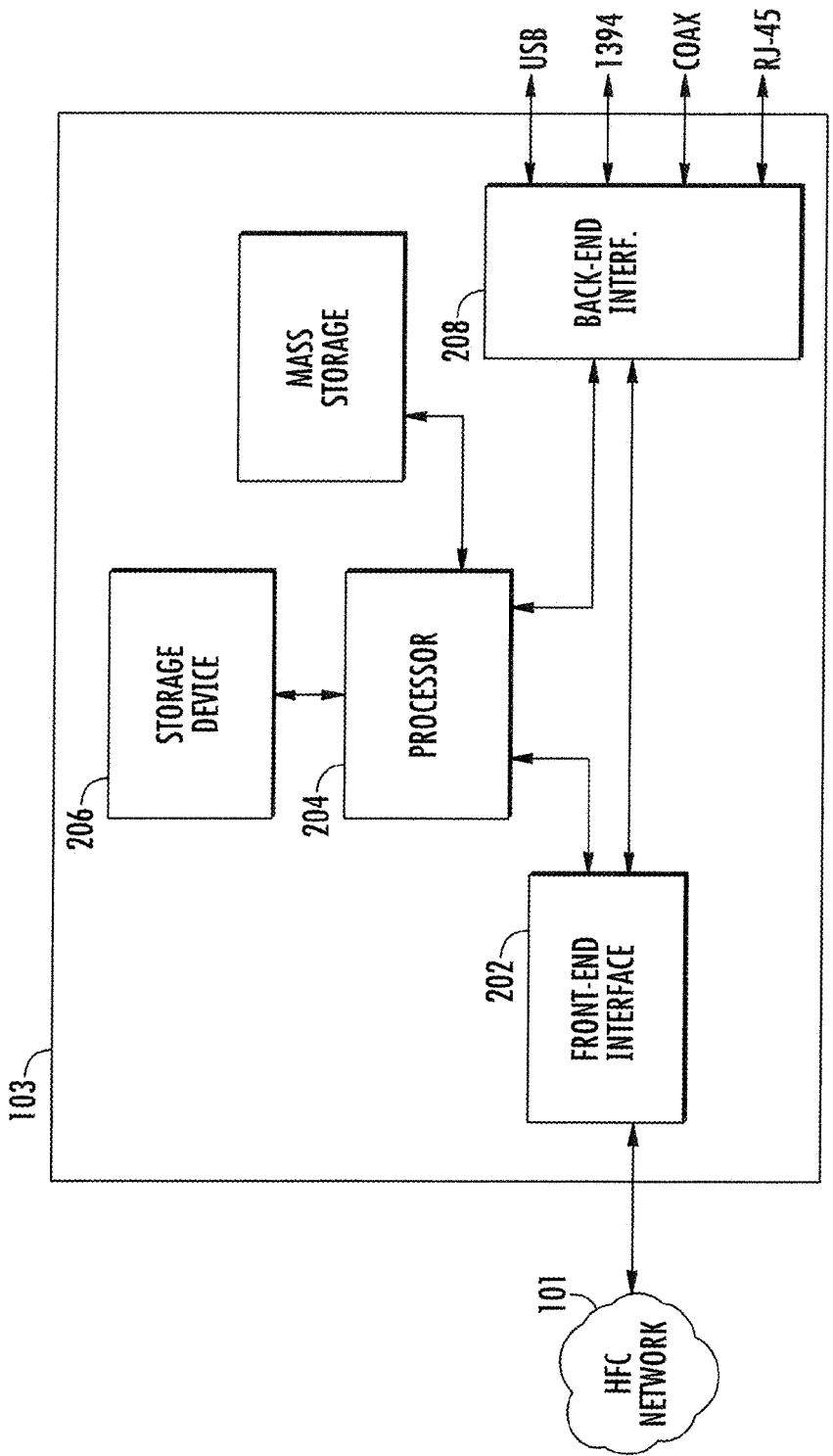
FIG. 2 is a functional block diagram illustrating an exemplary CPE (i.e., DSTB) for use within the scheduling trigger services architecture of FIG. 1.

FIG. 2 illustrates an exemplary CPE 103 with embedded trigger capability. The device 103 includes an OpenCable-compliant embedded system having an RF front end 202 (including modulator/demodulator) for interface with the HFC network 101 of FIG. 1, digital processor(s) 204, storage device 206, and interfaces 208 (e.g., video/audio interfaces, IEEE-1394 "Firewire", USB, or serial/parallel ports) for interfacing with other end-user apparatus such as personal electronics, televisions, computers, or network hubs/routers. Examples of physical ports or interfaces which may be used with the CPE 103 include, for example, wired RJ-45 connectors, RJ-11 connectors, RJ-21 connectors, coaxial cable connectors, BNC connectors, and the like, as well as wireless couplings such as, for example, IRDA, optical, IEEE Std. 802.11, Bluetooth 2.4 GHz, and 802.15 (e.g., OFDM UWB) or TM-UWB. For example, the front end interface 202 of the DSTB may include a satellite based receiver disposed within a DSTB (or vice versa), or alternatively an HFC coaxial cable connection, while the "back end" interface 208 includes a Bluetooth or IEEE Std. 802.11(b) multi-device RF interface.

The storage device 206 may include, for example, RAM (e.g., SDRAM, EDO, DDR) which may also be supplemented with a mass storage device 207 such an EIDE Ultra-ATA, Ultra SCSI, or SATA HDD, or a flash memory device.

The CPE 103 may also be equipped as required with any other external communication devices that may be needed to communicate with external entities (such as non-MSO servers or the like, as described below). For example, a modem (such as, e.g., the Silicon Laboratories ISOmodem embedded modem family currently used in the TiVo Series2 technology platform) may be used in the CPE 103. Such modems provide the analog connection that allows the CPE 103 to connect to the third-party servers to update television program guide data and receive regular service updates, for example.

The systems and techniques may be used in conjunction with or readily incorporated into "legacy" host devices (e.g., set-top boxes that currently reside in cable networks), thereby enhancing the flexibility of existing cable system infrastructures. Many of these legacy host devices do not have integrated wireless interfaces. A separate device, such as a wireless dongle, must usually be provided to give wireless capability to the legacy host device, such as where the user wishes to interface with the E/AT application via a wireless remote control unit.

Other components which may be used within the device include RF tuner stages, various processing layers (e.g., DOCSIS MAC or DAVIC OOB channel or MPEG) as well as media processors (such as for MPEG2 decoding) and other specialized SoC or ASIC devices.

The CPE 103 of FIG. 2 is also provided with an OCAP-compliant monitor application and Java-based middleware that manages the operation of the device and applications running thereon. Myriad different devices and software architectures may be used consistently with the described embedded/associated trigger application, and the device of FIG. 2 is merely exemplary. For example, different middleware (e.g., MHP, MHEG, or ACAP) may be used in place of the OCAP middleware.

The Open Cable Applications Platform (OCAP) is a software programming interface standard that provides a common middleware environment for applications to execute on different types of consumer devices that may be connected to different cable systems. A high level block diagram of an exemplary OCAP software "stack" from the perspective of a host device includes various functional blocks at the top of the stack, including the "Monitor Application", Electronic Program Guide (EPG), Video-on-Demand Application, and any other applications (such as the described embedded/associated trigger application (E/AT)) deployed in a particular network. These applications are run on top of a software layer called the "Execution Engine" and interface to the Execution Engine using the well known OCAP APIs.

The CPE 103 also includes certain software applications or "Native Applications" that do not run within the Execution Engine, but directly run on top of the Operating System/Middleware for the host device. Native Applications are typically written for a particular hardware configuration of the CPE 103 and for stringent interactivity requirements, and are represented by the lowest layer of the protocol stack. Examples of such Native Applications may include management of front panel functionality, remote control interaction, games, and the like. While the E/AT may be designed to run at the top of the protocol stack, it may also feasibly be rendered as a Native Application running independent of the Execution Engine. Other software architectures are also possible. However, implementation via the higher layers allows the E/AT to be substantially platform-agnostic, thereby allowing its use in a more heterogeneous hardware environment (such as where multiple types of CPE are used within the same network).

The details of a particular cable network 100 that are relevant for the software to interoperate are also implemented via the protocol stack, and includes a collection of protocols and behavior needed to support a particular cable network including (but not limited to) (i) an application protocol for communicating between application components that are distributed from the CPE 103 to other network locations, (ii) a cable network protocol for audio/video and data including application and System Information, and (iii) host support for CableCard interface and host resources.

HFC Network Applications—

Promotions and embedded/associated triggering are well suited to a variety of network architectures, including the described HFC network. Advantageously, MSOs are currently implementing cable and data systems based on standards that will allow the distribution of applications from various different sources. Several types of applications are contemplated in these environments, including: (i) MSO applications, (ii) content provider applications, and (iii) manufacturer applications. Each of these application types represents a potential avenue for distribution and implementation of the E/AT application.

MSO applications are developed specifically for or by the MSO. These types of applications may have established protocols for communication with a counterpart application (component) running in a head-end. MSO applications are typically delivered to the CPE 103 or user-device using the OOB or DOCSIS channels, yet can be delivered using other means such as an in-band channel.

Content provider applications are developed for the content provider, such as a network (e.g., NBC, CBS, and CNN) These applications may or may not communicate with a server counterpart component depending on (i) the relationship between the MSO and the network to run the server counter-part in their head-end(s), and (ii) the use of a standardized protocol (such as, for example, H.323 and SIP). These applications can be delivered to the CPE 103 using either an in-band or OOB channel.

Manufacturer resident applications will come bundled with the CPE/user device, or are otherwise installed or downloaded for installation by the user (such as via CD-ROM or Internet download). These applications may or may not communicate with a server counterpart component depending on whether an agreement is made with the MSO to run the server counter-part in their head-end(s), or a standardized protocol is used for communications.

The E/AT application previously described may be developed as an MSO application running on the CPE, with a counterpart process at the head end or a third party server. This avoids any protocol translation or compatibility issues, since the application components are designed from the outset to be interoperable. However, the E/AT applications may be developed as a content provider or CPE manufacturer resident application if desired. Industry standard formats and protocols may be employed to assure effectively "universal" compatibility between application components existing in the user's domain (e.g., CPE) produced by one vendor or source, and corresponding head-end or server components operated by the MSO or a content provider.

Metadata—

The embedded triggers may include metadata associated with the relevant promotion(s). Generally speaking, "metadata" includes extra data not typically found in (or at least not visible to the users of) the network. This metadata may be validated against relevant specifications if desired, such as those provided by CableLabs. For each promotion having other content with which the trigger is to be associated, a metadata file is generated that specifies which events are associated with that promotion. For example, a simple "one-association" promotion would include metadata that associates the promotion with one subsequent event (e.g., a movie). The basic metadata might specify the date, GMT or other start time reference, duration, and channel, and can be rendered in human-readable form if desired. Additional and/or different metadata content may be used, such as, for example, providing user rating data for particular events, cost and subscription options (if applicable). The metadata information can be packaged in a prescribed format such as a markup language (e.g., XML). The metadata may also include "graphics" metadata, such as that described in U.S. Patent Application Publication No. 20040177383 to Martinolich, et al. published Sep. 9, 2004 and entitled "Embedded graphics metadata", incorporated herein by reference in its entirety. International standards for audiovisual metadata, such as the ISO/IEC "Multimedia Content Description Interface" (also referred to as MPEG7), or the TV-Anytime Forum's "Specification Series: S-3 on Metadata", could also be used as the basis for the metadata.

The metadata may be delivered with the promotion (such as for example via codes embedded in the transport stream indicating, for example, the location and duration of the metadata), or alternatively may be delivered via a separate communication channel (or the same channel yet at a different time). The metadata may also be resident on the CPE, such as via a periodic update. The metadata (files) may also be encrypted, and encryption algorithm information may also be included.

Metadata may also be used for conveying and formatting upstream data, such as that sent by the E/AT application upstream to the head-end servers, or to a third party networked server. This information might include, e.g., profile data on the various users at the premises, CPE profiling data, data on the uses or effectiveness of certain promotions, maintenance and error-related data.

In addition, other implementation approaches may be used. For example, the transmitting source (e.g., head-end) could transmit a code within the promotion or associated therewith that identifies the promoted event, in lieu of a larger-bandwidth file. This code may then be decoded at the receiver and cross-referenced to a database of events that have previously been (or will in the future be) received, or against a database at a third party entity (e.g., a network server or on a DVD).

The transmission system may include both an activate trigger and a deactivate trigger (e.g., embedded or associated metadata) to control the times during which the E/AT functionality is displayed by the CPE 103 on its associated display unit. For example, the activate signal may be sent at the beginning of the promotional piece; and the deactivate signal may be sent at the end. Either one or both may also be sent at other times. For example, the activate signal may not be sent until a certain point in the promotion is reached. Similarly, the deactivate signal may be sent before the promotion ends or at some point after it ends.

Embedded/Associated Triggering Software Architectures

Referring now to FIGS. 3a-3e, various different software (and related hardware) architectures are described. These architectures are merely illustrative.

Figure 3:
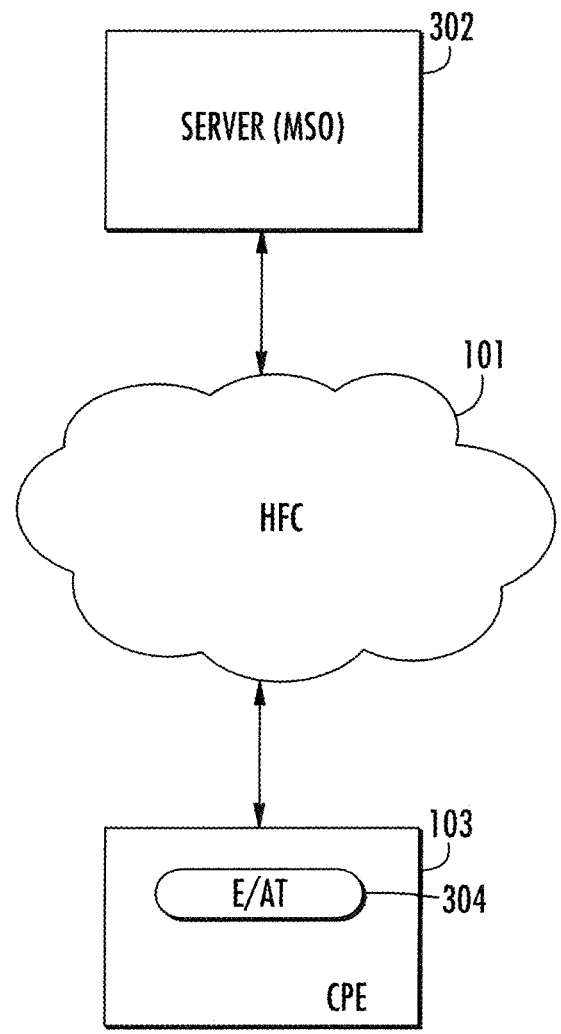
FIGS. 3-3e are functional block diagrams of various network hardware/software architectures.

FIG. 3 illustrates a simple architecture including a network head-end server 302 or other similar entity which is in signal communication with the HFC network 101. One or more client devices or CPE 103 are also in communication with the network 101, such as where the CPE is located at the customer's premises. Running on the CPE 103 is an embedded/associated trigger application 304 of the type described elsewhere herein. The application may include an MSO application, content provider application, or CPE manufacturer's application. These may be delivered, for example, in-band, out-of-band ("OOB"), via Internet, or via other media such as CD-ROM or DVD. The application is stored in the form of a object-oriented computer program resident within the CPE (such as for example on its HDD, or in RAM), and is configured to interact with the operating system/ middleware environment of the CPE 103 as previously discussed with respect to FIG. 2. The application utilizes data or metadata embedded in or associated with a given promotion streamed or transmitted from the head end of the network, such as by the MSO. Since there is no head-end portion of the E/AT application 304, the application is largely "stand alone", and only receives data/metadata (such as via the "triggered" promotion included within the in-band transport stream, or alternatively via an OOB channel) in order to provide the scheduling and triggering functionality. All records and files associated with the application and triggers, such as the user profiles, records of all scheduled triggers, and promotion performance data, are retained at the CPE and stored locally (at least temporarily) for subsequent use or delivery.

Figure 3A:
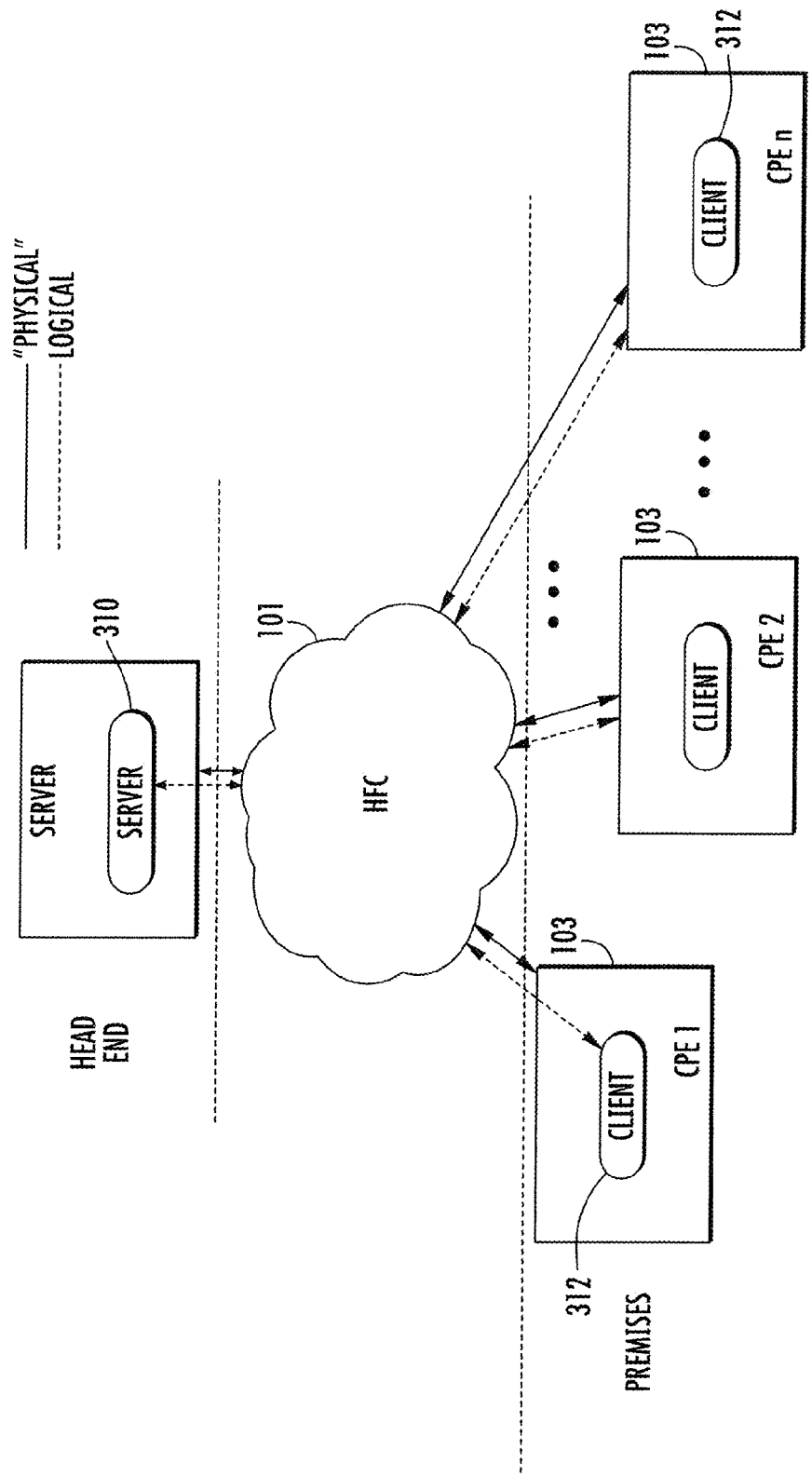

As shown in FIG. 3a, another exemplary architecture includes a distributed application (DA) environment of the type well known in the software arts. For example, the apparatus and methods described in U.S. Pat. No. 6,687,735 to Logston, issued Feb. 3, 2004 and titled "Method and apparatus for balancing distributed applications", incorporated herein by reference in its entirety, may be used. The server portion 310 at the head end communicates with the client portion(s) 312 at each CPE 103 via in-band or OOB "physical" channels, thereby forming logical channels between the head-end process and the CPE portion 312. The term "physical channel" may include, for example, both wired and wireless modes, whether packet-switched, circuit switched, or otherwise.

In operation, the client portion 312 interfaces with the server portion 310 in order to transfer the requisite scheduling and trigger information, such as in the form of a metadata file. This information may be embedded within the promotional content itself, streamed or delivered alongside of the promotional content (such as via separate metadata file), delivered OOB, or "pulled" from the server (portion) by the client portion upon receipt of the promotion at the CPE. For example, the promotion may contain data such as in a preamble indicating that it is "E/AT enabled", thereby invoking the CPE to extract the transmitted metadata necessary to perform the scheduling trigger (or pull it from the head-end).

The communication established between the client and server portions of the E/AT DA can be used to transmit information to the head end, such as anecdotal or statistical data gathered regarding the use of the E/AT functionality within a given premises (e.g., how many times per given time period it is used, which members of the premises use it most and when, and responses to individual promotions). The upstream communications can also be used to transmit CPE profiling data to the head-end process. For example, the apparatus and methods disclosed in U.S. Patent Application Publication No. 20020032754 to Logston, et al. published Mar. 14, 2002 and entitled "Method and apparatus for profiling in a distributed application environment", incorporated herein by reference in its entirety, may be used to perform CPE profiling if desired. Such profiling may be useful, for example, in determining CPE capabilities before in-band or OOB delivery of the E/AT application.

Figure 3B:
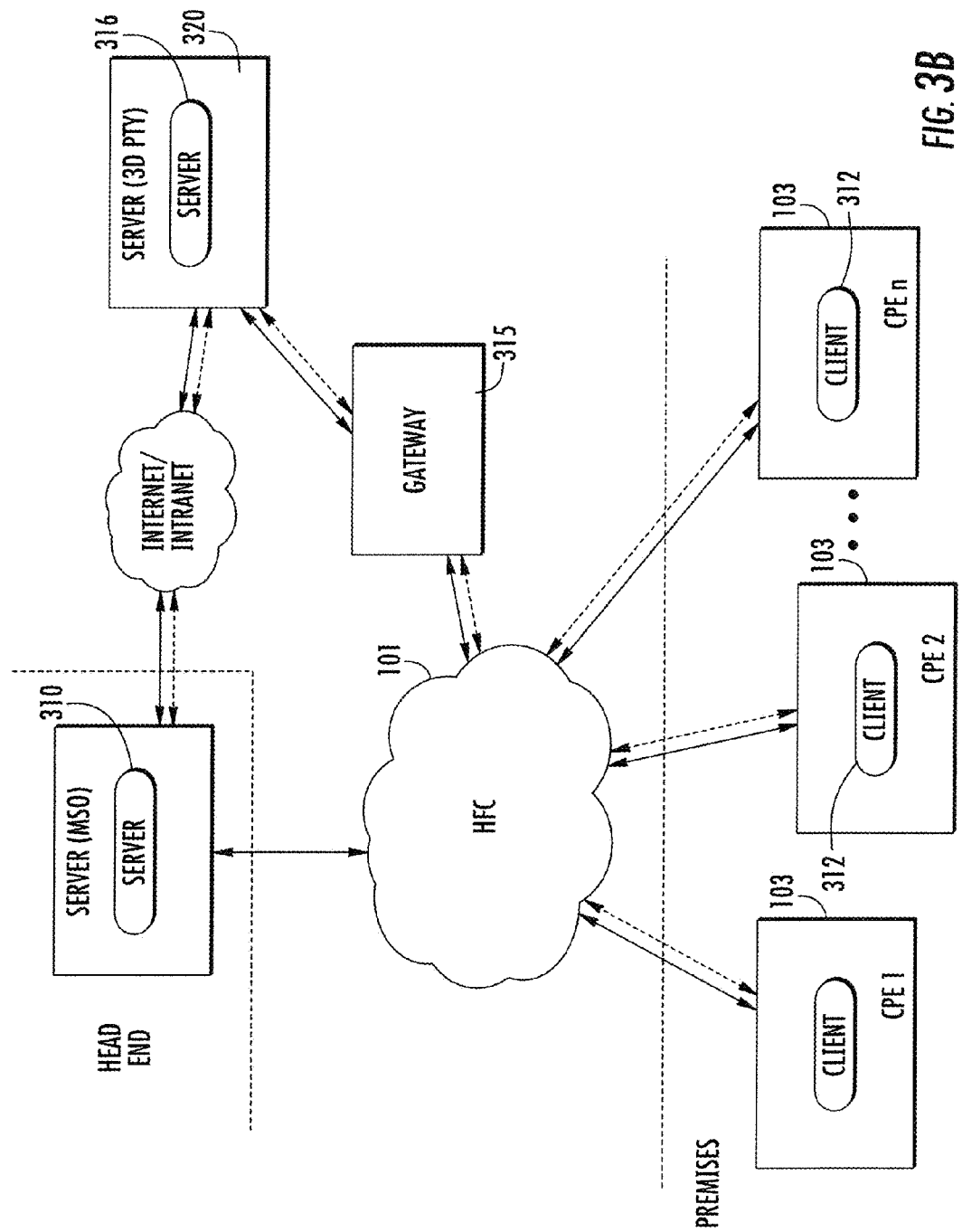

FIG. 3b illustrates another software/hardware architecture in which a third-party server 320 is used to provide some or all of the required E/AT functionality. The server 320 includes another server portion 316 of a DA that is in logical communication with the client portions 312 of the CPE 103. This server may include, for example, a third-party Internet server. Its server portion 316 can be used to receive information regarding, e.g., scheduled triggers from the CPE (i.e., it can act as a remote scheduling entity that can receive viewer trigger requests, and then invoke them within the CPE at the appropriate time either directly via the gateway 315 to the HFC network 101, or indirectly via a communication to the head-end server process 310 via a connecting internet/intranet or other such communication channel). This latter approach relieves the CPE form having any storage capability and associated trigger logic, i.e., the CPE need not store a file or other data to compare to a local time reference or the like to "remember" when to tune the receiver portion of the CPE to the appropriate channel. Rather, the remote entity (or head-end process) determines and invokes the trigger at the desired date/time.

The server portion 316 can also actively and dynamically configure the promotional content delivered to the CPE 103. For example, where a given promotion run at time t produces a very high response or performance rate (as determined by, e.g., upstream communications sent from the CPE to the third-part server 320 upon scheduling by the various viewers of the promotion), the server process 316 can generate a recommended or target package for the MSO or network for subsequent promotions. This process can be nearly instantaneous, such that promotions scheduled for delivery within minutes or even seconds of the time=t promotion can be adjusted (e.g., swapped out for others, shortened or lengthened) effectively on-the-fly. This process is seamless to the viewers.

The server portion 316 can also (or alternatively) be used to manage more ancillary functions if desired, such as receiving data and statistics from one or more CPE 103, and then compiling and forwarding reports to the relevant MSO or other entity (e.g., content development network such as CNN and NBC). For example, in one business model, the MSOs or networks subscribe or pay for each trigger that carries E/AT functionality. Part of this subscription/payment is a follow-up report from the third-party service (e.g., Cable Select) that indicates, for example, which promotions were most successful, demographics of likely viewers, and promotional effectiveness ratings (PERs) (see FIG. 4j).

Figure 3C:
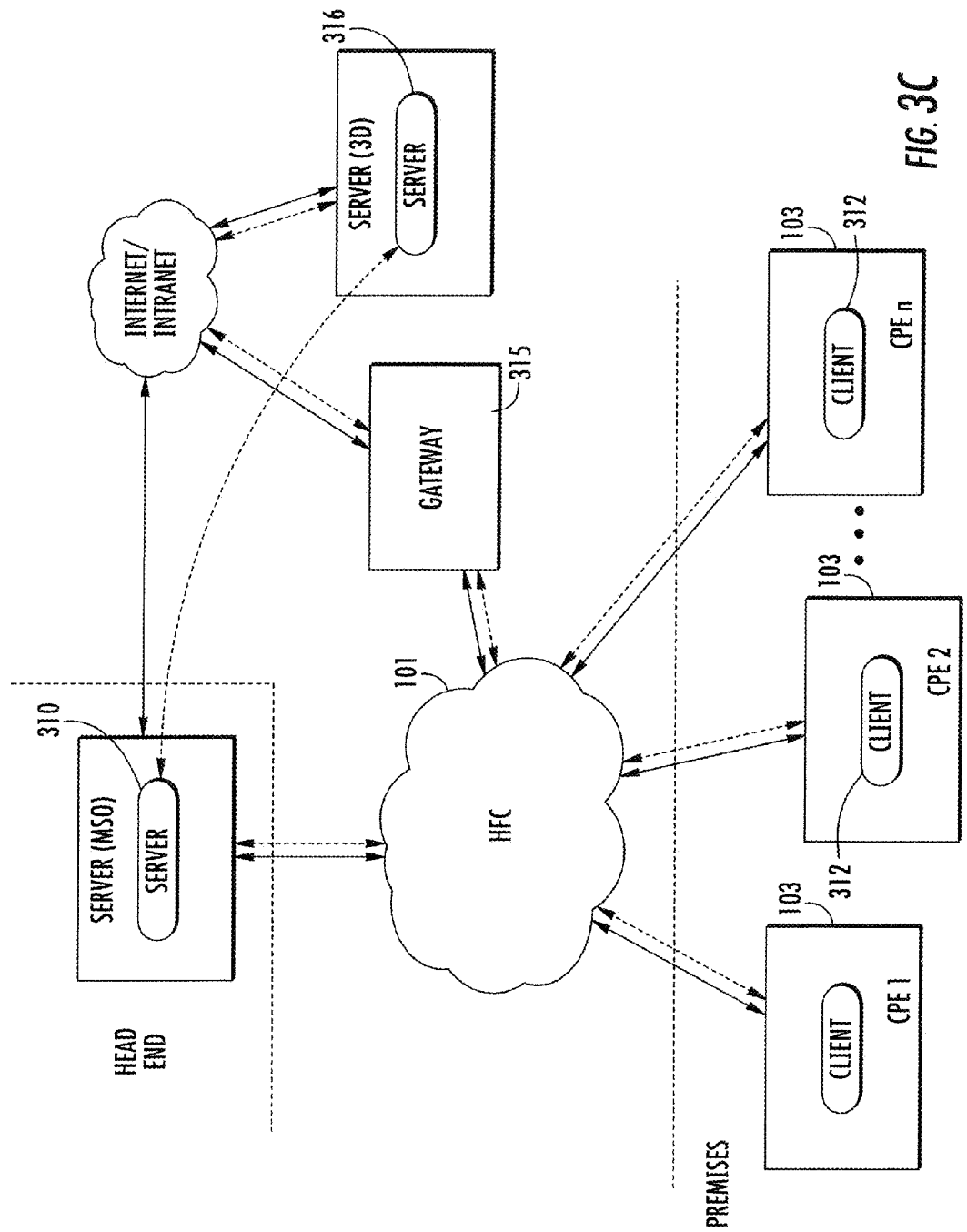

FIG. 3c shows yet another alternate architecture, where the client portions 312 of the CPE are in communication with the third-party server process 316 via the gateway (e.g., Internet gateway) 315 and the Internet. For example, the CPE may access an internet URL via an upstream channel on the HFC network 101, and the server portion 316 then may take the required action as described above with respect to FIG. 3b. This action may also include a direct "push" of a trigger or trigger data to the CPE via the head-end server process 310.

Figure 3D:
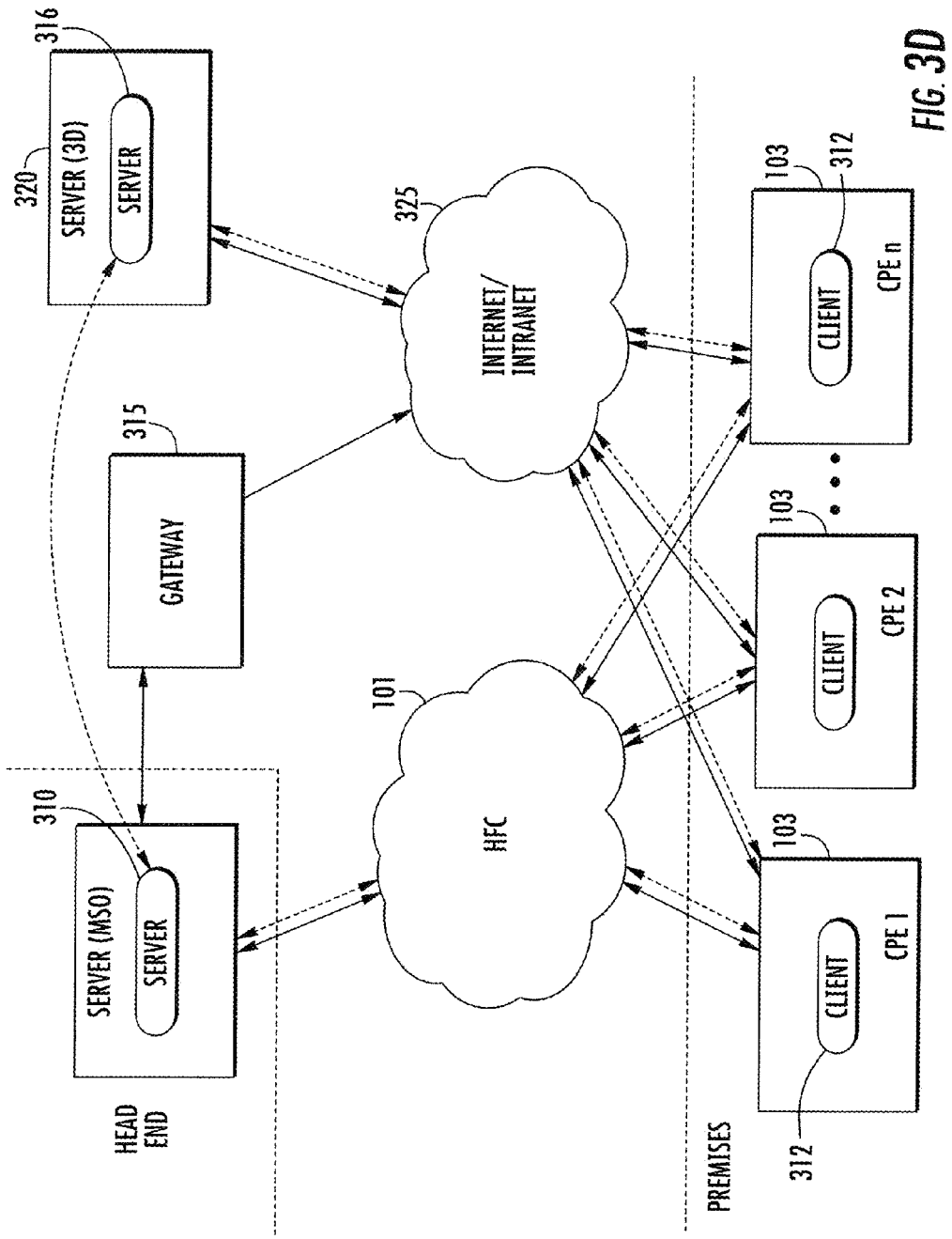

FIG. 3d illustrates an implementation in which the internet/intranet 325 is used as an external interface for the CPE 103, such as a DSL line, T1 line, ISDN, dial-up/modem, satellite link, or even a cable modem from another MSO. Specifically, rather than route upstream communications via an OOB or similar HFC network channel, the client portion 312 of the CPE 103 sends communications upstream via the internet or intranet 325 to the third-party server 320 and its server process 316. This server process 316 can be in communication with that of the MSO server, as shown via the internet/intranet and associated MSO gateway 315, although such communications may occur via any number of different paths.

The approach of FIG. 3d allows the operation, maintenance, and function of the E/AT application and services to be substantially divorced from the HFC network and MSO. In this way, the third-party service is completely stand-alone; the internet/intranet can be used as the forward or downstream channel for EA/T application and upgrade delivery, and reverse or upstream communications to the server 320 with viewer (or CPE) profiling information and promotion response data. If desired, the third party server 320 can also be used to schedule and remotely invoke tuning of the CPE or other required actions needed to support the trigger scheduling and function.

Figure 3E:
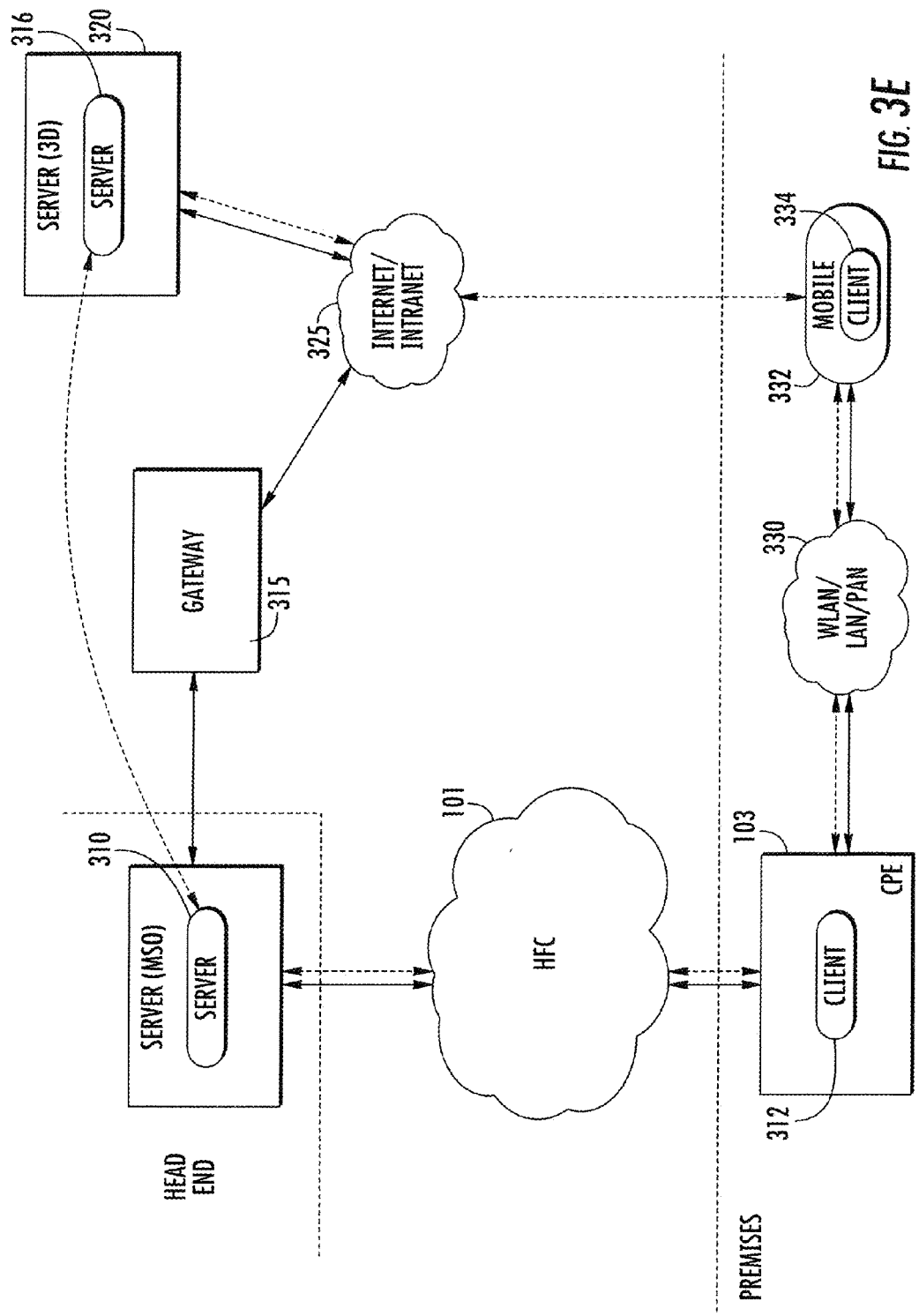

FIG. 3e illustrates an implementation of the software/hardware architecture in which a mobile unit 332 (e.g., PDA, handheld, "smart" phone, and laptop) is used to interface with the internet/intranet 325 and also with the CPE 103. The mobile unit 332 includes an E/AT client portion 334 of the DA that permits the mobile unit 332 to select and schedule events for the CPE 103 based on promotions received over the internet/intranet 325. For example, a webcast that is transmitted via the internet 325 may include a short promotion for a program carried on one of the networks carried by the MSO. The local or mobile client portion 334 of the DA (e.g., a Java-based application running on the O/S of the mobile unit 332) allows the user to invoke and select the promoted event for scheduling via the mobile unit. This "proxy" scheduling data/metadata is transmitted to the client portion 312 of the CPE 103 (such as via a LAN, WLAN, or PAN 330), where the data is treated just as if the client portion 312 had generated the data. For example, a metadata file with the trigger information may be stored on the CPE, and may initiate tuning of the CPE receiver to the appropriate channel (and other E/AT functions such as on-screen warnings before tuning as shown in FIG. 4f).

Promotion and Embedded/Associated Trigger Operation—

Various aspects of the delivery of the promotion(s), and the operation of the embedded/associated trigger functions, are now described in detail.

As previously discussed, the trigger-enabled promotional broadcast or content delivery may be part of a television (over-air) signal, a cable signal, a satellite signal, a multimedia stream, or any other type of communication media. It may also be used in a non-broadcast delivery mode, such as physical media (e.g., DVD or CD-ROM). The terms "promotional broadcast" and "promotion" may refer to content which is contemporaneously transmitted and delivered (e.g., an over-air or over-cable broadcast that is ephemeral in nature), as well as that which may be delayed (e.g., a PVR or on-demand delivery of content) or even recorded in a tangible medium (such as pre-coded promotions which are stored on a DSTB hard drive).

In particular implementations, the user interface (U for the E/AT functionality includes a menu-driven display (see discussion of FIGS. 4a-4j below). As used, the term "menu" refers to any cognizable data or information structure which allows the selection of at least one option. Menus may be visual in nature (such as the traditional computer pull-down menu or on-screen television programming menu), or alternatively may be rendered in an audio or other format (e.g., akin to the way one navigates a voice-mail system, whether by entry of tactile information (e.g., using a visual menu and button commands) or verbal information (e.g., through a speech recognition algorithm). Speaker identification (i.e., identification and authentication of a user) may also be used for certain situations, such as a TV-commerce, PPV, on-demand, or e-commerce transaction requiring action by the user. For example, scheduling delivery of an "R-rated" or adult PPV event to a premises can be safeguarded by requiring an adult within the premises to authenticate the order using a stored voiceprint spoken at the time of event scheduling/selection. The menu may be of any type (e.g., pull-down, bar or window) and may include a broad variety of optional selections. For example, the menu may include a "Schedule Viewing" option and a "Set Reminder" option as two of its features available to the user. Additional functionality such as reminder parameters (e.g., audible/visual reminder, frequency of reminding as the event approaches, "snooze" functionality, and e-mail reminders) may also be provided.

In one implementation, when the viewer selects a scheduling option (e.g., "Schedule Viewing") of the menu, his/her receiver may automatically be set to change to or automatically tune to the channel on which the promoted event is scheduled to air at its scheduled date and time.

If the user instead selects reminder option (e.g., "Set Reminder"), their receiver may issue one or more reminders before invoking any tuning action. For example, in one simple variant, the receiver issues a reminder at (or shortly before) the time that the promoted event is aired. The reminder may include, for example, (i) the title of the item, (ii) its start time, (iii) duration, and (iv) its channel. The reminder may also include a menu selection that automatically switches to the appropriate channel if selected (auto-tuning). In a more complex variant, the receiver issues reminders at multiple predetermined times, such as for example in the same time slot as the target event, but one week or one day before, or both, or with increasing frequency as the date/time of the scheduled event approaches.

The reminders may be channel agnostic (i.e., are generated irrespective of what channel the user is tuned to), or channel specific (i.e., are generated only when the viewer is tuned to the same channel as the scheduled event, or alternatively a prescribed set of channels determined by the user or MSO).

Alternatively, the reminders can be anecdotally determined, such as during a program that has similar content or theme to that selected by the user, irrespective of when that program may occur. For example, if a reality genre event is selected for future viewing, the reminder algorithm may identify all other reality-based programs being aired between the current time and the date/time of the scheduled event (optionally filtering those being aired on channels not available or subscribed by that particular user), and then displaying a reminder during each such program concerning the scheduled event. The logic in this approach is that one selecting an event of a particular genre for future viewing would also be likely to watch other similar genre programs. The identification of similar genre events can be readily determined via the data supporting the EPG; e.g., by performing a search for all reality programs, the latter which may be identified by a unique "class" or genre identifier for such purposes.

Note that the foregoing approaches are merely exemplary and illustrative. Numerous other reminder schemes (including variations and combinations of the foregoing) could also be used.

In addition to reminders and scheduling as previously described, an option may be included within the menu structure or other UI to have the promoted item recorded, in lieu of or in addition to the reminder(s) being given or the channel being changed for viewing at the time of the promoted event.

The embedded or associated trigger(s) may also include a "subscribe" selection for those future events that take place on more than one occasion. The selection of this option may cause the system to switch to this channel each time the particular instantiation of the event begins. For example, this subscribe functionality may be implemented based on a predetermined schedule of events, such as for a program that airs once a week. In another variant, the "subscribe" functionality can be triggered by or coupled to information which may not yet be in existence at the time of scheduling the trigger. For example, where the schedule of the NBA finals or World Series is unknown at the time of scheduling (say, before the first game is even played), the embedded trigger algorithm can be used to query (or alternatively receive in a broadcast or point-to-point mode) a remote scheduling entity, such as corresponding software process resident at the head end or service provider in a cable network, in order to obtain the necessary information to schedule the required triggers. For example, selected but uncompleted triggers can be periodically polled by the software process resident on the user's CPE or receiver, and a periodic upstream query transmitted to the relevant head-end entity or process to provide the required schedule/channel information. In response, the head end process or other entity tasked with responding can issue the requested information in a downstream in-band or OOB communication (e.g., packets), or alternatively issue a packet or sequence of packets that alert the requesting entity as to the status (e.g., "NOT AVAILABLE", "WAIT" or "CHECK BACK AT 00:00:00 GMT") when the information is not yet available. The CPE process can then periodically check back with the head-end process until the information becomes available. Alternatively, the information can simply be broadcast from the head-end downstream unsolicited, such as at periodic intervals or in carousel fashion once it becomes available.

When the requested information is received, it can be used to complete the relevant trigger(s), thereby allowing such trigger(s) to be issued at the appropriate times; e.g., to record or tune to the correct channel at the times of each subsequent game.

A broad variety of technologies may be employed to allow the viewer to make a selection from the embedded trigger(s). These include use of an existing remote control (e.g., wired or wireless IR, RF, or ultrasonic), a wired or wireless add-on device, one or more controls on the receiver itself, or even an interface to a computer system or network, such as the Internet. In one variant, the functionality contained within the user's existing remote and CPE (e.g., DSTB) are used, thereby making the selection of events from triggers seamless. In another variant, the user's DSTB or other CPE is connected to a wireless interface, such as via the IEEE-1394 or other port of the CPE, where the user can make selections remotely via a wireless device such as their PDA or handheld computer. In another variant, the CPE is connected (such as via an 802.3 or USB interface) to a PC or other computer which is adapted to allow the user to navigate and select the various features of the menu remotely. For example, the embedded trigger may be broadcast, and communicate with the remote PC so as to allow an application resident on the PC (e.g., browser window or Java Applet) to notify the user, display the menu, and allow the user to make selections which will then be transmitted back to the CPE (such as via a standard packetized protocol). In this fashion, a user working on their PC or handheld device can be alerted to an impending event without having to actually be watching their television or using their CPE directly.

Embedded triggers and reminders can be queued, such as in a storage queue or FIFO within the user's CPE or other location, for subsequent use. For example, when a reminder is issued against a scheduled trigger, and the user's CPE is not operating, the reminder can be delivered at the time when the user next operates their CPE (or PC or other connected device) much in the way that conventional e-mail is stored on a server. These reminders may be stored or queued at a remote location (e.g., a remote "reminder" server) at the head end or on the Internet, or locally within the CPE or other connected equipment. The delivery of the queued reminders or triggers can also be made subject to user control, such as by having the user select a "view stored reminders" or similar function on their remote menu.

Similarly, triggers can be delayed and/or queued as well. For example, where the user's CPE is not operational at the time a trigger is invoked, the trigger software process on the CPE can detect when the CPE is not operating, and store or recycle the trigger until the CPE is activated. Hence, when the user arrives or tunes in after a triggered event starts, the trigger stays active to immediately tune the user to the scheduled event upon commencement of their viewing activities. These "delayed triggers" can also be made configurable to the user (or even a remote head-end or other software process), such as e.g., where the scheduled event will only be triggered where >X % of the total duration of the event remains, or where no other scheduled triggers exist with overlapping time slots and that also have not yet begun. They can also be made user "permissive", such as where an affirmative action (or lack of action), such as a menu selection or "OK" by the user is required to allow the trigger to be invoked and tune the CPE to the required station at the designated time.

A trigger need not be embedded in every promotional broadcast. For example, a trigger may only be embedded in a promotional broadcast when payment for that trigger has been made, such as by a sponsor of the promoted event. In one business model (described in greater detail below), the trigger is provided on a per-use basis, such as where the MSO charges a network or other content source $X per embedded trigger. In another model (which may be used with the prior per-use model), the MSO selectively delivers triggers to one or more sub-classes of its subscribers, e.g., as a "premium" feature, or as part of a subscription service or package. The triggers may also be distributed based on demographics; i.e., in those markets, geographic areas, or strata of subscriber (based on, e.g., information or profile data obtained from that user at time of subscription or thereafter) where the most likely or frequent selection of the given trigger exists. For example, the MSO may target an embedded trigger regarding the PGA Master's golf tournament to only its "premium" customers, or those having a profile indicating income above a certain level, since these are the most likely users to select the trigger for subsequent viewing.

Note that the distribution of the triggers may be on, for example, a (i) per-trigger basis; (ii) per-time period basis (e.g., delivered only for a period of time); (iii) per-logical channel or viewer basis (i.e., delivered only to the CPE or other equipment of one or an associated group of subscribers); (iv) based on another precedent event or trigger (e.g., where a given trigger is delivered only when one or more triggers are previously delivered ("trigger mask"); and (v) as part of a contemporaneous or staggered trigger package (i.e., coordinated with one or more other related or unrelated triggers).

The trigger functionality provided by the E/AT application can also be integrated with PPV or on-demand (OD) session functionality, so that a promoted future event can be scheduled and triggered at a later time. For example, a promotion for OD movies available next month on the given content (e.g., cable) channel or service can be scheduled via the trigger, such that the user is reminded when the movies as a whole become available (say, the first of the month), and/or reminded of individual instantiations of a desired movie. So, one user may simply wish to be reminded when the new OD titles are accessible for viewing, while another user may desire to know each time a prescheduled PPV or similar event is impending. The E/AT application can also cause activation of the event, such as by initiating the OD or PPV selection process by negotiating with the head-end or other providing source to stream the content (and any ancillary applications which may be required) to the viewer at a prescribed date and time.

An "accounting" system that tracks the menu selections that are made from the embedded triggers, as well as from elsewhere, may be employed. The selections made by one or more viewers may be tabulated, analyzed, and/or delivered to one or more interested parties, such as sponsors of the promoted events or content sources (e.g., networks or studios). Among other uses of this data, the sponsors may determine which promotions and which time slots (e.g., time/day) are yielding, for example, the greatest number of "hits" or the greatest PER.

In a more sophisticated approach, the data may also be analyzed in terms of higher level or more abstract correlations, such as which demographics of user are most likely to select a given event (or events in general), correlations between the best performing time slots and user demographics, correlations to programming immediately or following the scheduled promotion trigger and/or event (e.g., to identify "carryover effect", where the users from one previous program are more likely to select the promoted event based on a trigger immediately following the previous program, as opposed to another previous program).

This information may be used by the sponsors, networks, studios, MSOs, or other entities to tailor, for example, the content, number and/or the positioning of the promotional broadcasts that remain before the event is aired. For example, if it is determined that promotions with triggers are most often selected to select a reality genre program (e.g., Survivor™), then the promotions with triggers can be selectively or preferentially disposed proximate to other reality programs in the program viewing space, such as immediately after an episode of another reality genre program. Alternatively, where a limited number of promotional slots exist, the MSOs or networks can preferentially allocate a higher percentage of the available slots to reality genre promotions (and triggers), divining that these may have a higher yield than other types of programs. The information derived from the E/AT system may also be used to schedule or allocate bandwidth, such as between high-definition (HD) and standard definition (SD) bandwidth on the downstream channels.

A viewer may also intentionally or unintentionally schedule more than a single event at the same time. The system may be configured to alert the viewer to the conflict and to allow the viewer to resolve this conflict by selecting just one of the events. Alternatively, the user can port one of the events to another device (such as one connected to the IEEE-1394 port on the back of the CPE), such as allowing a digital recording device (e.g., TiVo or another DSTB with hard drive) to record the first event, while viewing the second event in real time.

Additionally, data concerning the existence of these conflicts (and/or the resolution of them) may also advantageously be gathered from one or more viewers, and may also be provided to the sponsors or MSOs. Such information may assist these entities in determining when events should be scheduled and/or if a particular event should be rescheduled.

Data concerning whether one or more viewers actually views an event that has been scheduled may also be gathered and similarly presented to sponsors or other interested persons.

The data gathering and reporting system may be implemented in a broad variety of ways. In a cable network system, for example, the choices made by the viewer may be gathered by his receiver and transmitted back through the cable system to a central location or sub-location, such as previously discussed herein with respect to FIGS. 3a-3e. The information may be transmitted at the moment the selection is made (contemporaneous) or it may be saved in the CPE (or elsewhere) and transmitted on a periodic or other basis.

If sub-locations are used (e.g., nodes within a given network that aggregate information from a subset of the subscribers), the information from each sub-location may be sent to a central location such as a third-party server for compilation into a single database. Alternatively, in a distributed processing model, some or all of the processing or pre-processing required for the data can be performed at each sub-location/node, thereby alleviating the burden on the central node or server. The viewer's CPE 103 can even be used as a distributed processing or pre-processing node in this regard.

The data representative of the selections that are made by the viewers at the premises may include an identification of the user that made the selection (including the particular member of a family that is using the CPE); the time and date of the selection; the station and program that was being watched at the time of the selection; and demographic information about the viewer that made the selection.

As described in greater detail herein, the central or sub-location may make the data available to users (such as MSOs, networks and sponsors) in a broad variety of ways. Reports may be generated and sent electronically or on paper. The database may also be made accessible in any of a number of ways, including at an Internet website or an FTP site. Different users may be given the opportunity to request different types of reports which may then be generated and distributed accordingly. Systems for billing and receiving payments from the third parties for the triggers and/or reports that they request may also be included with the system. Various business methods for payment for the services are envisioned, including pay-per-use, subscription, and variable rates based on use.

Cross-Platform Operation—

As referenced above, another implementation allows for cross-platform/environment utilization, where the embedded or associated schedule trigger is delivered in one environment (such as on a DVD rented or purchased, or over the Internet), and correlated with an event in another environment (e.g., cable TV or satellite service). This cross-platform functionality can be implemented using a number of different schemes, including for example saving data or metadata associated with the promotion on the user's CPE (such as in a HDD) for subsequent use by the CPE in tuning to the scheduled event. Specifically, the promotion might include the necessary data for the event to be scheduled, which can then be extracted and saved onto the CPE or other device upon viewing the promotion and selecting the event (such as via the Cable Select software).

In one exemplary implementation, the E/AT application can locate the data/metadata within the media carrying the promotion (say, e.g., a DVD), extract or read it, and save it to a similar or corresponding data structure (e.g., file) on the CPE, such as via a data interface between the DVD player and the CPE. This can be accomplished by simply porting all content read or decoded off the media to the CPE, which then selectively locates the required data and generates the required file or other data structure for storage on the CPE. Alternatively, the DVD player or other such device can be provided more intelligence, such as a "client" or distributed portion of the E/AT application, which can communicate with the parent portion (on the CPE) so as to extract the required data.

For example, in one variant, the E/AT application resident on the CPE receives the extracted data via the interface port (e.g., IEEE-1394 or USB port), and generates a metadata file that is subsequently used by the E/AT application in invoking tuning to the desired event at the prescribed date and time.

In another variant, the DVD or other such device can be configured to include an application or software process which extracts the data and sends it according to a predetermined protocol to the CPE via another network entity, such as a third party internet server.

In another variant, the media (e.g., DVD) contains information such as a URL or other network address where the CPE (application) can retrieve the data/metadata that the application needs to perform the subsequent tuning. The E/AT application then accesses the URL or address via an upstream channel on the HFC network to obtain the required information. This approach has the distinct advantage of the MSO or content provider being able to update the information as required, such as where the broadcast schedule changes.

In the case of an Internet promotion (such as via a Webcast or the like), the user's PC, laptop, or handheld device can contain a distributed or client application 334 (see FIG. 3e) that interfaces with the relevant URL to obtain the necessary information for the scheduling and tuning of the event.

This information can also be e-mailed or otherwise pushed to the user as well. The client portion of the application 332 then passes this information to the CPE via any number of different data interfaces and protocols such as via a home WLAN to which both units are attached, Ethernet signaling over CAT-5 cabling, USB port, or FireWire.

An indirect or proxy "pull" can also be used, such as where the user's PC or other such device has a client portion of the application with which the user can interface, yet which acts as a proxy for the CPE portion of the application. Hence, when the user selects the promoted event for viewing on the PC (such as via their mouse), the client portion in effect asks the URL or other relevant network entity providing the trigger information to direct the information to the CPE, such as via an Internet connection provided by the MSO to the CPE, an OOB channel, or an in-band channel. This way, there need be no direct connection between the proxy (e.g., PC or laptop) and the CPE. The user need merely provide the CPE address information to the providing entity, thereby allowing the user, for example, to view a Webcast (with promotion) at work, and select the promoted event for viewing at home via the E/AT client portion on their work PC.

Methods of Doing Business—

Figure 4:
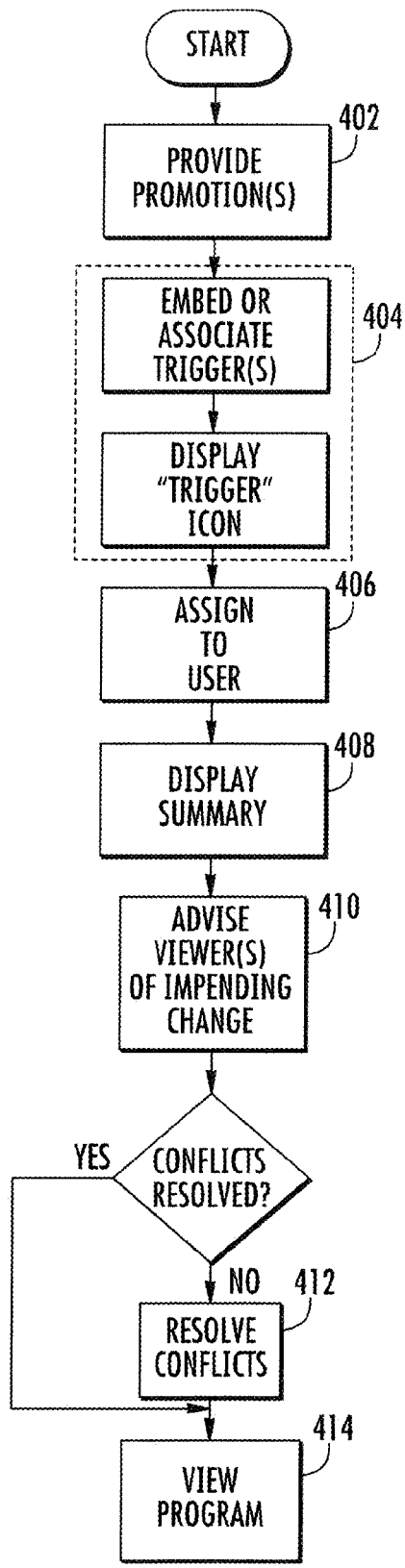
FIG. 4 is a logical flow diagram illustrating an exemplary method of doing business.
Figure 4A:
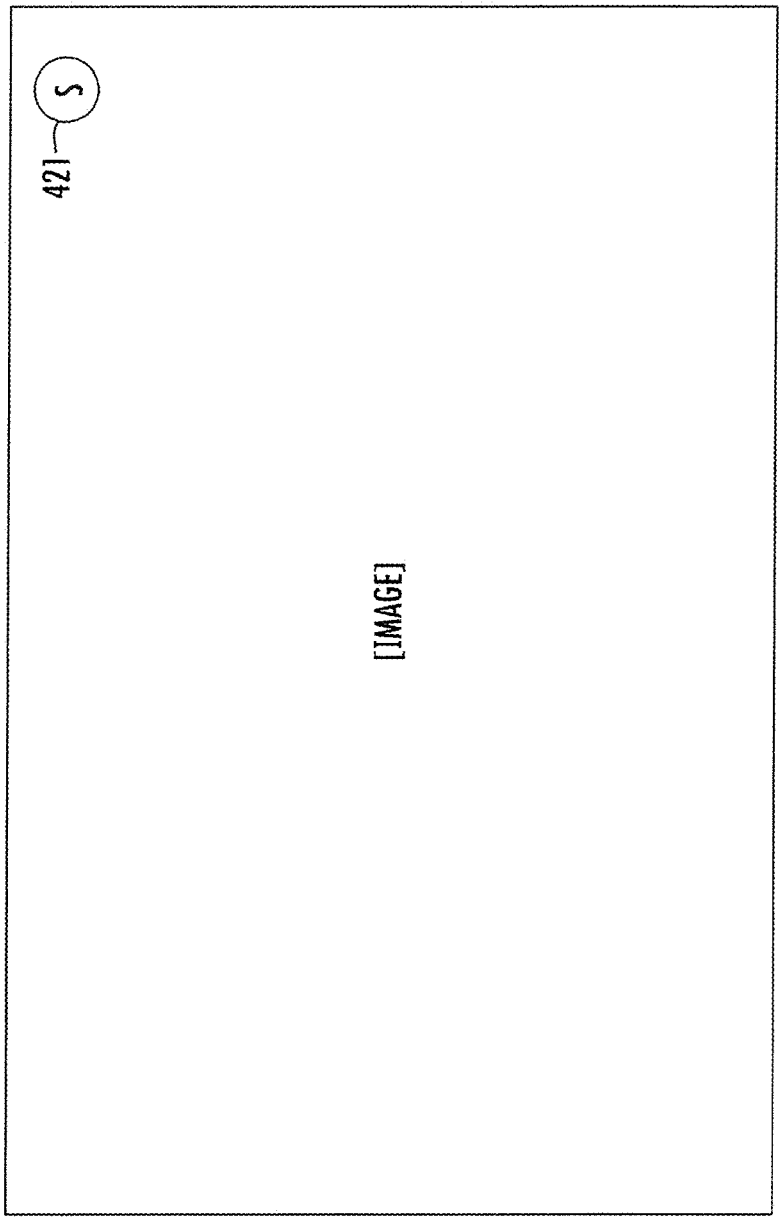
Figure 5:
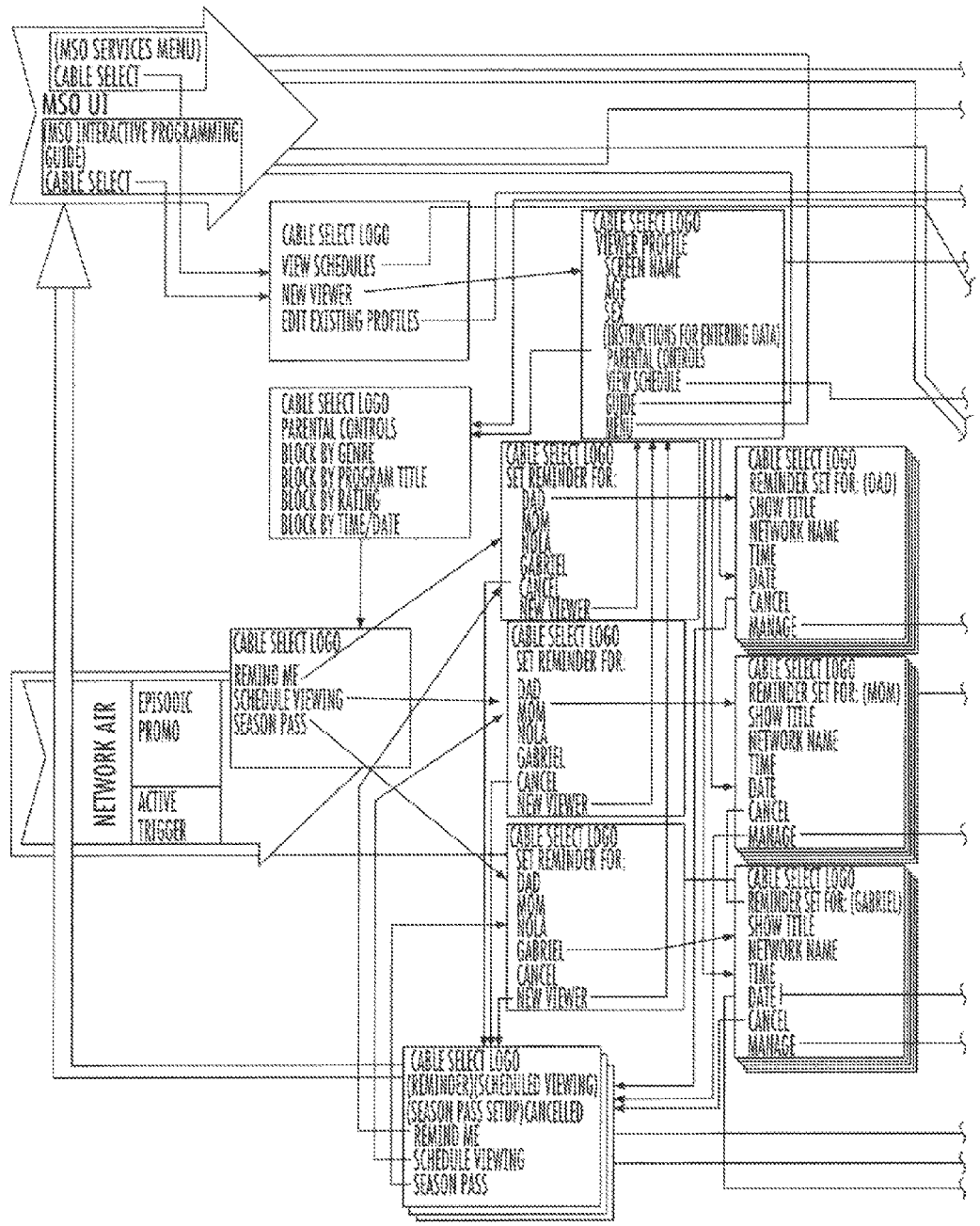
FIG. 5 is a logical flow diagram illustrating the flow of information and the associated menu choices that may be presented on a display.
Figure 5:
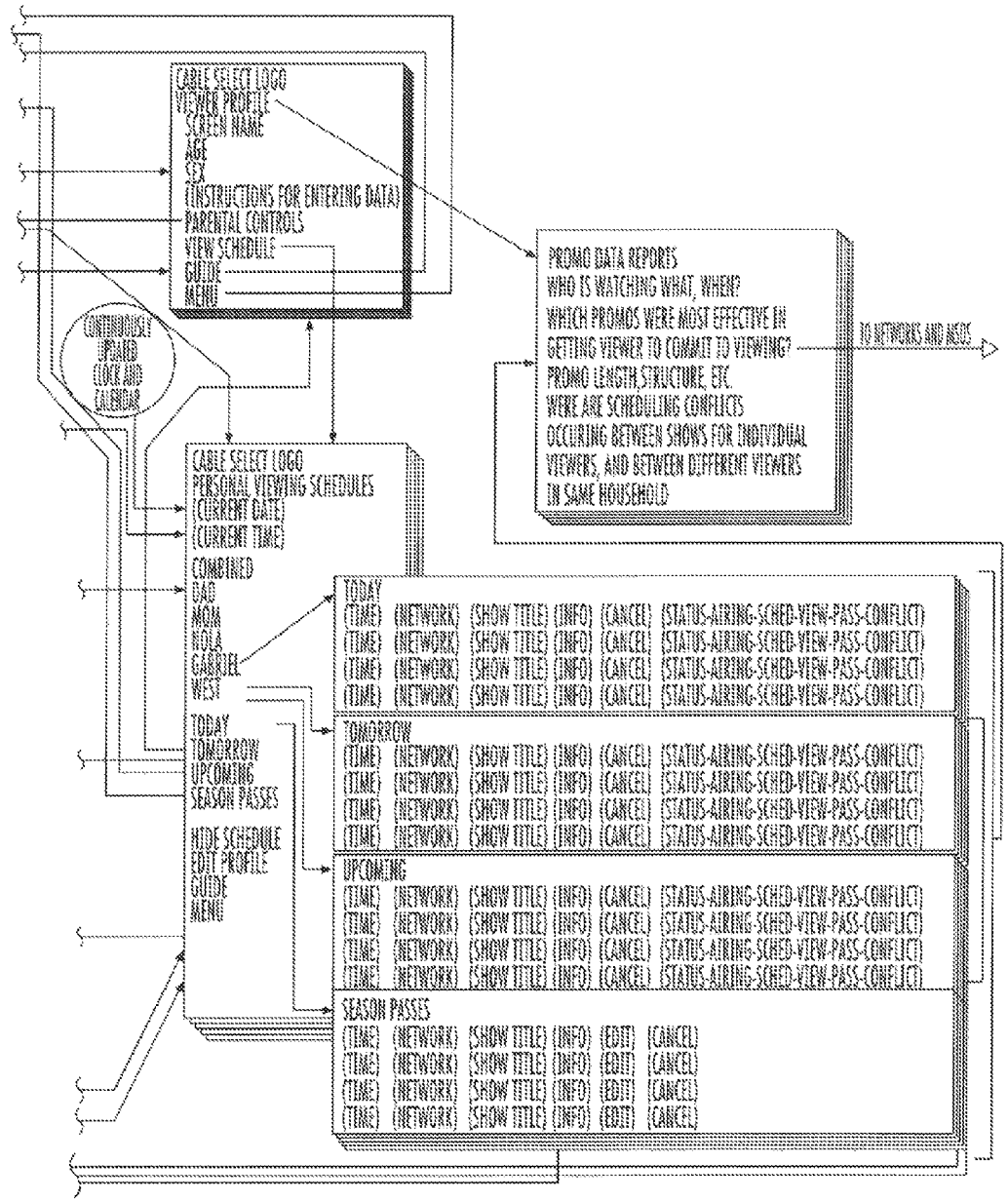

Referring now to FIGS. 4 through 5, exemplary methods of doing business and associated business models are described in detail. While the following discussion is cast in terms of an exemplary commercial paradigm and software/hardware environment (i.e., the "Cable Select™" service provided over an HFC cable network), this is merely illustrative.

At a high level, Cable Select is a tool that allows viewers to make their viewing choices when their desire to view is ostensibly at its strongest, such as during a promotion for the event of interest. Such promotions are intentionally designed to heighten the viewer's interest, and accordingly represent an excellent opportunity to obtain new viewership for a program or event.

Furthermore, scheduling their viewing choices in this manner eliminates the need for the viewer to remember vital tune-in information about what network, time, and date the program they are interested in will air, thus overcoming the flaw that has existed in On-Air promotion since the debut of television.

Networks and MSOs that take advantage of Cable Select will also be afforded a metric to estimate how many and the type of viewers that plan on and commit to watching their programs. While some viewers may change their mind subsequently, and some viewers who do not select a trigger will view the program anyway ("direct tune-in"), the aforementioned metric is useful at projecting the interest level in a program, and can even be used as a priori and a posteriori information (for the scheduled event or another similar related or subsequent event) for determining, for example, advertising content or promotional content during that scheduled program.

Similarly, Cable Select also allows networks and MSOs to gather information about how effectively their promotion strategy for any given show is working in time to modify and improve it. Networks using Cable Select triggers can start promoting programming events several days, weeks or even months before the scheduled event, with multiple versions of the promotion, and refine their approach by e.g., airing the more successful promotions more often, and eliminate those that do not deliver a commitment to view or which otherwise yield unsatisfactory results. This evolutionary approach is even more effective when the scheduled programs air in a series over a more protracted period of time. Additionally, networks and MSOs can use the Cable Select triggers in promotions for events that haven't been produced yet in order to test audience appeal (test marketing). They can discover from the data collected, for example, which members of a typical household (or even individual households) are viewing, and when. They can also see where scheduling conflicts arise, and react accordingly, such as by scheduling events or programs such that conflicts between the programs are avoided.

Networks spend millions to tens of millions of dollars annually on promoting programming on their own air. Cable Select helps them use their budgets more effectively and efficiently by redirecting a small portion of it into the purchase of Cable Select promotional triggers. Doing so helps ensure that the viewer's desire to view becomes a tangible commitment to view their shows. It also gives networks useful data about viewer's desires and behavior, which can be used to create and adapt their programming and promotion strategy.

In one variant of the business model, MSOs charge the subscribing networks or studios for each trigger that is placed in their promotions. Users (e.g., home viewers) are not charged for the triggers, as in other prior art paradigms (e.g., TiVo).

This can be, for example, a percentage of the total cost of the promotion. Discounts or graduated rates as a function of the number of triggers subscribed by a given entity can also be used, thereby providing incentives to the networks to subscribe. Furthermore, the rate schedule can be adjusted as a function of other parameters, such as for example, the date and/or time of day that the triggered promotion is aired. As is known, prime-time and certain weekend slots have the highest viewership, and hence ostensibly would be most productive in generating viewer commitments via the triggers.

Referring now to FIG. 4, one implementation of the method 400 of using embedded triggers in a promotion includes a first step 402 in which a promotion is provided (such as by a subscriber network or studio) to the distributing entity (e.g., MSO or third party network entity). This may be a one-time promotion, may be aired on several occasions, or may be situationally or anecdotally created and/or run as previously described herein.

Next, per step 404, a trigger is selected and embedded within or associated with the promotion. For example, when a Cable Select trigger is embedded in a network promotion, the "select" icon 421 appears in the upper right corner (FIG.

4a). The placement of all of the Cable Select elements is in the illustrated implementation designed to be minimally intrusive on the video and traditional placement of graphic elements. However, the attributes of the icons and display elements can be varied as desired, such as where a more intrusive presence is desired (e.g., where the user continually ignores the elements, the size or placement of the elements can be progressively scaled until a response is achieved, or some threshold is reached). Alternatively, separate windows (e.g., pop-ups or embedded "PIP" windows) can be used.

Figure 4B:
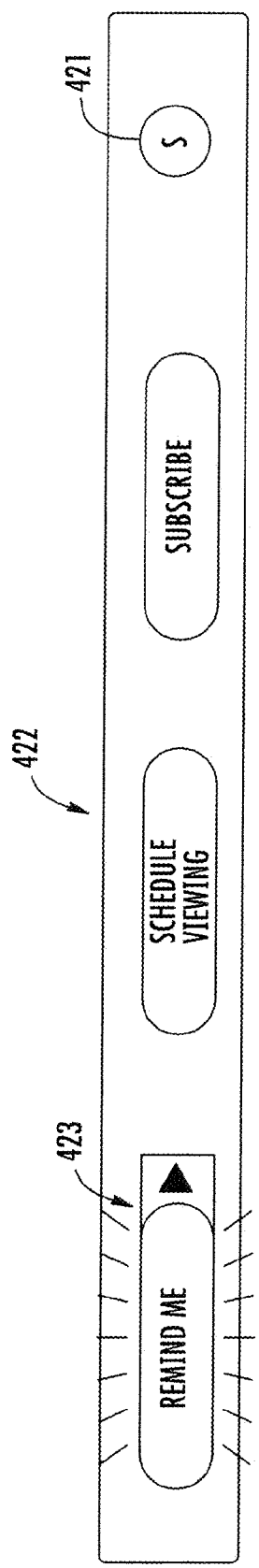

Next, by selecting the "select" icon 421, the viewer is given an option 422 to set a reminder, schedule the actual tuning to the program being promoted, or "subscribe" and get a reminder each time an episode of the series or set of events (or a related series) airs; see FIG. 4b. Using the arrow "left" and "right" functions 423 on, e.g. their wireless remote control unit, the viewer activates the option they desire and then selects it using function keys on the remote. In the illustrated implementation, the trigger is present for the entire duration of the promotion, and can be activated at any time. Alternatively, the trigger (and icons or other audio/visual elements) can be selectively presented to the viewer at a prescribed point in the promotion, such as at the end.

The promotion presented to the user can be repeated, such as where the user did not catch the entire promotion, or they just could not make up their mind without seeing it again. The second or subsequent replays of the promotion may be identical, or alternatively may be changed (yet still embed the same trigger(s)) so as to address the user's questions regarding the first promotion, such as where the user desires more information about a particular facet of the promoted event before deciding. This functionality can be implemented with, e.g., a "replay promotion" button or menu selection, which can then be followed by a "same or different?" button or graphic, or the like. In another variant, the replayed promotion is merely an extended or more detailed version of the first promotion.

Figures 4C, 4D:
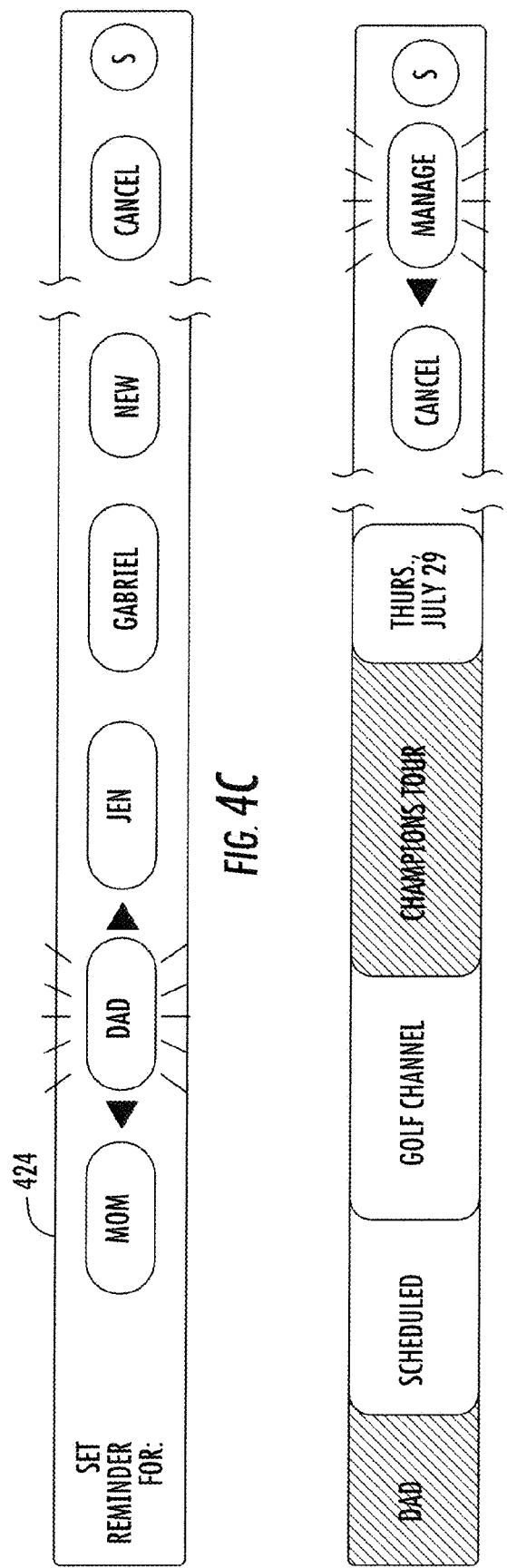
Figure 4F:
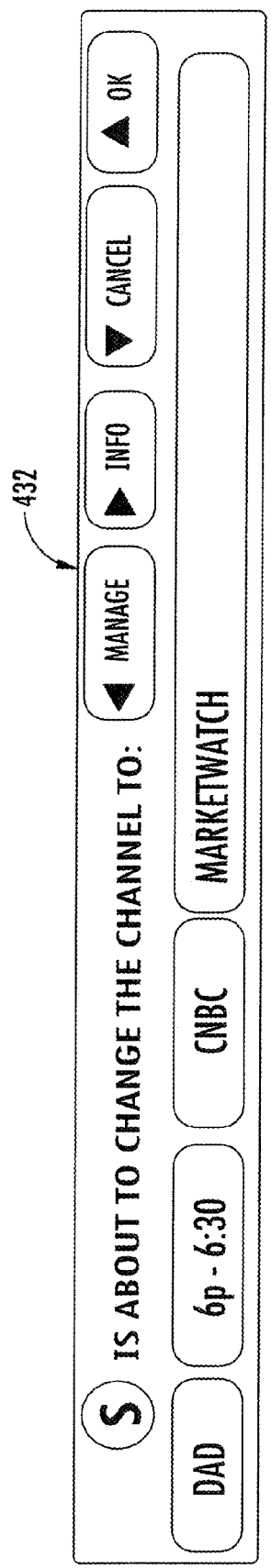

As shown in FIG. 4c, once a reminder or scheduling has been requested, the viewer is next optionally queried via the display 424 as to which of the household member's lists they wish to add this program (step 406). Each of these lists are further optionally linked to profiles created by the viewer in initial set-up of the Cable Select system. In one implementation, the information present in these profiles is selectively passed (such as with viewer assent) back to the head-end, MSO or network in order to (i) provide the network or other entity with more detailed information on viewer demographics and habits, and (ii) allow the customized tailoring of subsequent promotions or even content according to that viewer's individual interests, age group, or viewing habits. The segmenting of lists in this fashion affords the viewer the ability to review and edit their own choices more effectively.

Once the program has been added to one or more lists, a summary of the activity is optionally presented along with the option to cancel the viewing appointment or reminder (step 408). The viewer can also select the "manage" function 425 to see a list of their scheduled programs (see FIG. 4d).

All reminders and scheduled viewings are recorded in a full screen file that is accessible from the MSO's main Electronic Program Guide (EPG) 427 or during individual tagged promotions (see FIG. 4e). The viewer may view their individual viewing schedules, those of other family members, or all of them combined. They can scroll through their choices, set up recurring viewings (season passes), modify or delete choices, and resolve any conflicts 429 between the various schedules.

As a scheduled programming event nears, the exemplary Cable Select implementation informs the viewer that it is about to change the channel (step 410) via, e.g., an on-screen display 432. This is accomplished using graphics and/or audible elements which (i) tells the viewer(s) who scheduled the event, and what the event is, and (ii) provides a link to the list that the scheduled event is part of; see FIG. 4f. It also gives the viewer(s) the option of getting information on the selected event, and even canceling it or delaying the invocation of the tuning process (such as to watch the end of a late-running program, and then cut to the scheduled event late).

Figure 4G:
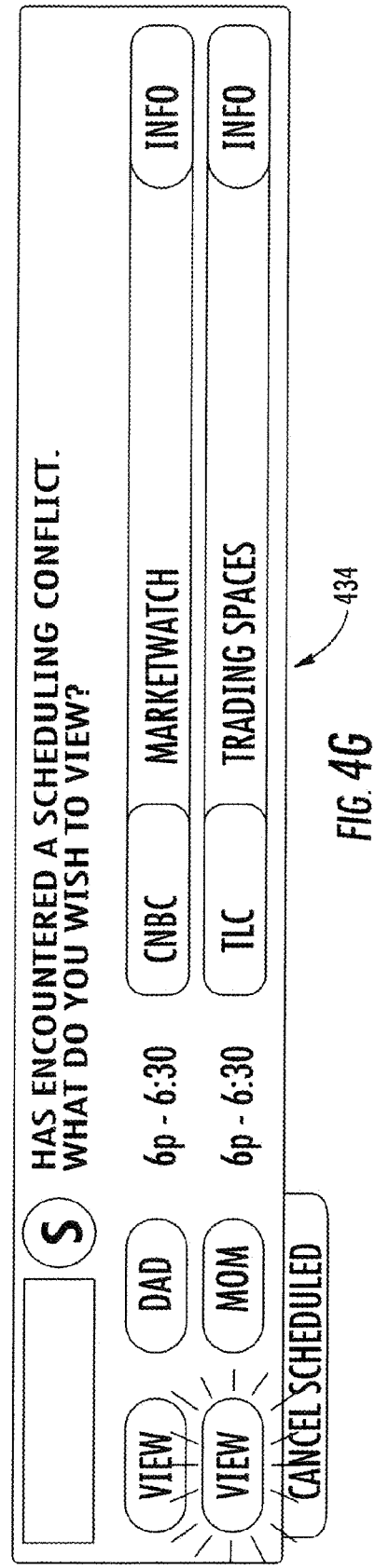
Figure 4H:
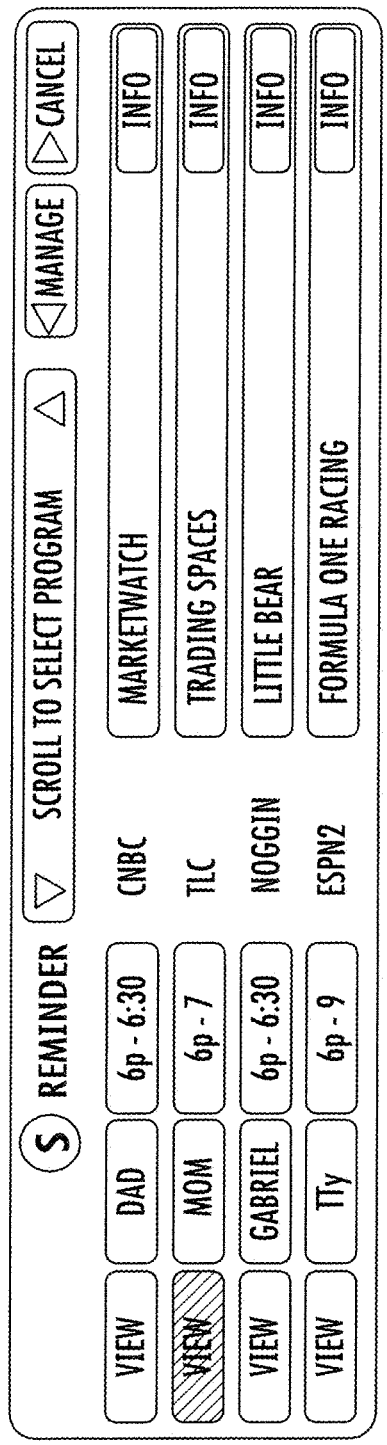

Per step 412, if a scheduling conflict has not been resolved by the time Cable Select is about to change the channel, choices for resolving the conflict are optionally given to the viewer via e.g., an on-screen display 434 (see FIG. 4g). If multiple reminders and/or scheduled viewings overlap, a menu 440 detailing the viewers choices is presented in adequate time for a selection (see FIG. 4h).

Lastly, per step 414, the event is then viewed at the appropriate time and date.

Figure 4I:
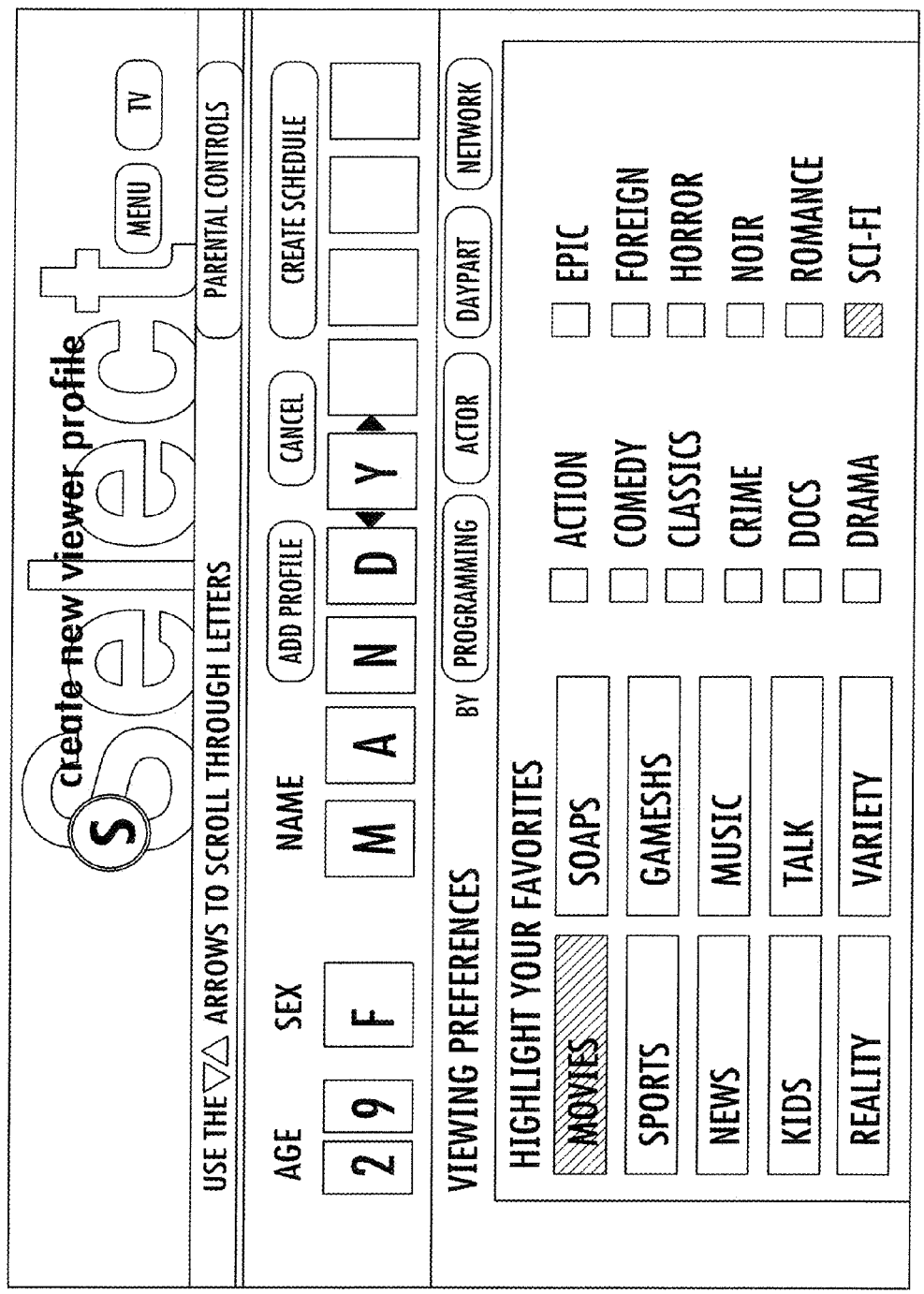

As shown in the example display 442 of FIG. 4i, each family member or viewer within the premises creates a viewer profile that identifies the type of programming they are interested in, which is tracked against their actual viewing choices. Specifically, even though a particular viewer (e.g., household member) "selects" an event for viewing or recording, it is not always a certainty that that event will be viewed or recorded, such as when it is over-ridden in a conflict situation. Hence, information relating to instances where a selected event (demonstrating a successful promotion transaction) is over-ridden, either by another selected event or simply canceled prior to viewing, is important. It may suggest or help identify, for example, programming scheduling conflicts that the network might not be aware of. These conflicts may relate to different audiences and/or different networks, yet at the same time of day.

Figure 4J:
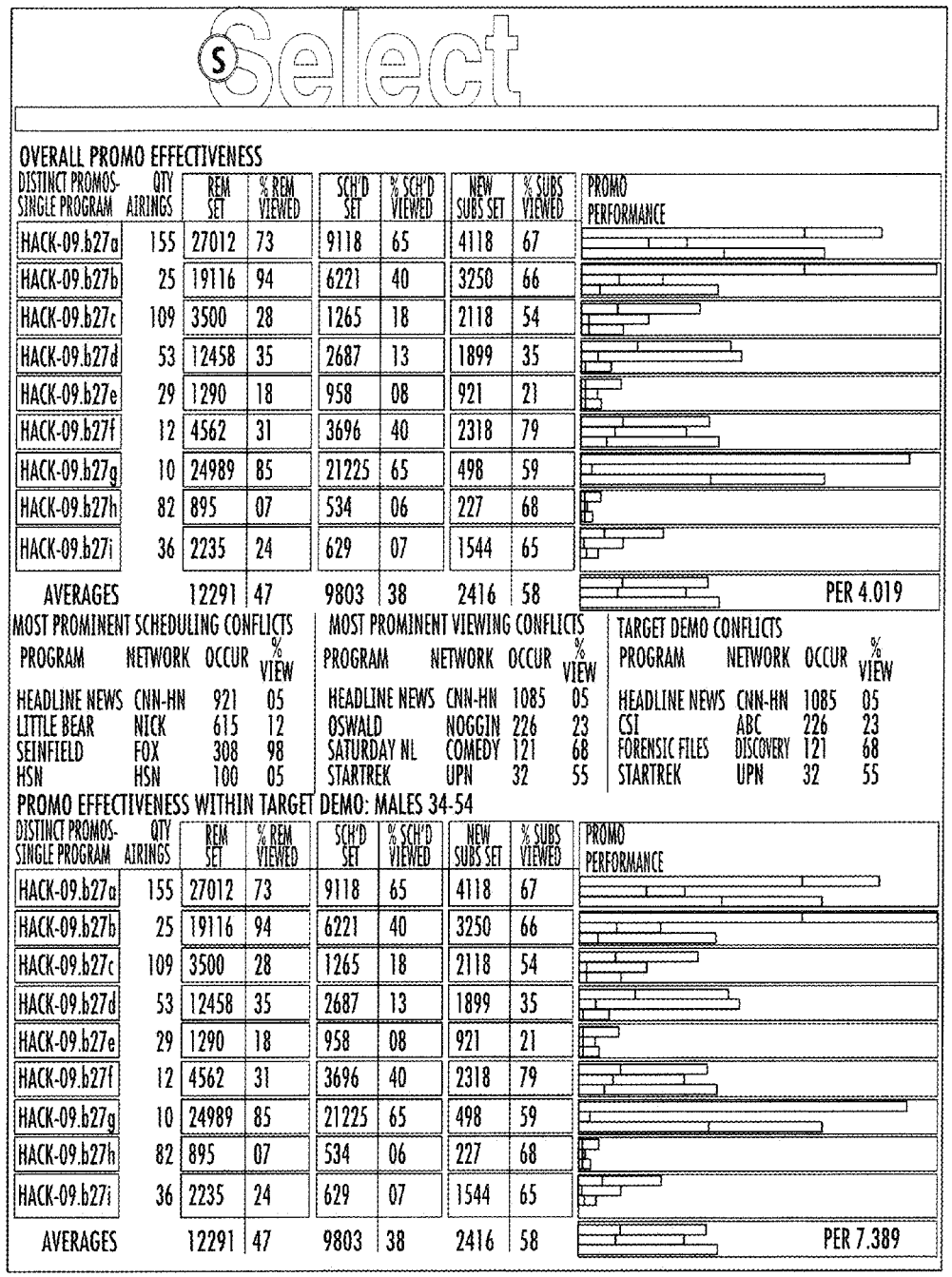
Figure 4K:
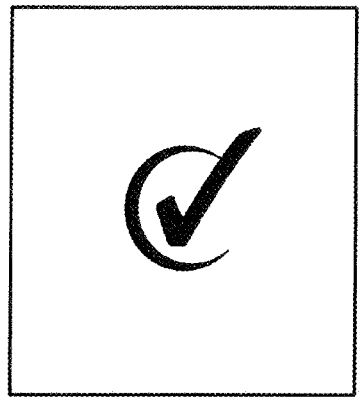
Figure 4L:
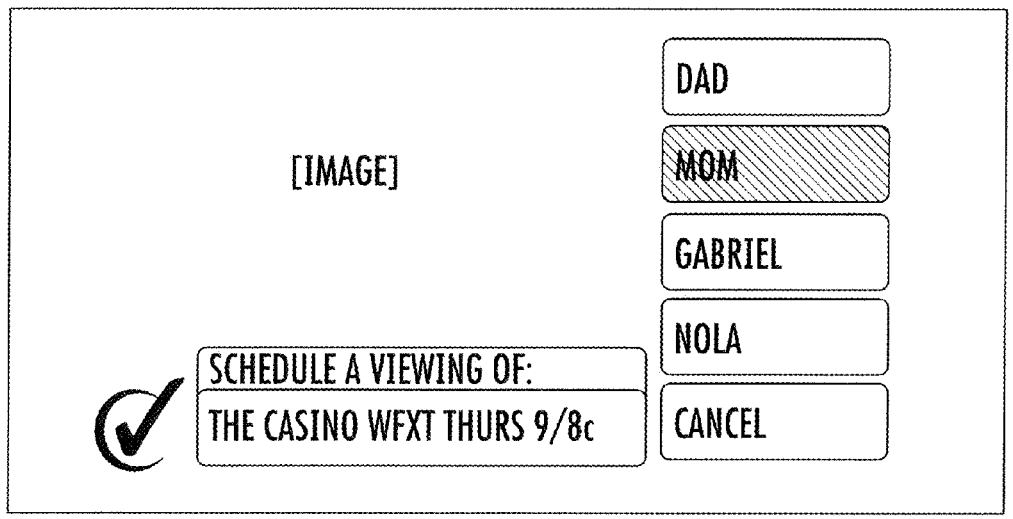
Figure 4M:
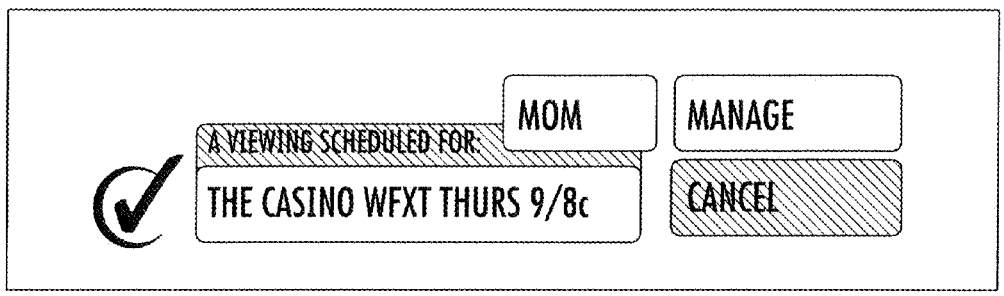
Figure 4N:
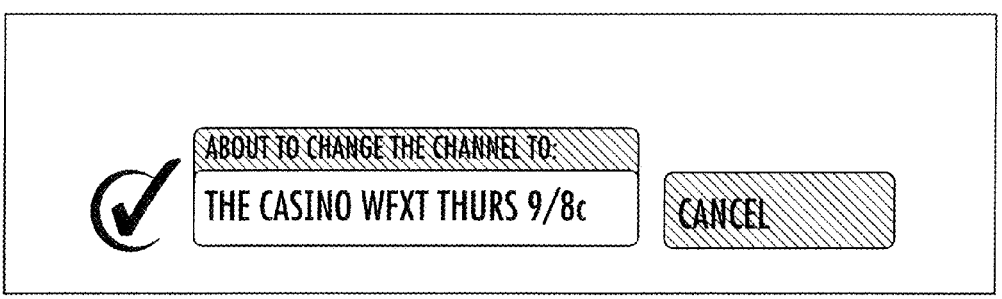
Figure 40:
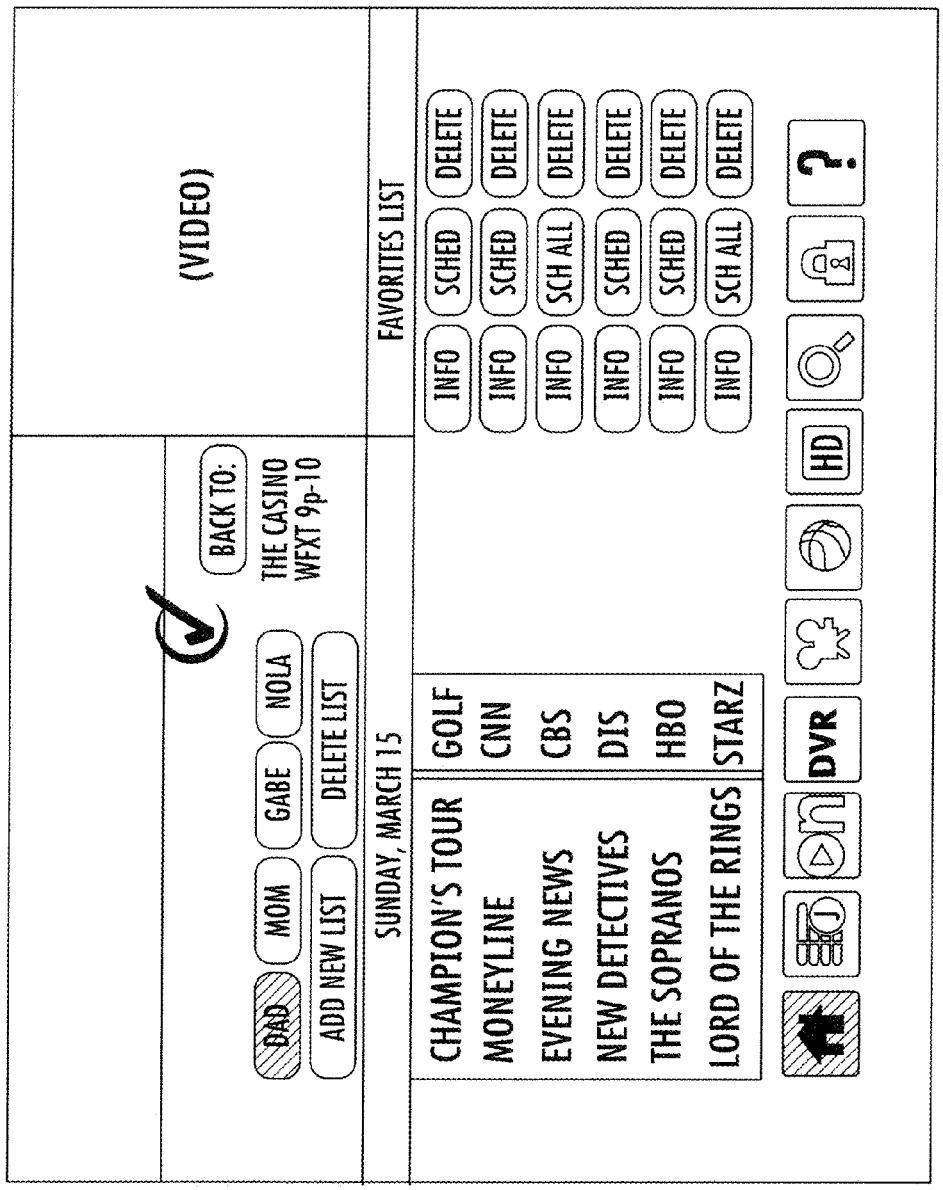
Figure 4P:
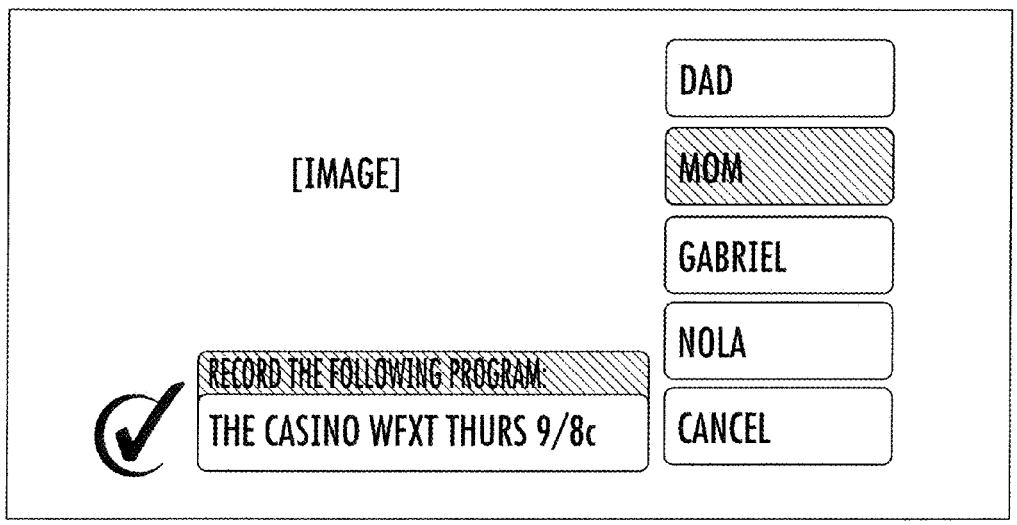

Furthermore, each network, MSO or other service "subscriber" is optionally provided an automated report for the events it promotes with triggered promotions via the Cable Select system (see FIG. 4j). These reports allow the subscribers to judge the relative effectiveness of, for example, various promotional concepts, placements, lengths, and saturation. They can also determine which events are creating conflicts in translating the desire to view to actual viewings. For example, where the statistics indicate that a certain scheduling pattern between two or more events is creating a high percentage of conflicts (translating to a lower commitment rate), the network/MSO can alter their schedule to reduce the conflicts.

In another variant of the method (FIGS. 4k-4p), the aforementioned reminders are eliminated, and only event scheduling is performed. All "selected" events airing at the same time enter a queue. Though the Cable Select system will notify the viewer that there is a conflict between the events, it will instead default to the most recently scheduled (selected) event, or alternatively according to some other predetermined logic (e.g., first event scheduled or events scheduled by a particular individual first). Under the "most recent event scheduled" configuration, significant competition for selection, such as between networks, will exist, since each will be constantly trying to trump selections of events associated with other networks as the events get closer to airing. In this alternate implementation, however, all selected events are listed in a menu, and the viewer is free to choose from the various events in the queue. FIGS. 4k-4p illustrate graphic and functional elements associated with an alternate implementation of the user interface as well.

FIG. 5 provides a graphical representation of an exemplary menu structure and logical flow implementation. Portions of FIG. 5 are correlated to the various menu options and displays discussed herein with respect to FIGS. 4a-4j.

Figure 6:
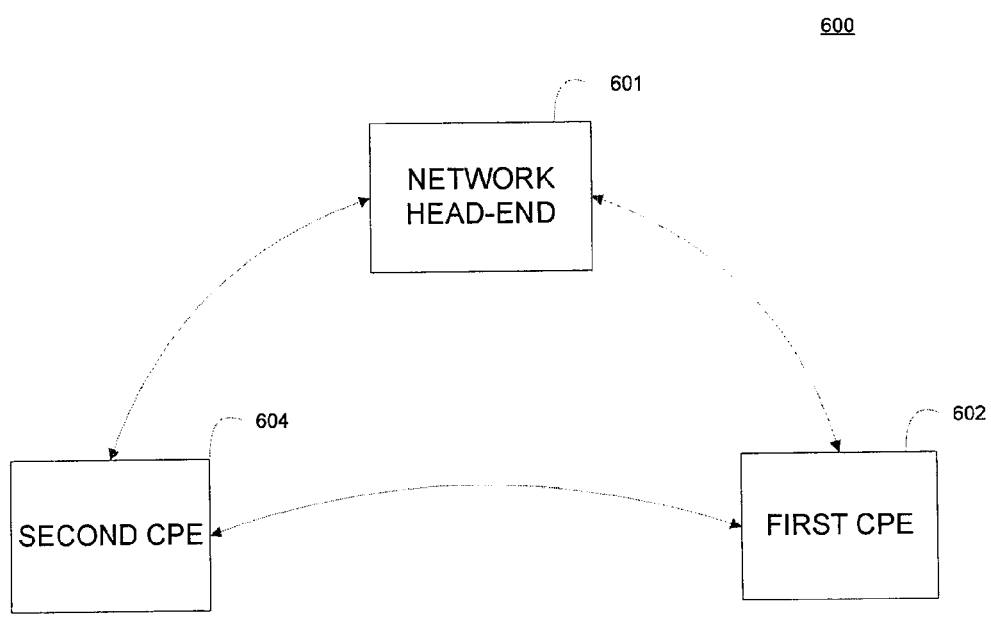
FIG. 6 is a block diagram depicting one example of a hardware system.
Figure 7:
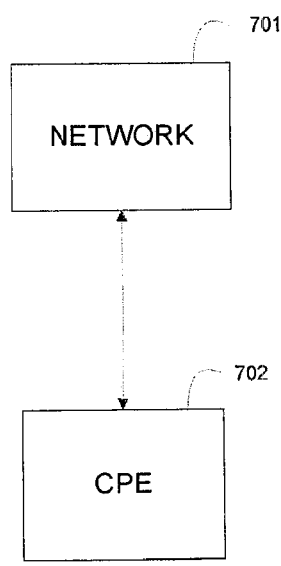
FIG. 7 is a block diagram depicting a second example of a hardware system.

FIGS. 6 and 7 are block diagrams depicting examples of hardware systems that may be used to implement the arrangements discussed below. FIG. 6, for example, illustrates system 600, which includes network 601, first CPE 602, and second CPE 604. In one aspect, network 601 is a 'network,' and both first CPE 602 and second CPE 604 are 'CPEs,' as have been described above. In FIG. 6, network 602, by way of a network head end, is in bidirectional communication with first CPE 602 and second CPE 604, and first CPE 602 and second CPE 604 are in bidirectional communication with each other. In one aspect, communication between network 602 and first CPE 602 and/or second CPE 604, and/or between first CPE 602 and second CPE 604, is unidirectional. In another aspect, no communication occurs between network 601 and first CPE 602 and/or second CPE 604, and/or between first CPE 602 and second CPE 604.

FIG. 7 depicts the second example hardware system. In FIG. 7, system 700 includes network 701 and CPE 702. Like the network 601 of FIG. 6, network 701 is a "network" and CPE 702 is a "CPE." In FIG. 7, network 701, by way of a network head end, is in bidirectional communication with CPE 702. In one aspect, communication between network 701 and CPE 702 is unidirectional.

In FIGS. 6 and 7, external communication between the various CPEs and networks occurs via wired and/or wireless communication methods and protocols, as has been fully described above. Although, for ease of discussion, FIGS. 6 and 7 illustrate simplified block diagrams of the example systems, these depictions in no way limit the scope of potential system architectures which may be used by the arrangements discussed below.

Figure 8:
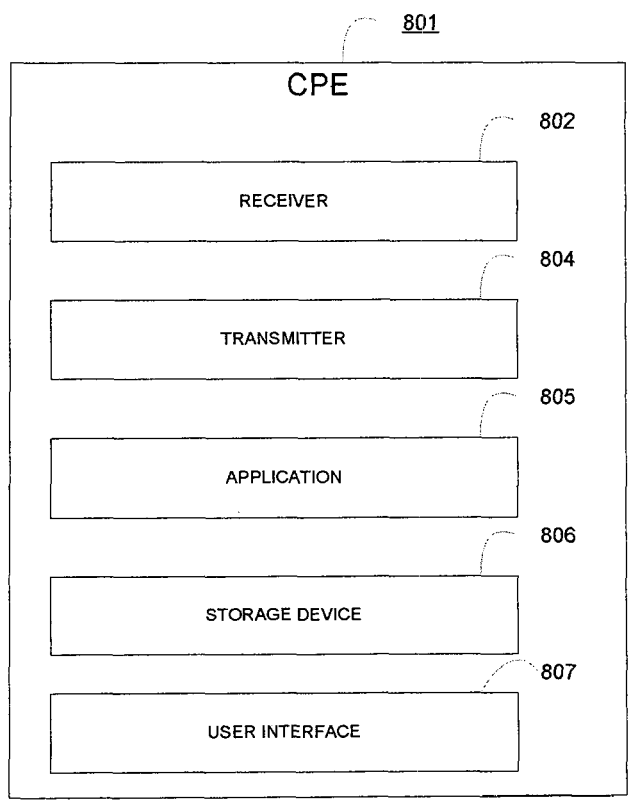
FIG. 8 is a block diagram depicting one example of the internal components used by an individual CPE.
Figure 9:
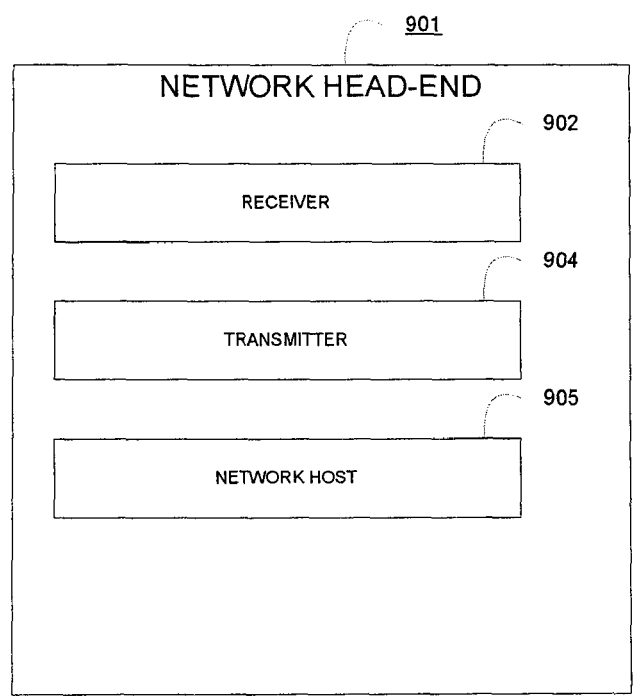
FIG. 9 is a block diagram depicting one example of the internal components used by a network host of a network.

FIGS. 8 and 9 are block diagrams depicting example internal components used by the individual CPEs, such as CPEs 602, 604, and 702, and the networks, such as networks 601 and 701, respectively. FIG. 8 illustrates CPE 801, which may provide an example of the architecture of CPEs 602, 604, and/or 702. In this simplified example, CPE 801 includes receiver 802, transmitter 804, application 805, storage device 806, and/or user interface 807. However, in other implementations, other components are added, illustrated components are omitted, and/or components are combined. A more detailed example CPE architecture is described above, with reference to FIG. 2.

FIG. 9 illustrates an example network head-end 901. In this simplified version, network head end 901 includes receiver 902, transmitter 904 and/or network host 905. However, in other implementations, fewer or more components are used, or components are combined. A more detailed example network head-end architecture is described above, with reference to FIG. 1.

Figure 10:
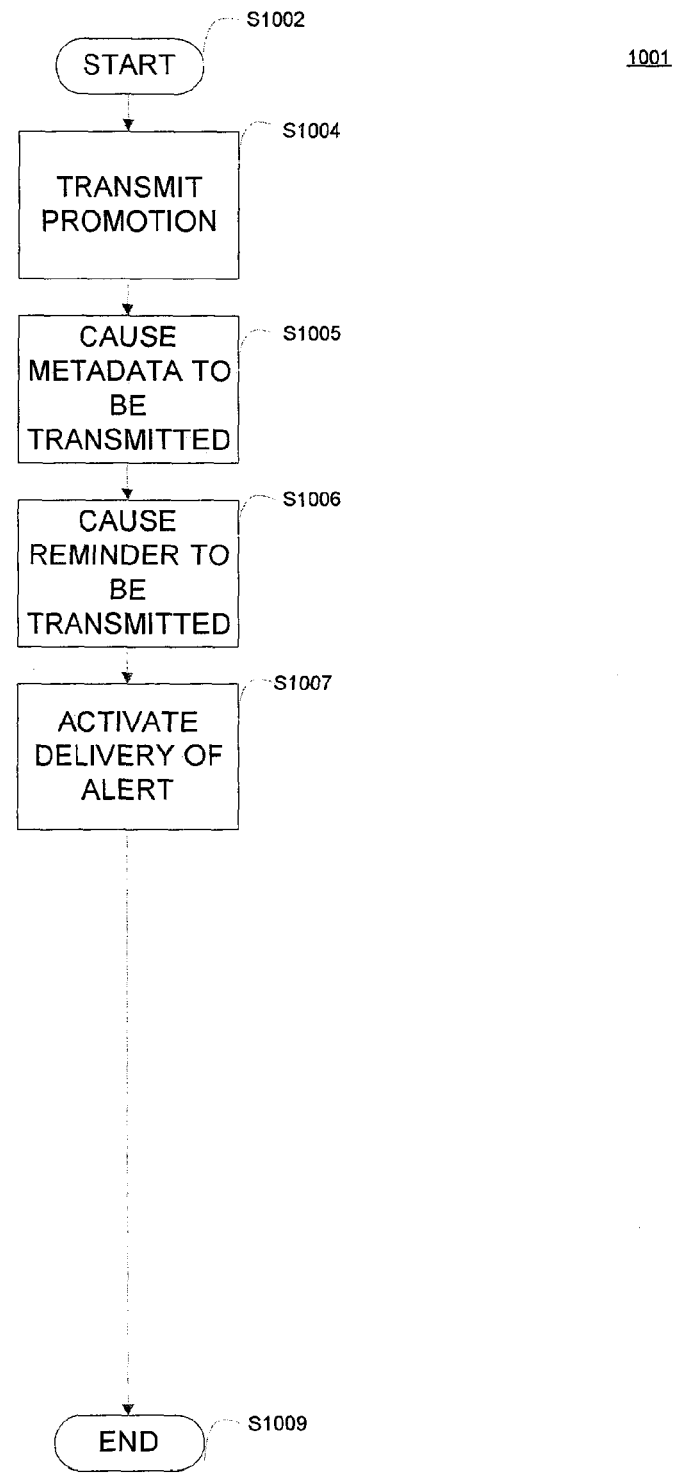
FIGS. 10 and 11 are flowcharts depicting methods of alerting a user of a scheduled event on a network.

FIG. 10 is a flowchart depicting a method 1001 of alerting a user of a scheduled event on a network. Briefly, the method includes transmitting a promotion to a first consumer premises equipment ("CPE"), with the promotion being associated with event scheduling metadata, and causing the event scheduling metadata to be transmitted from the first CPE to a second CPE based on a selection of the promotion at the first CPE. The method further includes causing a reminder message to be transmitted from the second CPE to the first CPE based on the event scheduling metadata. According to this particular arrangement, a first CPE, such as a wireless, handheld device, could schedule the viewing of a cable or satellite television program with a second CPE, such as a digital set-top box, where the second CPE can send a reminder message back to the first CPE that a scheduled event is about to start. The method may be practiced in a system with two CPEs, in which the first CPE schedules the delivery of the scheduled event, and delivery is activated at the second CPE.

In more detail, when the method 1001 begins (step S1002), a promotion is transmitted to the first CPE (step S1004), where the promotion is associated with event scheduling metadata. The transmission of promotions to CPEs is discussed in great detail above.

The event scheduling metadata is caused to be transmitted from the first CPE to a second CPE based on a selection of the promotion at the first CPE (step S1005). In one aspect, the event scheduling metadata is caused to be transmitted when the first CPE transmits the event scheduling metadata to the network or via the network, where the second CPE subsequently receives the event scheduling data through a connection with the network. For example, when a wireless handheld device receives a promotion and the promotion is selected by the user of the wireless handheld device, event scheduling metadata is transmitted to a telephone, internet, or television service provider, or the like, for subsequent transmission to the second CPE. In a second aspect, the event scheduling metadata is caused to be transmitted directly to the second CPE when the first CPE transmits the event scheduling metadata, without transmitting the event scheduling metadata to or via the network. It is contemplated that this second aspect would be particularly germane to using a wireless handheld device to connect, either wired or wirelessly, to the second CPE, when the two are located near each other. A wireless handheld device, for example, could use a wireless link, such as a BLUETOOTH® connection, to synchronize with a digital set-top box and upload event scheduling metadata stored in the wireless handheld device.

A reminder message is caused to be transmitted from the second CPE to the first CPE based on the event scheduling metadata (step S1006). In one aspect, the reminder message is transmitted from the second CPE to the first CPE via the network, where the reminder message is wired or wirelessly transmitted from the second CPE to the network, and/or the reminder message is wired or wirelessly transmitted from the network to the first CPE. In a second aspect, the reminder message is transmitted directly from the second CPE to the first CPE. In general, the reminder message is transmitted prior to the scheduled event. However, in alternate aspects, the reminder message is transmitted at the same time or even after the scheduled event. The reminder message is a message which notifies the first CPE of the occurrence of the scheduled event, where the reminder message can me any type of message, such as an email or voicemail message, instant message, or other category of message, in user-readable or non-user-readable form.

The delivery of an alert is activated based on the reminder message (step S1007), and the process ends (step S1009). In one aspect, the alert is an audio and/or visual alert, further including time, date, and channel data, or any other type of data. In a further aspect, an alert is not activated. An alert is a message generated by the first CPE in response to the reminder message, where the alert is in user-readable form and readily understandable by the user. A reminder message, for example, may be in the form of raw data or coded bits, where the first CPE receives the reminder message, converts it into an easily understandable alert, then delivers the alert to the user. Although the alert has been described as a message, it could also be an audio alert, such as a beep, a visual alert, such as a blinking light, or another type of alert, such as a vibration.

The method 1001 may be implemented using a content delivery system, including a content delivery network, a first CPE, and a second CPE. The content delivery network may further include a network transmitter that transmits a scheduled event and a promotion, with the promotion being associated with event scheduling metadata. The first CPE further includes a first receiver that receives the promotion from the network and also receives a reminder message. The first CPE also includes a first user interface that delivers the promotion to a user, receives input of a selection of the promotion from the user, and delivers an alert to the user based on the reminder message. The first CPE also includes a first transmitter that transmits the event scheduling metadata based on the selection. The second CPE includes a second receiver that receives the event scheduling metadata, an application that activates delivery of the scheduled event from the network based on the event scheduling metadata, and a second transmitter that transmits the reminder message based on the event scheduling metadata. FIG. 6 depicts an example hardware environment that could be used to implement the content delivery network. The first CPE and/or the second CPE are wireless CPEs, such as mobile wireless CPEs, although in alternate aspects the first CPE and/or the second CPE are wired CPEs. Alternatively, the first CPE is a mobile wireless CPE, and the second CPE is a digital set-top box. Prior to the scheduled event, the second transmitter transmits the reminder message, the first receiver receives the reminder message, and the first user interface delivers the alert. In other implementations, the reminder message and/or alert are generated at the same time or after the occurrence of the scheduled event.

A CPE that may be used to implement the method 1001 includes a receiver configured to receive a promotion associated with event scheduling metadata from a network a reminder message, and a user interface configured to permit input of a selection of the promotion from the user, and to deliver a reminder to the user based on the reminder message. The CPE also includes a transmitter configured to transmit the event scheduling metadata based on the selection. While FIG. 8 generally depicts an example CPE that may include these features, other hardware implementations are also contemplated.

Figure 11:
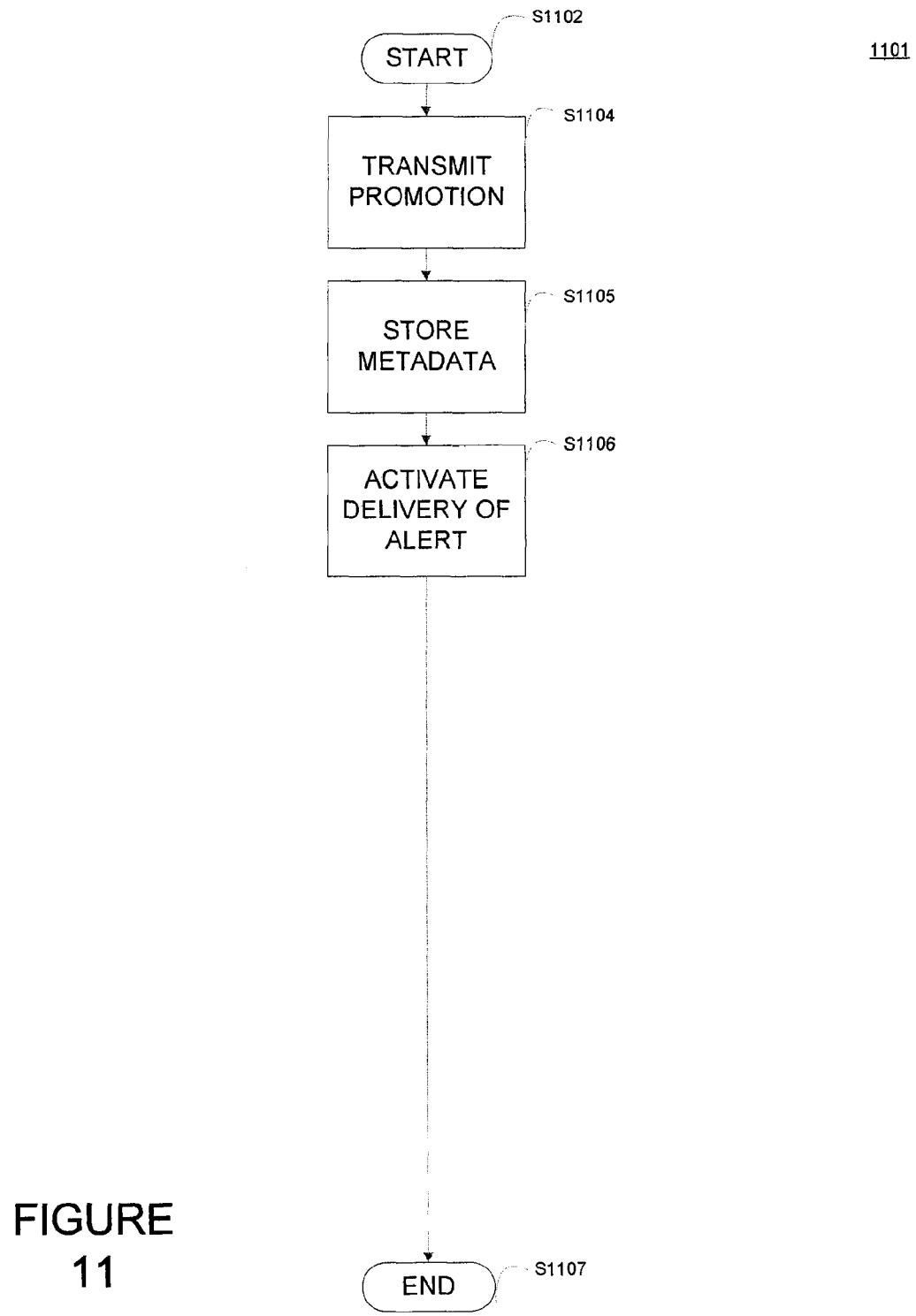

Another CPE that may be used to implement the method 1001 includes a receiver configured to receive event scheduling metadata from a network, and an application configured to activate delivery of a scheduled event from the network based on the event scheduling metadata. The CPE also includes a transmitter that transmits a reminder message based on the event scheduling metadata. FIG. 8 also generally depicts an example CPE that may include these features, although other hardware implementations are also contemplated FIG. 11 is a flowchart depicting a method of alerting a user of a scheduled event on a network. Briefly, the method includes transmitting to a CPE a promotion associated with event scheduling metadata, and storing the event scheduling metadata at the CPE based on a selection of the promotion. Delivery of an alert is activated based on the event scheduling metadata. The method also may be practiced in a system with one CPE that both schedules and activates delivery of the scheduled event.

In more detail, the method 1101 begins (step S1102), and a promotion is transmitted to a CPE (step S1104), with the promotion being associated with event scheduling metadata. The event scheduling metadata is stored at the CPE based on a selection of the promotion (step S1105). Delivery of an alert is activated based on the event scheduling metadata (step S1106), and the method ends (step S1107).

The method 1101 may be implemented using a content delivery system that includes a content delivery network and a CPE. The content delivery network further includes a network transmitter that transmits a scheduled event and a promotion, with the promotion being associated with event scheduling metadata. The CPE further includes a receiver that receives the promotion from the network, and a user interface that delivers the promotion to a user and permits input of a selection of the promotion from the user. The CPE also includes a storage device that stores the event scheduling metadata based on the selection, and an application that activates delivery of an alert and the scheduled event from the network based on the event scheduling metadata. FIG. 7 depicts an example hardware environment that may include these features.

A CPE that may be used in implementing the method 1101 includes a receiver that receives a promotion from a network, with the promotion being associated with event scheduling metadata, and a user interface that delivers the promotion to a user and permits input of a selection of the promotion from the user. The CPE also includes a storage device that stores the event scheduling metadata based on the selection, and an application that activates delivery of an alert and the scheduled event from the network based on the event scheduling metadata. FIG. 8 depicts an example CPE that may include these features, although other hardware implementations are also contemplated.

Figure 12:
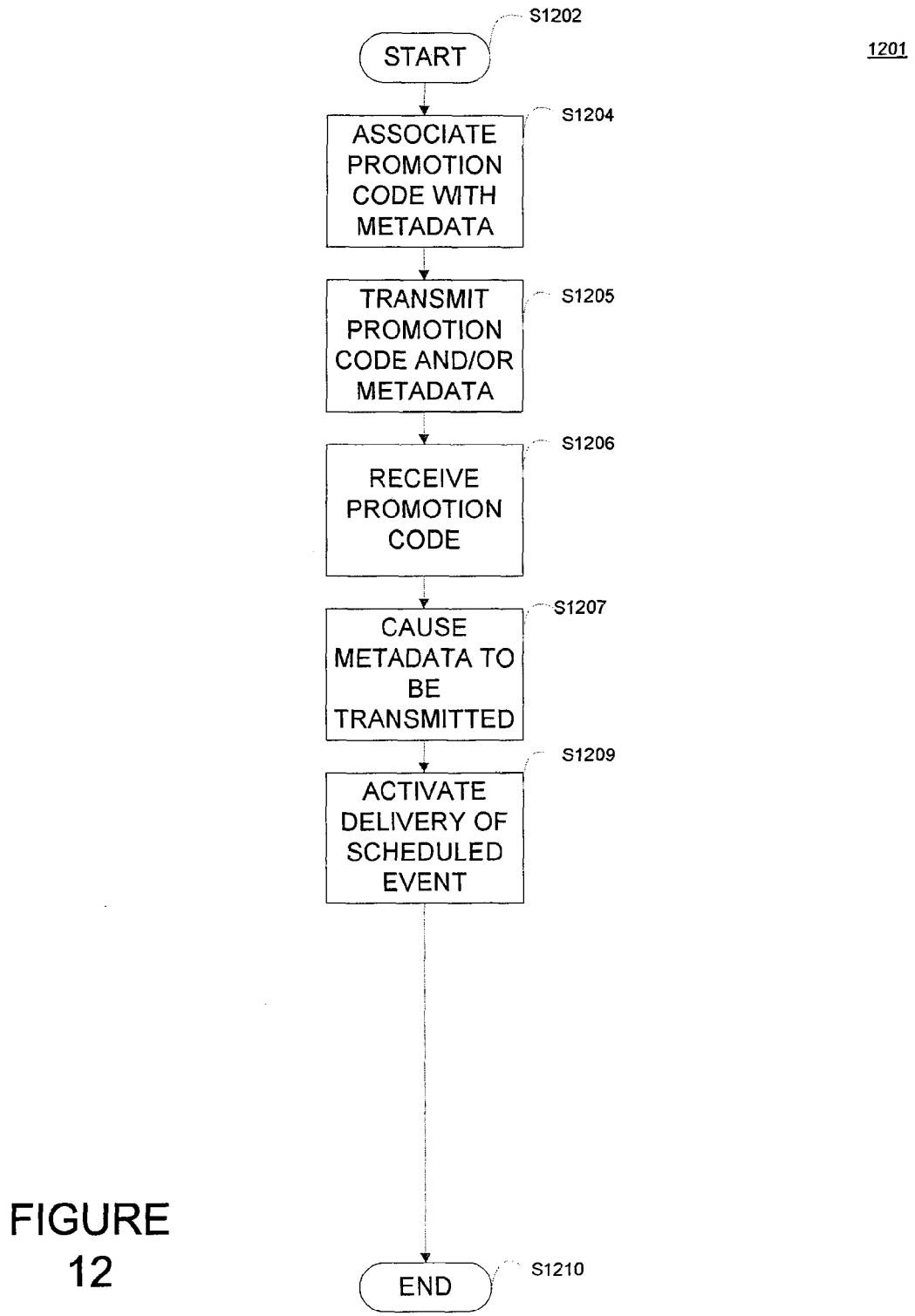
FIGS. 12 and 13 are flowcharts depicting methods of accomplishing delivery of a scheduled event on a network.

FIG. 12 is a flowchart depicting a method 1201 of accomplishing delivery of a scheduled event on a network. Briefly, the method includes associating a promotion code with event scheduling metadata, and causing the event scheduling metadata to be transmitted to a second CPE based on the promotion code being input at a first CPE. Delivery of the scheduled event from the network at the second CPE is activated based on the event scheduling metadata. According to this arrangement, a user could see a code, such as on a billboard, and punch the code into a wireless handheld device, where the wireless handheld device communicates with and schedules the delivery of a scheduled event, either locally or remotely. The method also may be practiced in a system with two CPEs, in which one CPE schedules delivery of the scheduled event, and delivery of the scheduled event is activated at the second CPE.

In more detail, when method 1201 begins (step S1202), a promotion code is associated with event scheduling metadata (step S1204), where promotion code is any code, such as a series of alphanumeric characters, that a user could be easily entered into a first CPE, to arrange for the delivery of a scheduled event without the need to populate multiple individual event scheduling metadata fields. Other types of promotion codes could be, for example, bar codes scanned from published documents, or audio cues. By associating promotion codes with event scheduling metadata, complex scheduling information could be published as easy-to-enter, or easily memorable correlating entries that a machine could convert into event scheduling metadata. In alternate aspects, associations are stored in databases and/or tables, or event scheduling metadata could be extracted from the codes themselves in other aspects, promotion codes are be fixed to particular event schedules, or the promotion codes are be re-used for later events after the occurrence of earlier events.

The promotion code and/or the event scheduling metadata is transmitted to the first CPE (step S1205). In an alternate aspect, the promotion code and/or the event scheduling metadata is not transmitted to the first CPE, such as the case where the promotion code is pre-loaded on the first CPE, or where promotion code data is interpreted by the network. In one aspect, the first CPE is a type of device which converts promotion codes to event scheduling metadata. In these instances, a mechanism exists on the first CPE to apply such a conversion. As described above, the mechanism could be a mathematical device which extracts event scheduling metadata from the event scheduling metadata, or the mechanism could be a look-up table or database which outputs event scheduling metadata upon receiving a promotion code. In this latter instance, the promotion code and/or event scheduling metadata should exist on the first CPE, either by reception of the promotion code and/or event scheduling metadata from the network, or through some other pre-loading mechanism.

The promotion code is received from the first CPE (step S1206). In an alternate aspect, the promotion code is not received from the first CPE, such as the case where the first CPE interprets the promotion code and transmits the event scheduling metadata to the network.

The event scheduling metadata is caused to be transmitted to a second CPE based on the promotion code being input at a first CPE (step S1207). In one aspect, the event scheduling metadata is transmitted from the first CPE to the second CPE, where the event scheduling metadata is transmitted directly from the first CPE to the second CPE. In a second aspect, the event scheduling metadata is transmitted from the first CPE to the second CPE via the network. In a third aspect, where promotion code data has been received from the first CPE, event scheduling metadata is transmitted to the second CPE.

Delivery of the scheduled event is activated from the network at the second CPE based on the event scheduling metadata (step S1208), and the method ends (step S1210). In one aspect, delivery of the scheduled event is activated by the second CPE being tuned to the appropriate network or channel. In another aspect, delivery is activated by the powering-on of a user interface, the initiation of a transmission, or by the commencement of a process, such as a record process, at the second CPE.

The method 1201 may be implemented using a content delivery system, including a content delivery network, a first CPE, and a second CPE. The content delivery network further includes a network transmitter that transmits a scheduled event, and associates a promotion code with event scheduling metadata. The first CPE further includes a first user interface that receives a promotion code from a user, and a transmitter, the transmitter transmitting the promotion code or the event scheduling metadata associated with the promotion code. The second further includes a second CPE receiver that receives the promotion code or the event scheduling metadata, and an application that activates delivery of the scheduled event from the network based on the event scheduling metadata associated with the promotion code. FIG. 6 depicts an example hardware implementation that could be used to implement the content delivery network.

In one alternate aspect, the first CPE further includes a first CPE receiver, and the network further transmits the promotion code to the first CPE. In a second alternate aspect, the network further transmits the event scheduling metadata associated with the promotion code to the first CPE, the first CPE transmits the promotion code or the event scheduling metadata associated with the promotion code directly to the second CPE, the first CPE transmits the promotion code, or the event scheduling metadata associated with the promotion code to the second CPE via the network. In a third aspect, the network further receives the promotion code from the first CPE, and transmits the event scheduling metadata to the second CPE based on the promotion code. The first CPE is a mobile or fixed, wired or wireless CPE, and the second CPE is a digital set-top box or other type of CPE discussed above. The network is a cable or satellite television system network, or other type of network.

Figure 13:
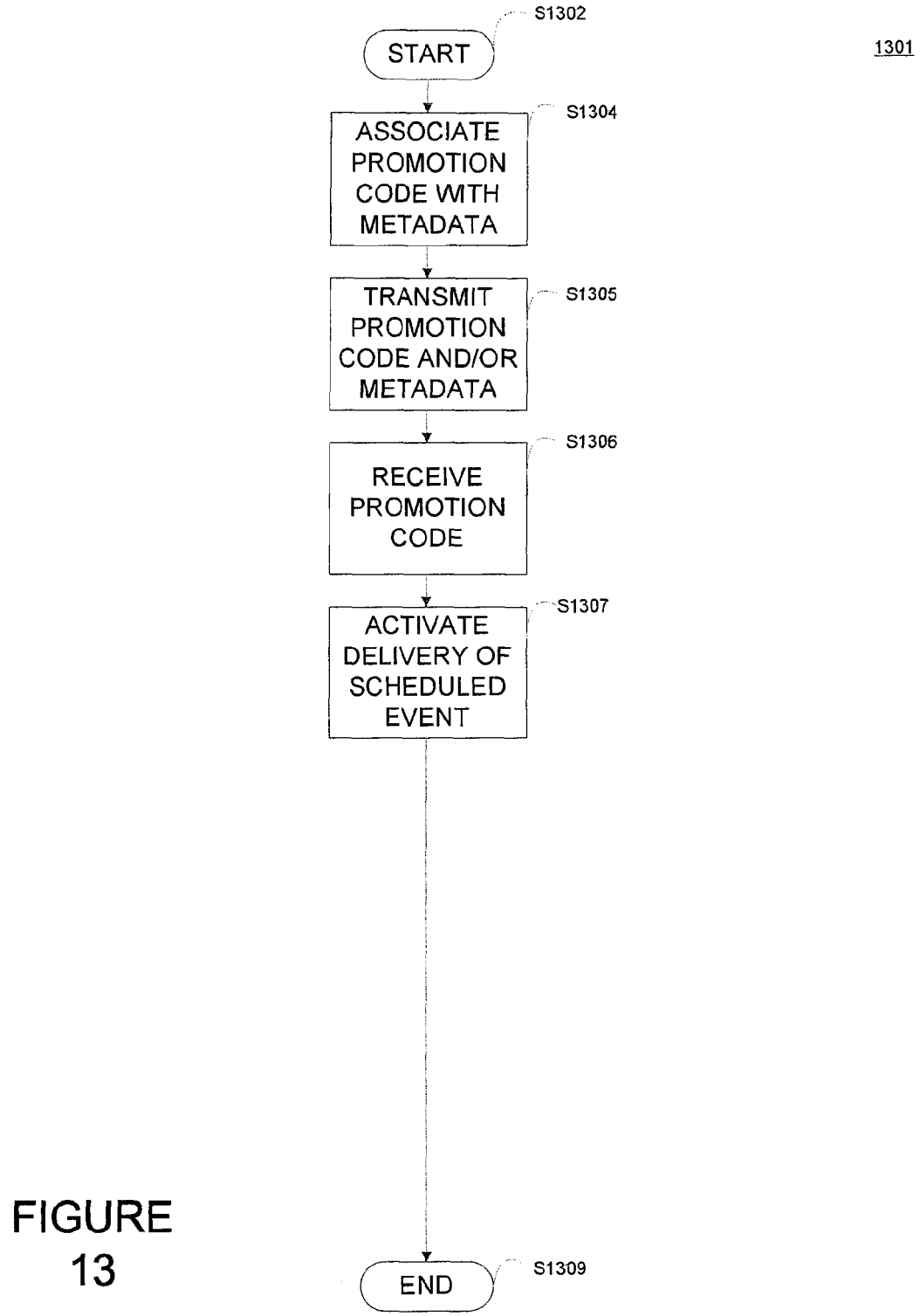

FIG. 13 is a flowchart depicting a method 1301 of accomplishing delivery of a scheduled event on a network. Briefly, the method includes associating a promotion code with event scheduling metadata, and activating delivery of the scheduled event at a wireless CPE based on the promotion code being input at the CPE. The method may be practiced in a system with one CPE, which schedules the scheduled event, and in which delivery of the scheduled event is activated.

In more detail, when the method 1301 begins (step S1302), a promotion code is associated with event scheduling metadata (S1304).

The promotion code and/or event scheduling metadata is transmitted to the CPE (step S1305), and the promotion code is received from the CPE (step S1306). In an alternate aspect, step S1305 and/or step S1306 are omitted, such as in the case where the promotion code is pre-loaded on the CPE, where promotion code data is interpreted by the network, or where the first CPE interprets the promotion code and transmits an interpretation of the promotion code, such as event scheduling metadata, to the network.

Delivery of the scheduled event is activated at a wireless CPE based on the promotion code being input at the CPE (step S1307), and the method ends (step S1309).

The method 1301 may be implemented using a content delivery system, including a content delivery network and a CPE. The content delivery network may further include a network transmitter that transmits a scheduled event and associating a promotion code with event scheduling metadata. The CPE further includes a user interface that receives a promotion code from a user, and a receiver that receives the event scheduling data associated with the promotion code. The CPE also includes an application that activates delivery of the scheduled event from the network based on the event scheduling metadata associated with the promotion code. FIG. 7 depicts an example system that could be used to implement the content delivery network.

A CPE that may be used to implement the method 1301 includes a user interface, the user interface receiving a promotion code from a user, and a receiver that receives scheduling data associated with the promotion code. The CPE also includes an application that activates delivery of a scheduled event from a network based on the event scheduling metadata associated with the promotion code. While FIG. 8 generally depicts an example CPE that may include these features, other hardware implementations are also contemplated.

Figure 14:
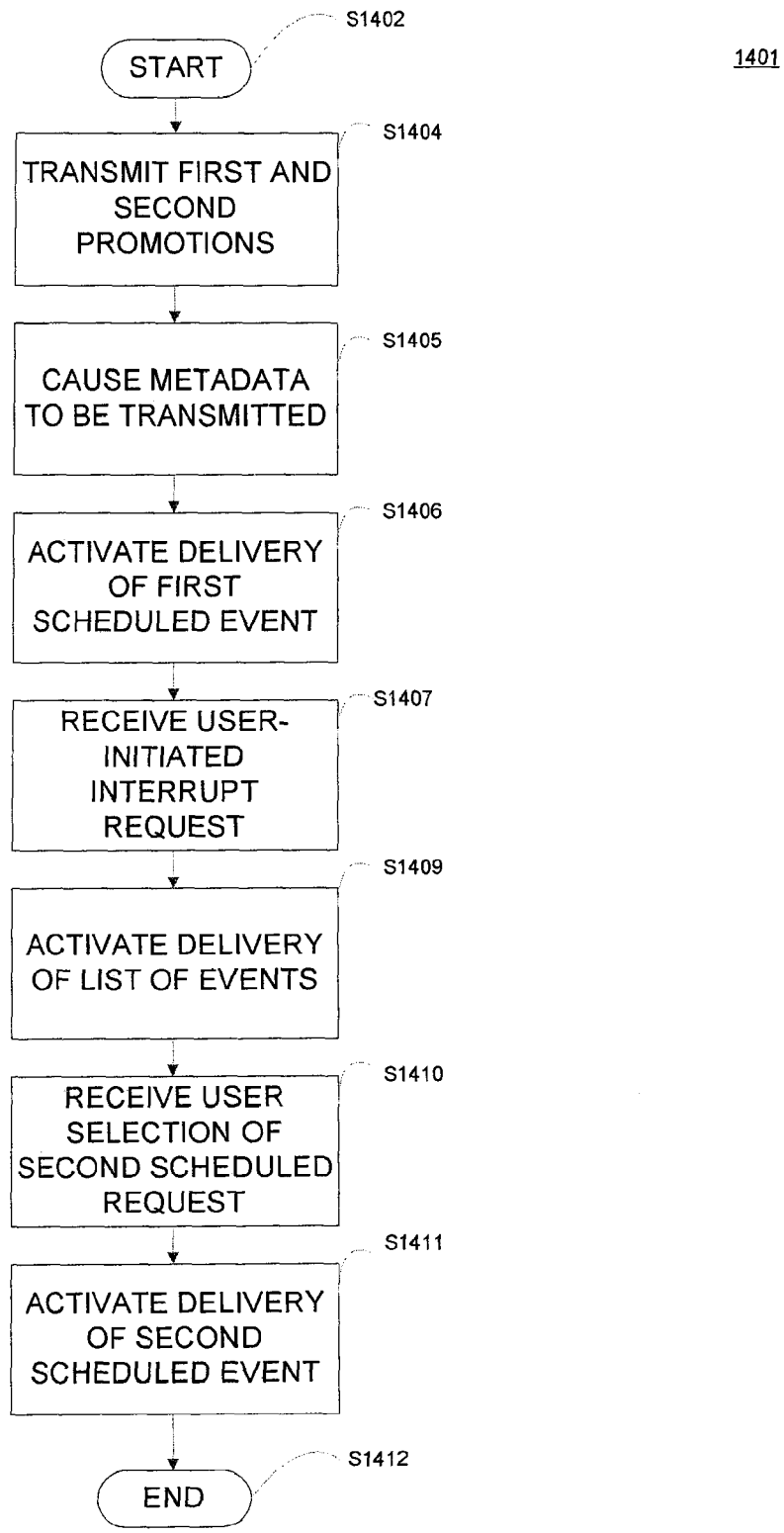
FIGS. 14 and 15 are flowcharts depicting a method of accomplishing delivery of coinciding scheduled events on a network.

FIG. 14 is a flowchart depicting a method 1401 of accomplishing delivery of coinciding scheduled events on a network. Briefly, the method includes transmitting first and second promotions to a first CPE, with the first and second promotions being associated with first and second event scheduling metadata for the first and second coinciding scheduled events, respectively. The first and second event scheduling metadata is transmitted from the first CPE to a second CPE based on a selection of the first and second promotions at the first CPE, delivery of the first scheduled event from the network is activated at the second CPE based on the first event scheduling metadata, and a user-initiated interrupt request to interrupt delivery of the first scheduled event is received. Furthermore, delivery of a list of the first and second coinciding scheduled events is activated based on the first and second event scheduling metadata and the interrupt request, a user selection of the second scheduled event is received, and delivery of the second scheduled event from the network is activated based on the user selection and the second event scheduling metadata. The method may be practiced in a system with two CPEs, in which one CPE schedules delivery of the scheduled event, and delivery of the scheduled event is activated at the second CPE.

Method 1401 provides "back button" functionality, in which the user is able to view all of the scheduled events that they have selected for a given time period, even after one scheduled event commences. This functionality allows a user to watch a first choice scheduled event, decide that they want to watch something else, then decide on and select a second or third choice scheduled event for delivery.

In more detail, when the method 1401 begins (step S1402), first and second promotions are transmitted to a first CPE, the first and second promotions being associated with first and second event scheduling metadata for the first and second coinciding scheduled events, respectively (step S1404).

The first and second event scheduling metadata are caused to be transmitted from the first CPE to a second CPE based on a selection of the first and second promotions at the first CPE (step S1405). Delivery of the first scheduled event is activated from the network at the second CPE based on the first event scheduling metadata (step S1406). Activating delivery of the first scheduled event further includes tuning the second CPE to an appropriate channel.

A user-initiated interrupt request to interrupt delivery of the first scheduled event is received (step S1407). In one aspect, the interrupt request is initiated when a user activates an input device, such as a keyboard or a remote control, indicating that they intend to suspend or halt the delivery of the first scheduled event. Delivery of a list of the first and second coinciding scheduled events is activated based on the first and second event scheduling metadata and the interrupt request (step S1409). In one example aspect, the list is a screen which displays all of the scheduled events that have been selected for a particular time period.

A user selection of the second scheduled event is received (step S1410). The user selection occurs when the user indicates, via an input device, that they wish to view another scheduled event whose metadata is stored at the second CPE. Delivery of the second scheduled event from the network is activated based on the user selection and the second event scheduling metadata (step S1411), and method 1401 ends (step S1412). Activating delivery of the second scheduled event further includes tuning the second CPE to an appropriate channel.

The method 1401 may be implemented using a a content delivery system, including a content delivery network, a first CPE, and a second CPE. The content delivery network may further include a network transmitter that transmits first and second coinciding scheduled events and first and second promotions associated with first and second event scheduling metadata for the first and second coinciding scheduled events, respectively. The first CPE further includes a first receiver that receives the first and second promotions from the network, a first user interface that delivers the first and second promotions to a user and receiving a selection of the first and second promotions from the user, and a first transmitter, the first transmitter transmitting the first and second event scheduling metadata based on the selection of the first and second promotions, respectively. The second CPE further includes a second receiver that receives the first and second event scheduling metadata, and an application that activates delivery of the first scheduled event from the network based on the first event scheduling metadata, activating delivery of a list of the first and second coinciding scheduled event based on the first and second event scheduling metadata and a user-initiated interrupt request to interrupt delivery of the first scheduled event, and activating delivery of the second scheduled event based on a user selection of the second scheduled event and the second event scheduling metadata. The second CPE also includes a second user interface, the second user interface receiving the interrupt request and the user selection. FIG. 6 depicts an example hardware environment that could be used to implement the content delivery network.

The network is a cable or satellite television system network or other type of network, where the scheduled event is a movie, a play, a sporting event, a show, a news broadcast, a pay-per-view ("PPV") event, an instructional video, or any other scheduled event. The event scheduling metadata includes time, date, and channel and/or other data.

A CPE that may be used to implement the method 1401 includes a receiver that receives first and second event scheduling metadata for first and second coinciding scheduled events, respectively, and an application that activates delivery of the first scheduled event from a network based on the first event scheduling metadata, and that activates delivery of a list of the first and second coinciding scheduled event based on the first and second event scheduling metadata and a user-initiated interrupt request to interrupt delivery of the first scheduled event. The application further activates delivery of the second scheduled event based on a user selection of the second scheduled event and the second event scheduling metadata. The CPE also includes a second user interface, the second user interface receiving the interrupt request and the user selection. While FIG. 8 generally depicts an example CPE that may include these features, other hardware implementation are also contemplated.

Figure 15:
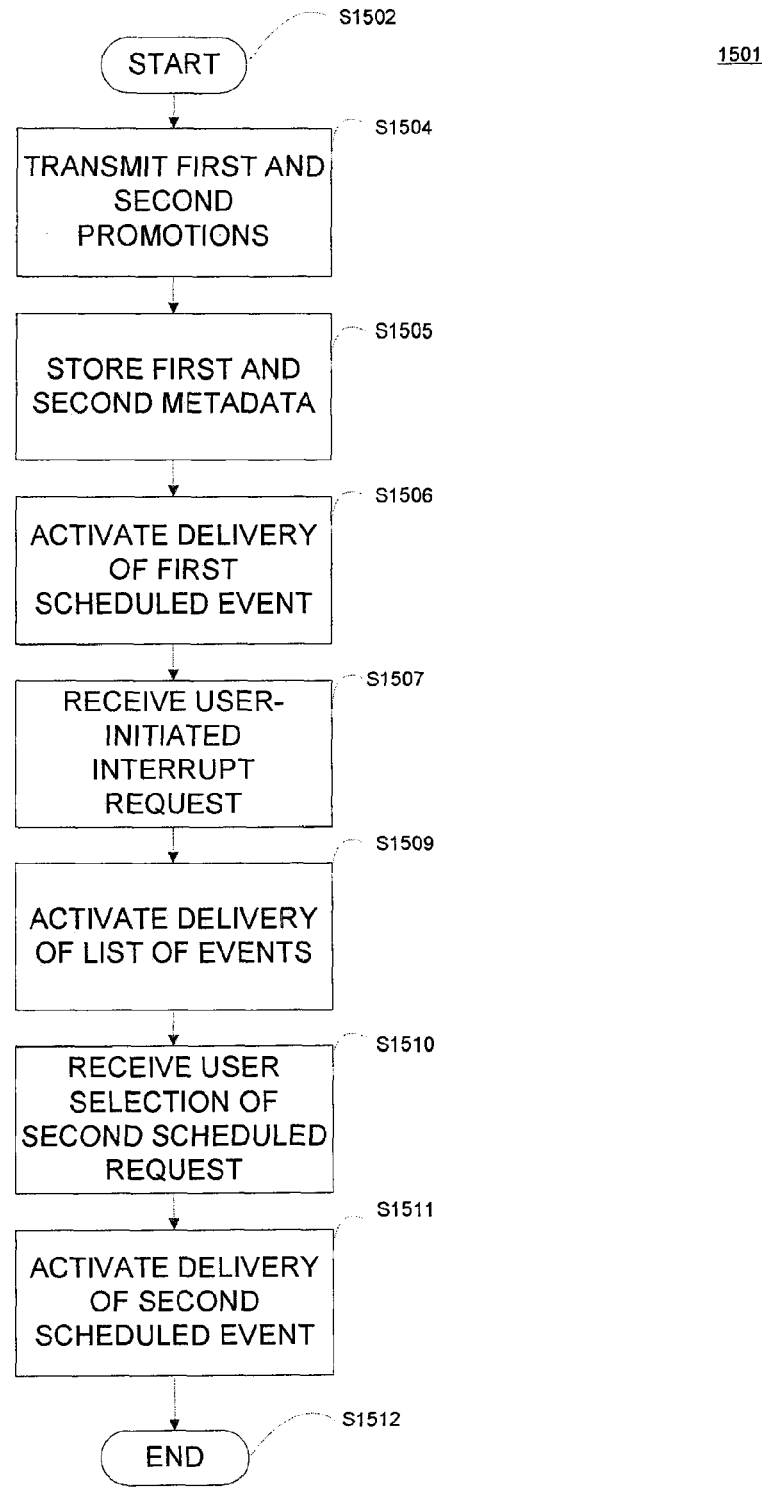

FIG. 15 is a flowchart depicting a method 1501 of accomplishing delivery of coinciding scheduled events on a network. Briefly, the method includes transmitting first and second promotions to a CPE, with the first and second promotions being associated with first and second event scheduling metadata for first and second coinciding scheduled events, respectively. The first and second event scheduling metadata is stored at the CPE based on a selection of the first and second promotion at the CPE, delivery of the first scheduled event from the network is activated at the CPE based on the first event scheduling metadata, and a user-initiated interrupt request to interrupt delivery of the first scheduled event is received. Delivery of a list of the first and second coinciding scheduled events is activated based on the first and second event scheduling metadata and the interrupt request, a user selection of the second scheduled event is received, and delivery of the second scheduled event from the network is activated based on the user selection and the second event scheduling metadata. The method may be practiced in a system with one CPE, which schedules the scheduled event, and in which delivery of the scheduled event is activated.

In more detail, when the method 1501 begins (step S1502), first and second promotions are transmitted to a CPE, the first and second promotions being associated with first and second event scheduling metadata for first and second coinciding scheduled events, respectively (step S1504).

The first and second event scheduling metadata are stored at the CPE based on a selection of the first and second promotion at the CPE (step S1505). Delivery of the first scheduled event from the network is activated at the CPE based on the first event scheduling metadata (step S1506). A user-initiated interrupt request to interrupt delivery of the first scheduled event is received (step S1507). Delivery of a list of the first and second coinciding scheduled events is activated based on the first and second event scheduling metadata and the interrupt request (step S1509). A user selection of the second scheduled event is received (step S1510). Delivery of the second scheduled event from the network is activated based on the user selection and the second event scheduling metadata (step S1511), and method 1501 ends (step S1512).

The method 1501 may be implemented using a content delivery system, including a content delivery network and a CPE. The content delivery network may further include a network transmitter that transmits first and second coinciding scheduled events and first and second promotions associated with first and second event scheduling metadata for the first and second coinciding scheduled events, respectively. The CPE further includes a receiver that receives the first and second promotions from the network, and a user interface that delivers the first and second promotions to a user and receiving a selection of the first and second promotions from the user, and that further receives a user-initiated interrupt request to interrupt delivery of the first scheduled event and a user selection of the second scheduled event. The CPE also includes a storage device that stores the first and second event scheduling metadata based on the selection of the first and second promotions, respectively, and an application that activates delivery of the first scheduled event from the network based on the first event scheduling metadata, and that activates delivery of a list of the first and second coinciding scheduled event based on the first and second event scheduling metadata and the interrupt request. The application also activates delivery of the second scheduled event from the network based on a user selection of the second scheduled event and the second event scheduling metadata. FIG. 7 depicts an example hardware environment that could be used to implement the content delivery network.

A CPE that may be used to implement the method 1501 includes a receiver that receives the first and second promotions from a network, the first and second promotions associated with first and second event scheduling metadata for first and second coinciding scheduled events, respectively, and a user interface that delivers the first and second promotions to a user and receiving a selection of the first and second promotions from the user, and that further receives a user-initiated interrupt request to interrupt delivery of the first scheduled event and a user selection of the second scheduled event. The CPE also includes a storage device that stores the first and second event scheduling metadata based on the selection of the first and second promotions, respectively, and an application that activates delivery of the first scheduled event from the network based on the first event scheduling metadata, and that activates delivery of a list of the first and second coinciding scheduled event based on the first and second event scheduling metadata and the interrupt request. The application further activates delivery of the second scheduled event from the network based on a user selection of the second scheduled event and the second event scheduling metadata. While FIG. 8 generally depicts an example CPE that may include these features, other hardware implementations are also contemplated.

Figure 16:
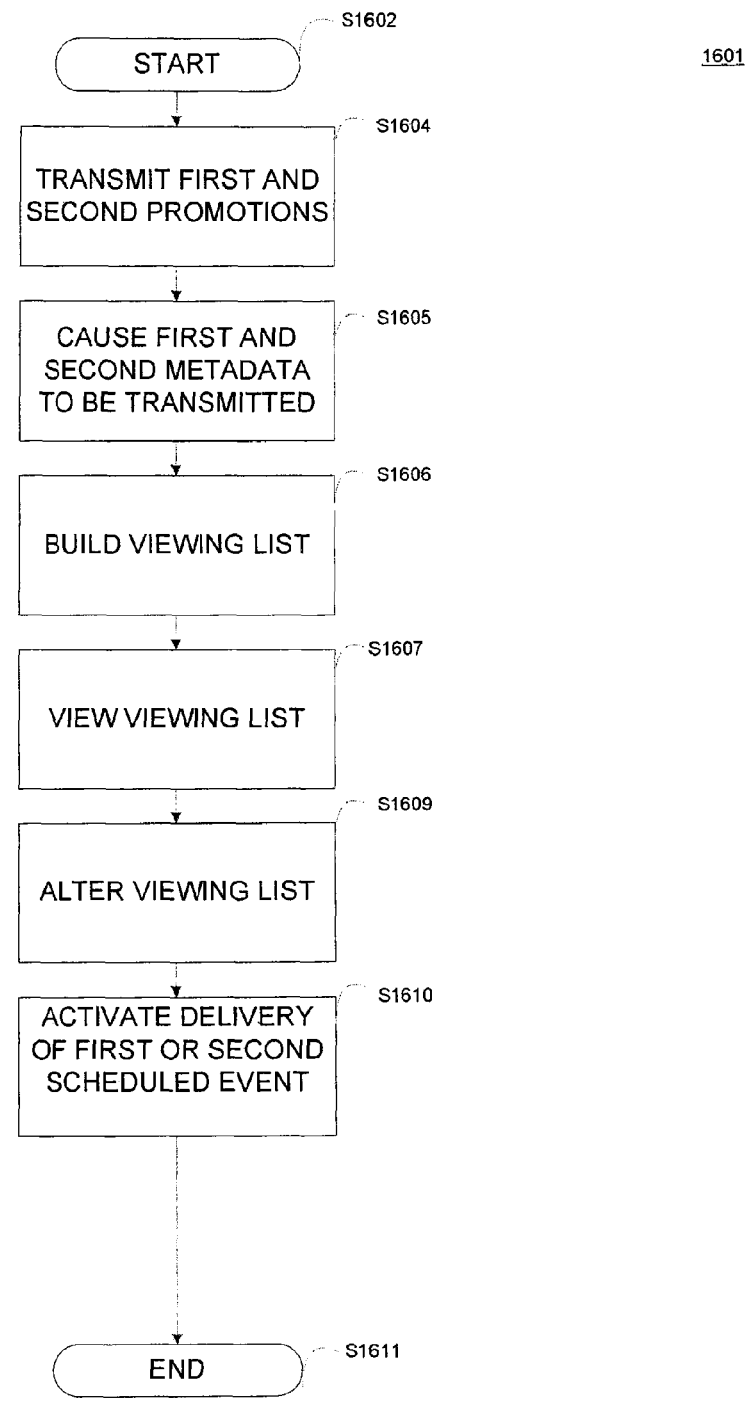
FIGS. 16 and 17 are flowcharts depicting methods of accomplishing delivery of scheduled events on a network.

FIG. 16 is a flowchart depicting a method 1601 of accomplishing delivery of scheduled events on a network. Briefly, the method includes transmitting first and second promotions to a first CPE, with the first and second promotions being associated with first and second event scheduling metadata for the first and second scheduled events, respectively, and causing the first and second event scheduling metadata to be transmitted from the first CPE to a second CPE based on a selection of the first and second promotion at the first CPE. A viewing list is built based on the selection of the first and second promotion, and delivery of the first scheduled event or the second scheduled event is activated based on the viewing list. The method may be practiced in a system with two CPEs, in which one CPE schedules delivery of the scheduled event, and delivery of the scheduled event is activated at the second CPE.

Method 1601 may be used in conjunction with a promotional channel which is an automated aggregation of promotions that have purchased a "premium trigger." By purchasing a premium trigger for a promotion, the promotion would ordinarily be delivered sever times prior to the occurrence of the scheduled event. The promotional channel appears in an MSO's linear line-up, for example, representing a single user's destination for seeing, in promotional form, a sampling of upcoming programming available in an entire linear landscape. The triggers placed in promotions appearing in this promotional channel are active and function much like they would as cross-channel spots.

Accordingly, a linear channel is provided which can be accessed by CPEs, such as by the web, or via a cell phone. When activated, the triggers have the ability to contact a second CPE, such as a set-top box, to activate the delivery of a program remotely. These first CPEs can manage a version of a customized viewing list via these CPEs.

In more detail, when the method 1601 begins (step S1602), first and second promotions are transmitted to a first CPE, where the first and second promotions being associated with first and second event scheduling metadata for the first and second scheduled events, respectively (step S1604).

The first and second event scheduling metadata are caused to be transmitted from the first CPE to a second CPE based on a selection of the first and second promotion at the first CPE (step S1605). A viewing list is built based on the selection of the first and second promotion (step S1606). The viewing list is built by the first CPE, the second CPE, and/or the network. The viewing list is viewed at the first CPE or the second CPE, where viewing the viewing list further includes viewing the first event scheduling metadata or the second event scheduling metadata (step S1607)

The viewing list is altered at the first CPE or the second CPE, where altering the viewing list further includes prioritizing the first scheduled event or the second scheduled event, deleting the first scheduled event or the second scheduled event, and/or altering the first event scheduling metadata or the second event scheduling metadata (step S1609). Delivery of the first scheduled event or the second scheduled event is activated based on the viewing list (step S1610), and method 1601 ends (step S1611).

The method 1601 may be implemented using a content delivery system, including a content delivery network, a first CPE, and a second CPE. The content delivery network may further include a network transmitter that transmits first and second scheduled events and first and second promotions associated with first and second event scheduling metadata for the first and second scheduled events. The first CPE further includes a first receiver that receives the first and second promotions from the network, a first user interface that delivers the first and second promotions to a user, and that receives a selection of the first and second promotions from the user, and a first transmitter that transmits the first and second metadata based on the selection of the first and second promotions, respectively, or a viewing list based on the selection of the first and second promotions. The second CPE further includes a second receiver that receives the first and second event scheduling metadata or the viewing list, and an application that activates delivery of the first scheduled event or the second scheduled event based on the viewing list. FIG. 6 depicts an example hardware environment that could be used to implement the content delivery network.

The first CPE user interface further builds the viewing list based on the selection of the first and second promotions. Alternatively, the application further builds the viewing list based on the selection of the first and second promotions. In other implementations, the content delivery network further includes a network host, the network host building the viewing list based on the selection of the first and second promotions.

A CPE that may be used to implement the method 1601 includes a first receiver that receives first and second promotions from a network, the first and second promotions associated with first and second event scheduling metadata for first and second scheduled events. The CPE also includes a first user interface that delivers the first and second promotions to a user, receiving a selection of the first and second promotions from the user, and building a viewing list based on the selection of the first and second promotions, and a first transmitter, the first transmitter transmitting the viewing list. While FIG. 8 generally depicts an example CPE that may include these features, other hardware implementations are also contemplated.

Figure 17:
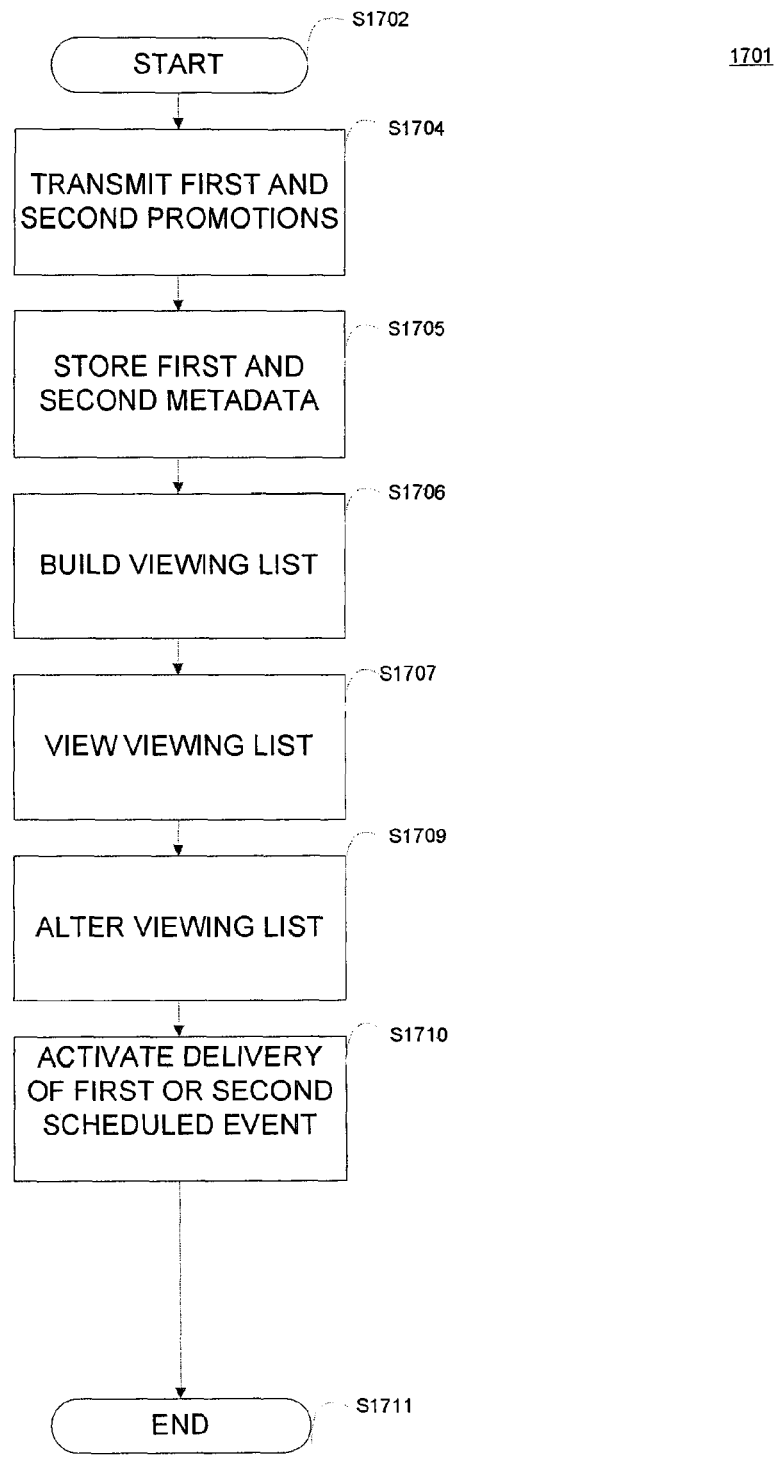

FIG. 17 is a flowchart depicting method 1701 of accomplishing delivery of scheduled events on a network. Briefly, the method includes transmitting first and second promotions to a CPE, with the first and second promotions being associated with first and second event scheduling metadata for first and second coinciding scheduled events, respectively, and storing the first and second event scheduling metadata at the CPE based on a selection of the first and second promotion at the CPE. A viewing list is built based on the selection of the first and second promotion, and delivery of the first scheduled event or the second scheduled event is activated based on the viewing list. The method may be practiced in a system with one CPE, which schedules the scheduled event, and in which delivery of the scheduled event is activated.

In more detail, when the method 1701 begins (step S1702), first and second promotions are transmitted to a CPE, the first and second promotions being associated with first and second event scheduling metadata for first and second coinciding scheduled events, respectively (step S1704).

The first and second event scheduling metadata are stored at the CPE based on a selection of the first and second promotion at the CPE (step S1705). A viewing list is built based on the selection of the first and second promotion (step S1706). The viewing list is viewed at the first CPE or the second CPE, where viewing the viewing list further includes viewing the first event scheduling metadata or the second event scheduling metadata (step S1707).

The viewing list is altered at the first CPE or the second CPE, where altering the viewing list further includes prioritizing the first scheduled event or the second scheduled event, deleting the first scheduled event or the second scheduled event, and/or altering the first event scheduling metadata or the second event scheduling metadata (step S1709). In an alternate aspect, viewing (step S1707) and altering (step S1709) of the viewing list are omitted and/or reordered.

Delivery of the first scheduled event or the second scheduled event is activated based on the viewing list (step S1710), and method 1701 ends (step S1711).

The method 1701 may be implemented using a content delivery system, including a content delivery network and a CPE. The content delivery network may further includes a network transmitter that transmits first and second scheduled events and first and second promotions associated with first and second event scheduling metadata for the first and second scheduled events. The CPE further includes a receiver that receives the first and second promotions from the network, and a user interface that delivers the first and second promotions to a user, and that receives a selection of the first and second promotions from the user. The user interface further builds a viewing list based on the selection of the first and second promotions. The CPE also includes a storage device that stores the viewing list, and an application that activates delivery of the first scheduled event or the second scheduled event based on the viewing list. FIG. 7 depicts an example hardware environment that may include these features.

A CPE that may be used in implementing the method 1701 includes a receiver that receives the first and second promotions from a network, the first and second promotions associated with first and second event scheduling metadata for first and second scheduled events, and a user interface that delivers the first and second promotions to a user, and that receives a selection of the first and second promotions from the user. The user interface further builds a viewing list based on the selection of the first and second promotions. The CPE also includes a storage device that stores the viewing list, and an application that activates delivery of the first scheduled event or the second scheduled event based on the viewing list. FIG. 8 depicts an example CPE that may include these features, although other hardware implementations are also contemplated.

It is noted that many variations of the methods described above may be used. Specifically, certain steps are optional and may be performed or deleted as desired. Similarly, other steps (such as additional data sampling, processing, filtration, calibration, or mathematical analysis for example) may be added. Additionally, the order of performance of certain steps may be permuted, or performed in parallel (or series) if desired. Hence, the implementations described above are merely illustrative.

Other implementations are within the scope of the following claims.

What is claimed is:

1. A method of alerting a user of a scheduled event on a network, the method comprising:
    transmitting a promotion to a first consumer premises equipment ("CPE"), the promotion being associated with event scheduling metadata;
    causing the event scheduling metadata to be transmitted from the first CPE to a second CPE based on a selection of the promotion at the first CPE;
    causing a reminder message to be transmitted from the second CPE to the first CPE based on the event scheduling metadata;
    when programming media content associated with the promotion conflicts with at least one other scheduled content, prompting the user to select only one of the programming media content and the at least one other scheduled content for viewing; and
    causing the selected one of the programming media content and the at least one other scheduled content to be automatically transmitted to the second CPE from the network, and an unselected one to be automatically transmitted to the first CPE from the network.

2. The method according to claim 1, wherein the reminder message is transmitted from the second CPE to the first CPE via the network.

3. The method according to claim 2, wherein the reminder message is wirelessly transmitted from the second CPE to the network.

4. The method according to claim 2, wherein the reminder message is wirelessly transmitted from the network to the first CPE.

5. The method according to claim 1, wherein the reminder message is transmitted directly from the second CPE to the first CPE.

6. The method according to claim 1, further comprising activating delivery of an alert based on the reminder message.

7. The method according to claim 6, wherein the alert comprises an audio or visual alert.

8. The method according to claim 1, wherein the network comprises a cable or satellite television network.

9. The method according to claim 1, wherein the reminder message is transmitted prior to the scheduled event.

10. The method according to claim 1, wherein the reminder message further comprises time, date, and channel data.

11. A method of accomplishing delivery of media content on a network, the method comprising:
    transmitting a promotion to a first device based at least in part on selection metrics associated with a first user of the first device, the promotion being associated with linear media content available at a prescribed time in the future and having event scheduling metadata associated therewith, the promotion further comprising data invoking the first device to extract event scheduling metadata therefrom to generate a metadata file;
    causing the metadata file to be transmitted from the first device to a second device based on a selection of the promotion at the first device, the first and second devices being associated with the first user having access to a scheduling application associated with the second device;
    responsively updating the selection metrics based on the selection of the promotion;
    causing a reminder message to be transmitted from the second device to the first device before the prescribed time but after the act of transmitting the promotion, based on the event scheduling metadata; and
    causing the linear media content associated with the promotion to be transmitted to the second device at the prescribed time based on the selection of the promotion at the first device and without intervention of the second device.

12. The method of claim 11, wherein the reminder message is transmitted from the second device to the first device via the network.

13. The method of claim 12, wherein the reminder message is wirelessly transmitted from the second device to the network.

14. The method of claim 12, wherein the reminder message is wirelessly transmitted from the network to the first device.

15. The method of claim 11, wherein the reminder message is transmitted directly from the second device to the first device.

16. The method of claim 11, further comprising activating delivery of an alert based on the reminder message, the alert comprising an audio or visual alert.

17. The method of claim 11, wherein the reminder message comprises time, date, and channel data.

18. A method of accomplishing delivery of media content on a network, said method comprising:
    receiving a promotion at a first consumer premises equipment ("CPE"), said promotion relating to a scheduled event;
    receiving a scheduling metadata file associated with said scheduled event at said first CPE, said scheduling metadata file being received separate from said act of receiving said promotion;
    transmitting only said scheduling metadata file from said first CPE to a second CPE in communication therewith, a first user of said first CPE having access to a scheduling application on said second CPE;
    receiving at said first CPE prior to said scheduled event a reminder message directly from said second CPE, said second CPE generating said reminder message based at least in part on said scheduling metadata file; and
    transmitting a request from said first CPE to said network, said request causing programming content associated with said scheduled event to be automatically, and without intervention of a second user of said second device, transmitted to said second CPE directly from said network via an Internet connection, said act of transmitting said programming content associated with said scheduled event overriding a playback of a conflicting event in a viewing schedule selected by said second user of said second device.

19. The method of claim 18, further comprising transmitting one or more metrics to said network, said one or more metrics identifying said conflicting event that has been overridden.

20. The method of claim 19, wherein said transmitted one or more metrics further identify a viewing profile.

21. The method of claim 20, wherein said viewing profile is further associated with one of said first or said second users.

22. The method of claim 20, wherein said viewing profile is further associated with a household audience.

23. A consumer premises equipment ("CPE") comprising:
    a receiver configured to receive first and second event scheduling metadata for first and second conflicting scheduled events, respectively, the second event scheduling metadata which originates from a network entity based at least in part on selection metrics associated with a first user associated with the CPE;
    a user interface configured to receive user selection input;
    a computer application comprising a plurality of instructions which are configured to when executed by a processor:
        cause the CPE to tune to the first scheduled event from a network based on the first event scheduling metadata;
        activate delivery of a list of the first and second conflicting scheduled events based on the first and second event scheduling metadata and a user-initiated interrupt request to interrupt the delivery of the first scheduled event;
        cause the CPE to tune to the second scheduled event based on a user selection of the second scheduled event from the delivered list and the second event scheduling metadata; and
        provide data that relates to the user selection to the network entity.

24. The CPE of claim 23, wherein the plurality of instructions are further configured to transmit one or more metrics to the network, the one or more metrics being configured to identify the first scheduled event that has been interrupted.

25. The CPE of claim 24, wherein the transmitted one or more metrics further identify a viewing profile.

26. The CPE of claim 25, wherein the viewing profile is further associated with said user.

27. The CPE of claim 25, wherein the viewing profile is further associated with a household audience.

* * * * *